US011892717B2

(12) United States Patent
Harrold et al.

(10) Patent No.: US 11,892,717 B2
(45) Date of Patent: Feb. 6, 2024

(54) MARKS FOR PRIVACY DISPLAY

(71) Applicant: RealD Spark, LLC, Beverly Hills, CA (US)

(72) Inventors: Jonathan Harrold, Upper Heyford (GB); Graham J. Woodgate, Henley-on-Thames (GB); Michael G. Robinson, Boulder, CO (US); Robert A. Ramsey, Boulder, CO (US); Ben Ihas, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 17/954,225

(22) Filed: Sep. 27, 2022

(65) Prior Publication Data

US 2023/0099000 A1 Mar. 30, 2023

Related U.S. Application Data

(60) Provisional application No. 63/250,580, filed on Sep. 30, 2021.

(51) Int. Cl.
*G02F 1/1343* (2006.01)
*G02F 1/13* (2006.01)
(Continued)

(52) U.S. Cl.
CPC .......... *G02F 1/1323* (2013.01); *G02F 1/0136* (2013.01); *G02F 1/1337* (2013.01); *G02F 1/13439* (2013.01); *G02F 1/13471* (2013.01); *G02F 1/133374* (2021.01); *G02F 1/133536* (2013.01); *G02F 1/133618* (2021.01); *G02F 1/134309* (2013.01); *G02F 1/134318* (2021.01);
(Continued)

(58) Field of Classification Search
CPC ............ G02F 1/1323; G02F 1/133374; G02F 1/13471; G09G 2320/068; G09G 2358/00
See application file for complete search history.

(56) References Cited

U.S. PATENT DOCUMENTS

| 3,914,022 A | 10/1975 | Kashnow |
| 4,059,916 A | 11/1977 | Tachihara et al. |

(Continued)

FOREIGN PATENT DOCUMENTS

| CA | 2222313 A1 | 6/1998 |
| CN | 1125943 C | 10/2003 |

(Continued)

OTHER PUBLICATIONS

CN-201980082757.0 Notification of the 1st Office Action of the Chinese Patent Office dated Dec. 5, 2022.
(Continued)

*Primary Examiner* — Paisley L Wilson
(74) *Attorney, Agent, or Firm* — Penny L. Lowry

(57) ABSTRACT

A switchable privacy display comprises a spatial light modulator with output polariser, a reflective polariser, a polar control liquid crystal retarder and an additional polariser. The electrodes of the polar control liquid crystal retarder are patterned with a mark. In wide angle and narrow angle operational modes, the electrodes of the liquid crystal retarder are driven such that the mark is not visible. In a mark display state, the electrodes are driven to provide visibility of the mark in reflected light to an off-axis observer.

11 Claims, 42 Drawing Sheets

(51) Int. Cl.
*G09G 3/36* (2006.01)
*G09G 3/34* (2006.01)
*G02F 1/01* (2006.01)
*G02F 1/1335* (2006.01)
*G02F 1/1337* (2006.01)
*G02F 1/1347* (2006.01)
*G02F 1/1333* (2006.01)

(52) U.S. Cl.
CPC ..... *G02F 1/134327* (2013.01); *G09G 3/3406* (2013.01); *G09G 3/36* (2013.01); *G09G 2310/0297* (2013.01); *G09G 2320/068* (2013.01); *G09G 2330/021* (2013.01); *G09G 2358/00* (2013.01); *G09G 2360/16* (2013.01)

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A * | 12/1998 | Coleman .............. G09F 9/30 359/271 |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,099,433 B2 | 8/2021 | Robinson et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,366,358 B2 | 6/2022 | Wu et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |

(56) References Cited

U.S. PATENT DOCUMENTS

| | | |
|---|---|---|
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Mnther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1* | 10/2016 | Kikuchi .............. H04N 13/31 |
| 2016/0334898 A1 | 11/2016 | Kwak et al. |
| 2016/0349444 A1 | 12/2016 | Robinson et al. |

(56) References Cited

U.S. PATENT DOCUMENTS

| | | |
|---|---|---|
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |
| 2021/0271121 A1 | 9/2021 | Woodgate et al. |
| 2021/0373382 A1 | 12/2021 | Sakai et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 107102460 A | 8/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | 001612360 | 1/2018 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |

(56) References Cited

FOREIGN PATENT DOCUMENTS

| | | |
|---|---|---|
| WO | 2017050631 A1 | 3/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
Chiu, et al., "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN-201880042320.X Notification of the Third Office Action from the Chinese Patent Office dated Dec. 30, 2022.
PCT/US2022/045030 International search report and written opinion of the international searching authority dated Jan. 3, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection dated Feb. 17, 2023.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
Kalantar, et al. "Backlight Unit With Double Surface Light Emission," J. Soc. Inf. Display, vol. 12, Issue 4, pp. 379-387 (Dec. 2004).
Nelkon et al., "Advanced Level Physics", Third edition with SI units, Heinemann Educational Books LTD, London, 1970.
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
EP-20835231.0 Extended European Search Report of European Patent Office dated May 15, 2023.
PCT/US2023/012240 International search report and written opinion of the international searching authority dated Apr. 27, 2023.

(56) References Cited

OTHER PUBLICATIONS

PCT/US2023/012243 International search report and written opinion of the international searching authority dated May 10, 2023.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
PCT/US2021/043435 International search report and written opinion of the international searching authority dated Nov. 1, 2021.
PCT/US2021/043444 International search report and written opinion of the international searching authority dated Nov. 1, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
TW107132221 First Office Action dated Apr. 28, 2022.
EP-20851155.0 Extended European Search Report of European Patent Office dated Aug. 2, 2023.
PCT/US2023/017639 International search report and written opinion of the international searching authority dated Jul. 6, 2023.
Weindorf et al., "Active Circular Polarizer OLED E-Mirror", Proceedings of the Society for Information Display 25th Annual Symposium on Vehicle Displays, Livonia, MI, pp. 225-237, Sep. 25-26, 2018.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
KR10-2020-7024293 Notice of Preliminary Rejection dated Dec. 7, 2023.

* cited by examiner

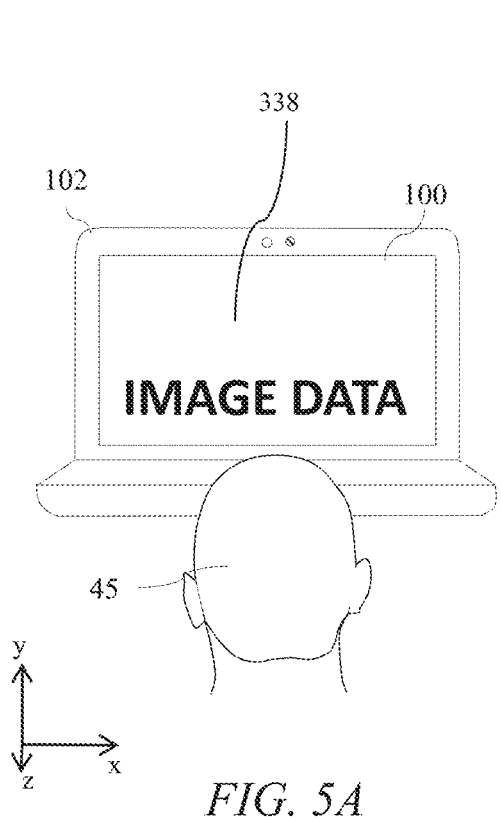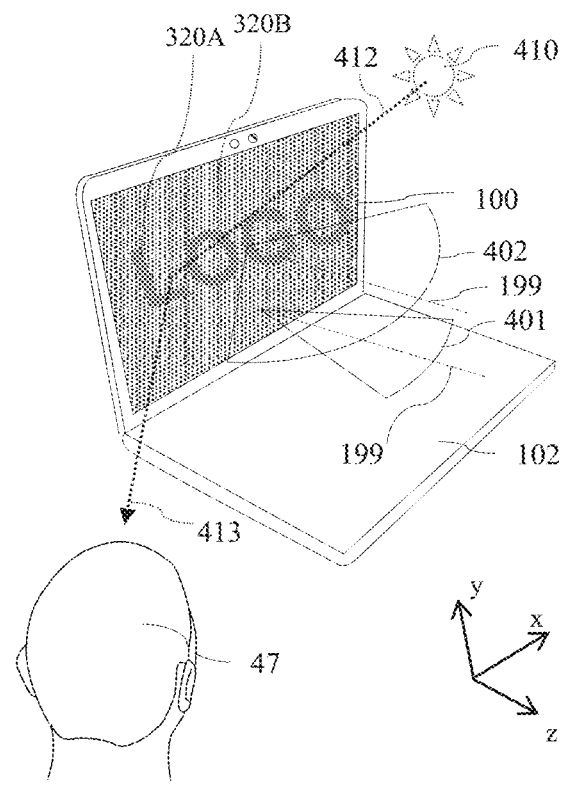
FIG. 5A  FIG. 5B
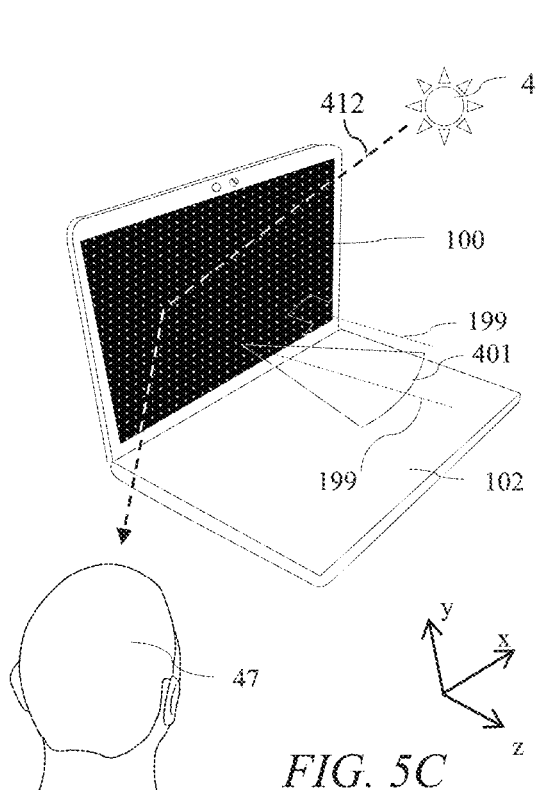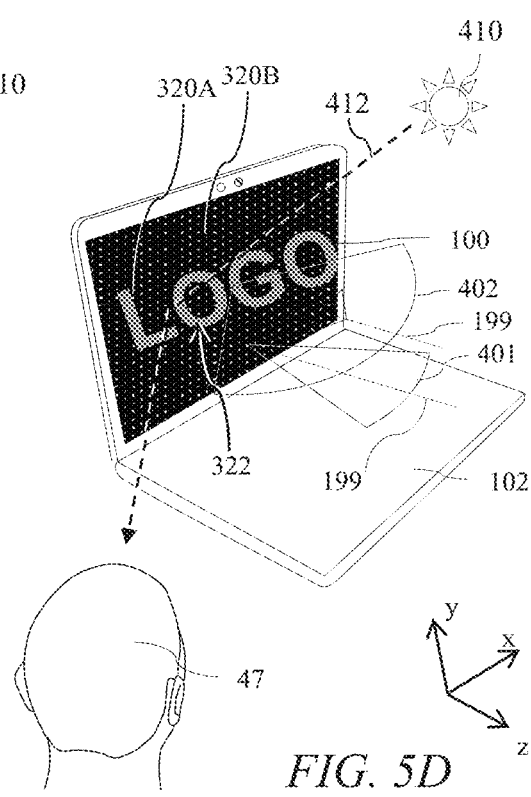
FIG. 5C  FIG. 5D

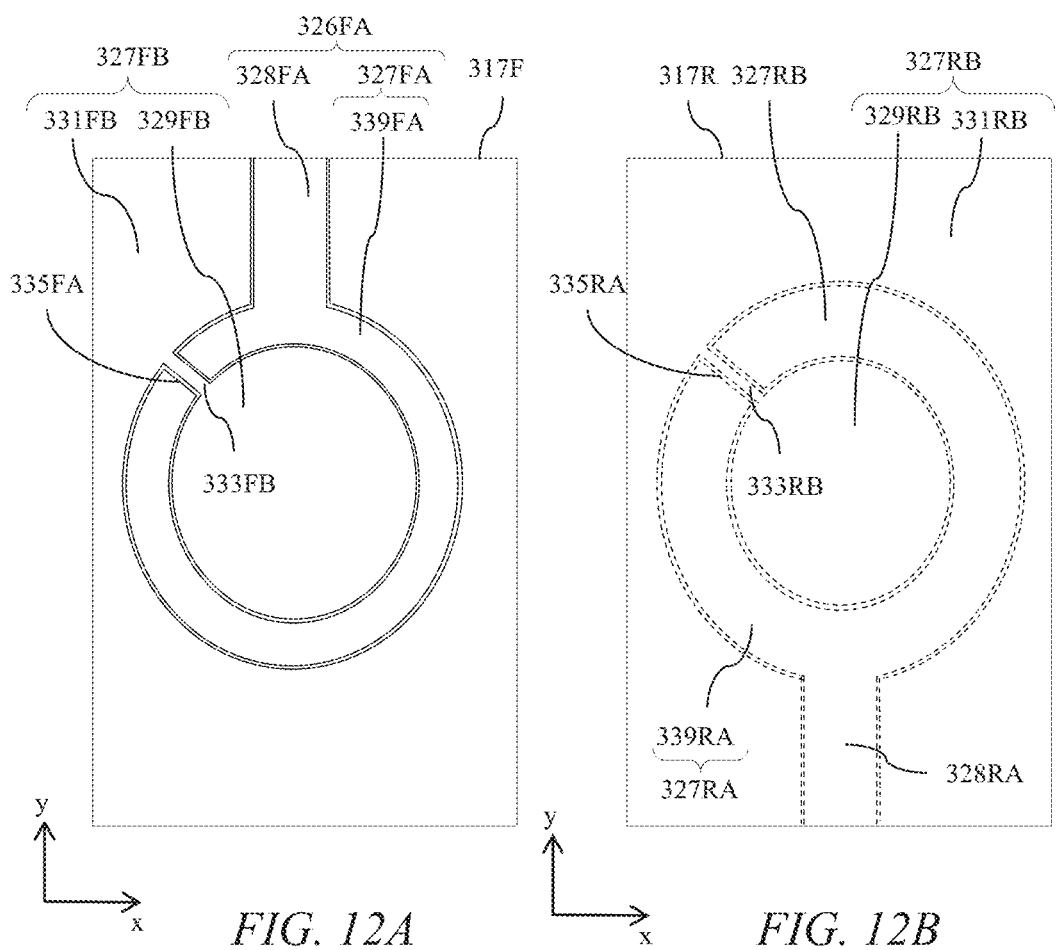
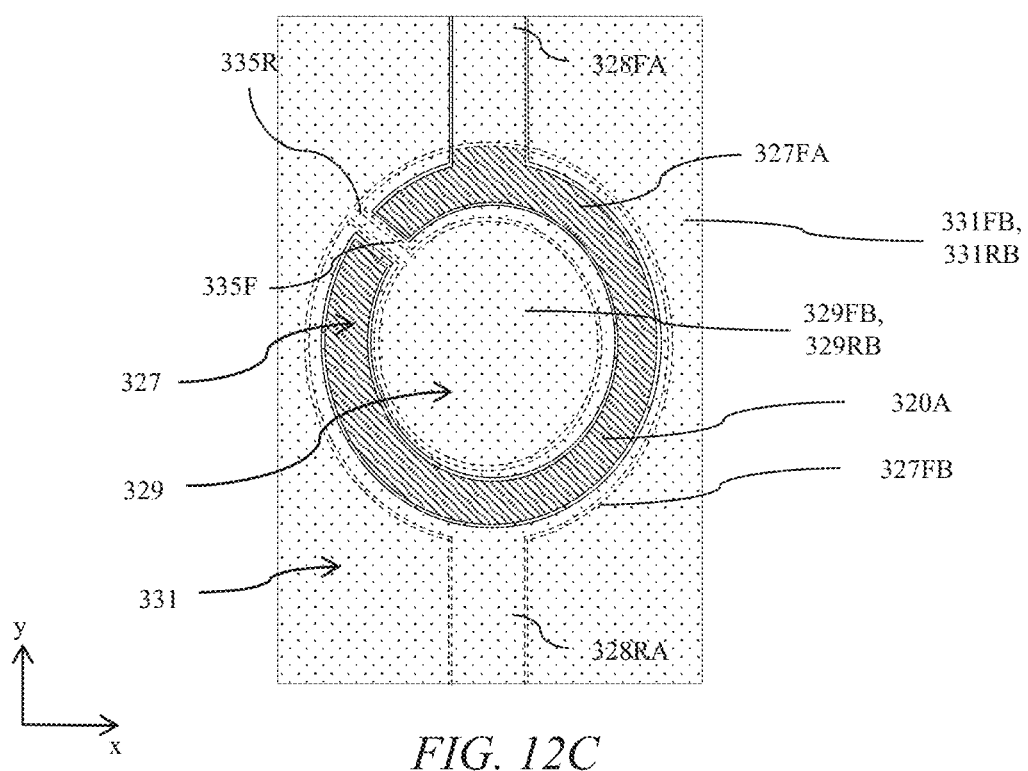
FIG. 12A  FIG. 12B  FIG. 12C

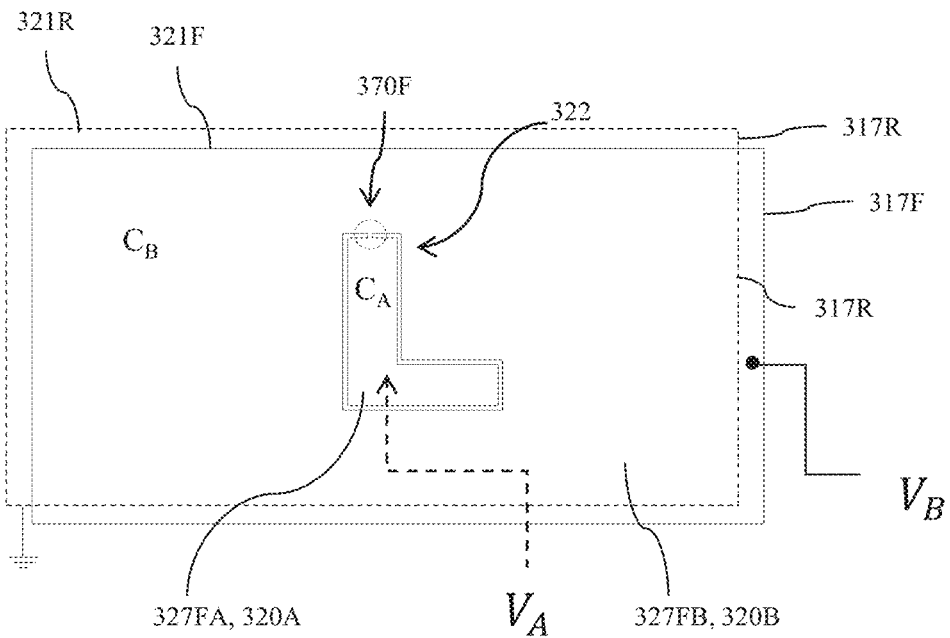
FIG. 16
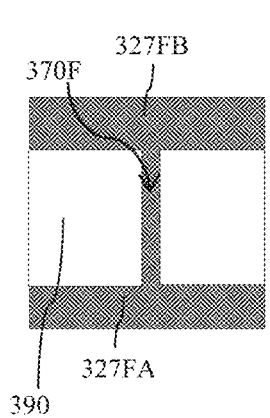 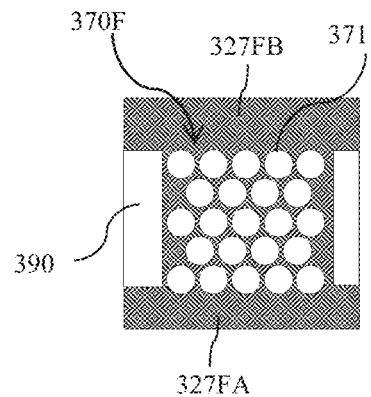 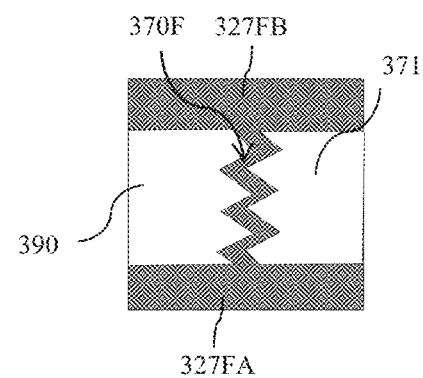
FIG. 17A  FIG. 17B  FIG. 17C
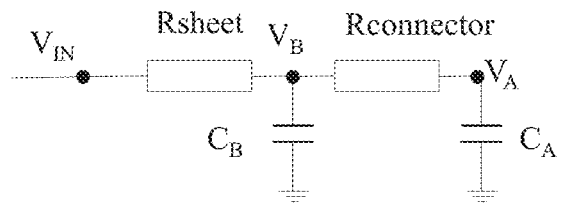
FIG. 18

MARKS FOR PRIVACY DISPLAY

TECHNICAL FIELD

This disclosure generally relates to illumination from light modulation devices, and more specifically relates to control of privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

In a known privacy display the privacy mode is provided by the addition of a removable louver film, such as marketed by 3M Corporation, which may not be fitted or removed by users reliably and therefore in practice, is not assiduously attached by the user every time they are outside the office. In another known privacy display the control of privacy mode is electronically activated but control is vested in the user who must execute a keystroke to enter privacy mode.

BRIEF SUMMARY

According to a first aspect of the present disclosure, there is provided a display device for use in ambient illumination comprising: a spatial light modulator arranged to output light, wherein the spatial light modulator comprises an output polariser arranged on the output side of the spatial light modulator, the output polariser being a linear polariser; a view angle control arrangement comprising: an additional polariser arranged on the output side of the output polariser, the additional polariser being a linear polariser; a reflective polariser arranged between the output polariser and the additional polariser, the reflective polariser being a linear polariser; and at least one polar control retarder arranged between the reflective polariser and the additional polariser, the at least one polar control retarder including a switchable liquid crystal retarder comprising a layer of liquid crystal material, and first and second transmissive electrodes on opposite sides of the layer of liquid crystal material, wherein at least one of the first and second transmissive electrodes is patterned in areas separated by gaps to provide plural addressable regions of the layer of liquid crystal material, at least one of the plural regions being in a shape of a mark for display to an observer; and a control system arranged to control the spatial light modulator and to apply voltages across the first and second transmissive electrodes for driving the layer of liquid crystal material, wherein the control system is arranged to be operable in plural modes of operation, including: a wide-angle operational display mode, in which the control system controls the spatial light modulator to display an operational image and applies voltages across the first and second transmissive electrodes that drive the layer of liquid crystal material into the same state in different regions such that the operational image is visible at a wide angle and a narrow angle, and the mark is not visible at the narrow angle or the wide angle; at least one narrow-angle operational display mode, in which the control system controls the spatial light modulator to display an operational image and applies voltages across the first and second transmissive electrodes that drive the layer of liquid crystal material into states in different regions such that the operational image is visible at the narrow angle but not at the wide angle, and the mark is not visible at the narrow angle; and at least one mark display mode in which the control system applies voltages across the first and second transmissive electrodes that drive the layer of liquid crystal material into different states in different regions such that the mark is visible.

A display device may further be provided with a share mode wherein the display may be observed by multiple observers with high image visibility and high image uniformity. The display device may further be provided with a privacy mode in which the display may be observed with high image visibility with high uniformity by a display user and provide an image with advantageously high security factor to a display snooper (that in an automotive vehicle may be a driver of the vehicle). The privacy mode of the display device may further be provided as a privacy mark mode in which the snooper may observe a mark and the displayed image data is not visible; and the user may observe no mark and the displayed image data is clearly visible. The display device may be provided with a sleep mode in which the mark is visible from some viewing positions when the spatial light modulator does not output light. The mark may provide desirable information about the display such as being an icon or text. The icon or text may be used to at least promote a brand, indicate useful information and/or provide an improved aesthetic appearance of the display.

The at least one mark display mode may include a mark display mode in which the control system controls the spatial light modulator to display no image and applies voltages across the first and second transmissive electrodes that drive the layer of liquid crystal material into different states in different regions such that the mark may be visible at the wide angle but may not be visible at the narrow angle. Advantageously the power consumption of the mark display mode may be significantly reduced while the mark may be displayed.

The at least one mark display mode may include a mark display mode in which the control system controls the spatial light modulator to display an illumination image for illuminating the mark and applies voltages across the first and second transmissive electrodes that drive the layer of liquid crystal material into the different states in different regions such that the mark may be visible at the wide angle and at the narrow angle. The illumination image may be a still image. The illumination image may be aligned with the mark. Advantageously multiple users may observe the mark and the mark may have desirable colours.

The at least one narrow-angle operational display mode may include a narrow-angle operational display mode in which the control system controls the spatial light modulator to display an operational image and applies voltages across the first and second transmissive electrodes that drive the layer of liquid crystal material into the same state in different regions such that the mark may not be visible at the wide angle. Advantageously high uniformity of security factor across the display may be provided to the snooper.

The at least one narrow-angle operational display mode may include a narrow-angle operational display mode in which the control system controls the spatial light modulator to display an operational image and applies voltages across the first and second transmissive electrodes that drive the layer of liquid crystal material into different states in different regions such that the mark may be visible at the wide angle.

Advantageously the mark may be visible while the image may not be visible to the snooper.

The gaps may have a width of at most the twice the thickness of the layer of liquid crystal material, and preferably at most the thickness of the layer of liquid crystal material. Advantageously the visibility of the gaps may be reduced for the display observers.

Each of the first and second transmissive electrodes may be patterned to provide plural areas separated by gaps. Advantageously distal marks may be provided without visibility of connection electrodes.

The gaps that are aligned across the layer of liquid crystal material may be offset. The offset may be at least the thickness of the layer of liquid crystal material, and preferably at least twice the thickness of the layer of liquid crystal material. Advantageously the visibility of gaps between the plural regions may be reduced.

The plural regions may include at least one island region and at least one peripheral region extending around the island region, and areas of the first and second transmissive electrodes that are aligned with the at least one peripheral region may have bridging slit that may be aligned across the layer of liquid crystal material and through which may extend bridging tracks connected to areas of the first and second transmissive electrodes that are aligned with the at least one island region. Advantageously distal marks with island regions may be provided with reduced visibility of connection electrodes.

The plural regions may include at least one distal region that may not be adjacent to an outer edge of the first and second transmissive electrodes and at least one proximal region that may be adjacent to the outer edge of the first and second transmissive electrodes, and areas of the first and second transmissive electrodes that are aligned with the at least one proximal region may have at least one connection slit through which may extend at least one connection track connected to areas of the first and second transmissive electrodes that are aligned with the at least one distal region, the at least one connection track extending to the outer edge of the first and second transmissive electrodes, the control system being connected to the at least one connection track at the outer edge for applying voltages to the at least one distal region. Advantageously the distal regions may be driven with desirable voltages.

The at least one connection track connected to the areas of the first and second transmissive electrodes that are aligned with the at least one distal region may not be aligned with each other across the layer of liquid crystal material. The visibility of the connection tracks may be reduced so that advantageously the distal region may appear away from the edge of the electrode with no visible connection to the distal mark region.

The control system may be arranged to apply respective voltage signals to the at least one connection track and to the at least one proximal region having amplitude and phase that may be selected to apply voltages across the first and second transmissive electrodes that drive the plural regions of the layer of liquid crystal material into a desired state in accordance with the mode of operation in each of the at least one distal region, the parts of the at least one proximal region aligned with the at least one connection track, and the remainder of the proximal regions. The layer of liquid crystal material in the mark region may be driven differently to the layer of liquid crystal material in the background region, being the inverse of the mark region. The electrodes may overlap with areas in the mark region to provide a first state of the layer of liquid crystal material. The electrodes may overlap with areas in the background region to provide at a second state of the layer of the liquid crystal material that is different to the first state.

The at least one connection track may have a neck of reduced width adjacent to the at least one distal region to which it may be connected. Advantageously the resistance of the connection electrode may be reduced, and the visibility of at least part of the connection electrode near to the distal region reduced. Alignment tolerances between the first and second electrodes may be relaxed advantageously reducing cost.

pi One of the first and second transmissive electrodes may be patterned to provide plural regions separated by gaps, and the other of the first and second transmissive electrodes may not be patterned. Advantageously cost and complexity may be reduced.

The plural regions may include at least one distal region that may not be adjacent to an outer edge of the first and second transmissive electrodes and at least one proximal region that may be adjacent to the outer edge of the first and second transmissive electrodes, wherein areas of at least one of the first and second transmissive electrodes that are aligned with the at least one distal region may be connected to areas of the same transmissive electrode that are aligned with the at least one proximal region by a connector that may be configured to provide a resistance between the connected areas. Advantageously cost and complexity of at least one of the first and second electrodes may be reduced.

According to a second aspect of the present disclosure, there is provided a display device for use in ambient illumination comprising: a spatial light modulator arranged to output light, wherein the spatial light modulator comprises a display polariser arranged on a side of the spatial light modulator, the display polariser being a linear polariser; a view angle control arrangement comprising: an additional polariser arranged on the same side of the of the spatial light modulator as the display polariser outside the display polariser, the additional polariser being a linear polariser; and at least one polar control retarder arranged between the display polariser and the additional polariser, the at least one polar control retarder including a switchable liquid crystal retarder comprising a layer of liquid crystal material, and first and second transmissive electrodes on opposite sides of the layer of liquid crystal material, wherein at least one of the first and second transmissive electrodes is patterned in areas separated by gaps to provide plural addressable regions of the layer of liquid crystal material, at least one of the plural regions being in a shape of a mark for display to an observer; and a control system arranged to control the spatial light modulator and to apply voltages across the first and second transmissive electrodes for driving the layer of liquid crystal material, wherein the control system is arranged to be operable in plural modes of operation, including: a wide-angle operational display mode, in which the control system controls the spatial light modulator to display an operational image and applies voltages across the first and second transmissive electrodes that drive the layer of liquid crystal material into the same state in different regions such that the operational image is visible at a wide angle and at a narrow angle, and the mark is not visible at the narrow angle or the wide angle; and at least one narrow-angle operational display mode, in which the control system controls the spatial light modulator to display an operational image and applies voltages across the first and second transmissive electrodes that drive the layer of liquid crystal material into different states in different regions such that the operational image is visible at the narrow angle but not at the wide angle, and the mark is not visible at the narrow angle, but is visible at the wide angle.

The mark may be visible to the snooper in the privacy mode of operation. The snooper may see a desirable image such as a logo or text that indicates that the display is in use by the user but the image seen by the display user is advantageously not visible. The aesthetic appearance of the display may be improved.

The display polariser may be an input polariser arranged on an input side of the spatial light modulator, and the additional polariser may be arranged on the input side of the display polariser.

The frontal reflectivity of the display may be reduced, advantageously achieving an improved 'black' image appearance which may be perceived as having higher aesthetic quality.

The display polariser may be an output polariser arranged on an output side of the spatial light modulator, and the additional polariser may be arranged on the output side of the display polariser. The view angle control arrangement may further comprise a reflective polariser arranged between the output polariser and the additional polariser, the reflective polariser being a linear polariser, and the at least one polar control retarder may be arranged between the reflective polariser and the additional polariser. The security factor may advantageously be increased for a given ratio of display illuminance to display maximum luminance. The aesthetic appearance and the contrast of the mark to the snooper may be increased.

The operational image may be visible, or may not be visible, when a security factor S. defined at the angle in question is, for all the regions, less than 1.0, or at least 1.0, respectively, where the security factor $S_n$ is given by the equation:

$$S_n = \log_{10}[1+\rho_n \cdot \alpha/(\pi \cdot P_n)]$$

wherein: $\rho_n$ is the reflectivity of the display device at the angle in question; $P_n$ is the ratio of the luminance of the display device at the angle in question to the maximum luminance of the display device; $\pi$ is a solid angle in units of steradians; and $\alpha$ is a factor having a value of 4.0 steradians. The mark may be visible, or may not be visible when the security factor $S_n$ defined at the angle in question may be different, or may be the same, respectively, in the at least one of the plural regions in a shape of a mark and in the other regions. The wide angle may be a polar angle of 45° from a normal to the display device at a predetermined azimuth angle around the normal to the display device. The narrow angle may be in a range of polar angles of from 0° to 20° from a normal to the spatial light modulator at the predetermined azimuth angle. Advantageously human factors measurements and illumination measurements may be used to achieve desirable image security to the snooper while providing visibility of the mark in at least mark display mode and privacy mark display mode of operation.

According to a third aspect of the present disclosure, there is provided a display device for use in ambient illumination comprising: a spatial light modulator arranged to output light, wherein the spatial light modulator comprises a display polariser arranged on a side of the spatial light modulator, the display polariser being a linear polariser; a view angle control arrangement comprising: an additional polariser arranged on the same side of the spatial light modulator as the display polariser outside the display polariser, the additional polariser being a linear polariser; and at least one polar control retarder arranged between the display polariser and the additional polariser, the at least one polar control retarder including a switchable liquid crystal retarder comprising a layer of liquid crystal material, and first and second transmissive electrodes on opposite sides of the layer of liquid crystal material, wherein each of the first and second transmissive electrodes is patterned in areas separated by gaps to provide plural addressable regions of the layer of liquid crystal material, at least one of the plural regions being in a shape of a mark for display to an observer. Advantageously share mode, privacy mode, and privacy mark modes of operation may be provided as described hereinabove. Further distal mark regions may be provided without visibility of connection electrodes.

According to a fourth aspect of the present disclosure, there is provided a display device for use in ambient illumination comprising: a spatial light modulator arranged to output light, wherein the spatial light modulator comprises a display polariser arranged on a side of the spatial light modulator, the display polariser being a linear polariser; a view angle control arrangement comprising: an additional polariser arranged on the same side of the spatial light modulator as the display polariser outside the display polariser, the additional polariser being a linear polariser; and at least one polar control retarder arranged between the display polariser and the additional polariser, the at least one polar control retarder including a switchable liquid crystal retarder comprising a layer of liquid crystal material, and first and second transmissive electrodes on opposite sides of the layer of liquid crystal material, wherein at least one of the first and second transmissive electrodes is patterned areas separated by gaps to provide plural addressable regions of the layer of liquid crystal material, at least one of the regions being in a shape of a mark for display to an observer, wherein the plural regions include at least one distal region that is not adjacent to an outer edge of the first and second transmissive electrodes and at least one proximal regions that is adjacent to the outer edge, wherein areas of at least one of the first and second transmissive electrodes that are aligned with the at least one distal region are connected to areas of the same transmissive electrode that are aligned with the at least one proximal region by a connector that is configured to provide a resistance between the connected areas. Advantageously the complexity and cost of at least one of the first and second transmissive electrodes may be reduced.

The at least one polar control retarder may further comprise a passive retarder. Advantageously the size of the polar region for which reduced luminance or increased reflectance is provided in the narrow angle mode or in at least part of the mark region or background region may be increased.

The spatial light modulator may be a transmissive spatial light modulator and the display device may further comprise a backlight arranged to supply light to the spatial light modulator. Advantageously the profile of luminous intensity with polar angle for backlight may be modified so that the off-axis luminance may be reduced and security factor may be increased.

The spatial light modulator may be an emissive spatial light modulator. Advantageously the thickness of the display device may be reduced.

According to a fifth aspect of the present disclosure, there is provided a privacy display apparatus comprising: a display device for use in ambient illumination comprising: a spatial light modulator arranged to output light, wherein the spatial light modulator comprises an output polariser arranged on the output side of the spatial light modulator, the output polariser being a linear polariser; a view angle control arrangement comprising: an additional polariser arranged on the output side of the output polariser, the additional polariser being a linear polariser; a reflective polariser arranged between the output polariser and the additional polariser, the reflective polariser being a linear polariser; and at least one polar control retarder arranged between the reflective polariser and the additional polariser, the at least one polar control retarder including a switchable liquid crystal retarder comprising a layer of liquid crystal material, and first and second transmissive electrodes on opposite sides of the layer of liquid crystal material, wherein at least one of the first and second transmissive electrodes is patterned to provide plural regions separated by gaps, at least one of the plural regions being in a shape of a mark for display to an observer; and a control system arranged to control the spatial light modulator and to apply voltages across the first and second transmissive electrodes for driving the layer of liquid crystal material, wherein the control system is arranged to be operable in plural modes of operation, including: a wide-angle operational display mode, in which the control system controls the spatial light modulator to display an operational image and applies voltages across the first and second transmissive electrodes that drive the layer of liquid crystal material into the same state in different regions; a narrow-angle operational display mode, in which the control system controls the spatial light modulator to display an operational image and applies voltages across the first and second transmissive electrodes that drive the layer of liquid crystal material into the same state in different regions; and at least one mark display mode in which the control system applies voltages across the first and second transmissive electrodes that drive the layer of liquid crystal material into different states in different regions such that the mark is visible. Advantageously a display device may be provided with a privacy mode in which the display may be observed with high image visibility with high uniformity by a user and provide an image with high security factor with high uniformity to a snooper. The display device may be provided with a share mode wherein the display may be observed by multiple observers with high image visibility and high uniformity. The display device may further be provided with a mode in which a mark may be observed for at least some observers. The mark may provide desirable information about the display such as being an icon or text.

The at least one mark display mode may include a mark display mode in which the control system controls the spatial light modulator to display no image and applies voltages across the first and second transmissive electrodes that drive the layer of liquid crystal material into different states in different regions such that the mark may be visible at wide angles but not narrow angles. Advantageously the power consumption of the mark display mode may be significantly reduced.

The at least one mark display mode may include a mark display mode in which the control system controls the spatial light modulator to display an illumination image for illuminating the mark and applies voltages across the first and second transmissive electrodes that drive the layer of liquid crystal material into the different states in different regions such that the mark may be visible at wide and narrow angles. The illumination image may be a still image. The illumination image may be aligned with the mark.

Advantageously multiple users may observe the mark and the mark may have desirable colours.

Each of the first and second transmissive electrodes may be patterned to provide plural regions separated by gaps, the plural regions of the first and second transmissive electrodes being aligned across the layer of liquid crystal material. Advantageously distal marks may be provided without visibility of connection electrodes.

The gaps separating plural regions of the first and second transmissive electrodes that are aligned across the layer of liquid crystal material may be offset. The offset may be at least twice the thickness of the layer of liquid crystal material. Advantageously the visibility of gaps between the plural regions may be reduced.

The plural regions may include island regions and peripheral regions extending around the island regions, and the peripheral regions that are aligned across the layer of liquid crystal material have bridging slits that may be aligned and through which extend bridging tracks connected to the island regions that may be aligned across the layer of liquid crystal material. Advantageously marks with island regions may be conveniently provided while achieving high uniformity in narrow angle and wide angle operational modes.

The plural regions may include at least one distal region that is not adjacent to an edge of the first and second transmissive electrodes and at least one proximal region that is adjacent to an edge of the first and second transmissive electrodes, and the first and second transmissive electrodes may be further patterned to provide at least one connection track connected to the at least one distal regions and extending to an edge of the first and second transmissive electrodes, at which edge the control system may be connected to the connection tracks for applying voltages to the at least one distal region. The connection tracks connected to distal regions of the first and second transmissive electrodes that are aligned across the layer of liquid crystal material may not be aligned with each other across the layer of liquid crystal material. The control system may be arranged to apply respective voltage signals to each of the at least one connection track connected to the distal regions of the first and second transmissive electrodes and to each of the at least one proximal region having amplitude and phase that are selected to apply voltages across the first and second transmissive electrodes that drive the layer of liquid crystal material into a desired state in accordance with the mode of operation in each of the distal region, the overlap between the connection tracks and the respective proximal regions and in the remainder of the proximal regions. Advantageously distal marks may be provided without visibility of connection electrodes. The resistance of the connection electrodes may be reduced and uniformity of operational modes may be increased.

The at least one connection track may have a neck of reduced width adjacent to the at least one distal region to which it may be connected. Advantageously the resistance of the connection electrode may be reduced, and the visibility of at least part of the connection electrode reduced.

One of the first and second transmissive electrodes may be patterned to provide plural regions separated by gaps, and the other of the first and second transmissive electrodes may not be patterned. Advantageously cost and complexity may be reduced.

The plural regions may include at least one distal region that is not adjacent to an edge of the first and second transmissive electrodes and at least one proximal region that is adjacent to an edge of the first and second transmissive electrodes, wherein the at least one distal region may be connected to the at least one proximal region by a connector that may be configured to provide a resistance between the at least one distal region and the at least one proximal region. Advantageously cost and complexity may be reduced.

According to a sixth aspect of the present disclosure, there is provided a display device for use in ambient illumination comprising: a spatial light modulator arranged to output light, wherein the spatial light modulator comprises an output polariser arranged on the output side of the spatial light modulator, the output polariser being a linear polariser; a view angle control arrangement comprising: an additional polariser arranged on the output side of the output polariser, the additional polariser being a linear polariser; a reflective polariser arranged between the output polariser and the additional polariser, the reflective polariser being a linear polariser; and at least one polar control retarder arranged between the reflective polariser and the additional polariser, the at least one polar control retarder including a switchable liquid crystal retarder comprising a layer of liquid crystal material, and first and second transmissive electrodes on opposite sides of the layer of liquid crystal material, wherein each of the first and second transmissive electrodes is patterned to provide plural regions separated by gaps, the plural regions of the first and second transmissive electrodes being aligned across the layer of liquid crystal material and at least one of the plural regions being in a shape of a mark for display to an observer.

The plural regions may include at least one distal region that is not adjacent to an edge of the first and second transmissive electrodes and at least one proximal region that is adjacent to an edge of the first and second transmissive electrodes, and the first and second transmissive electrodes may be further patterned to provide at least one connection track connected to the at least one distal region and extending to an edge of the first and second transmissive electrodes for connection to a control system.

The at least one connection track connected to the at least one distal region of the first and second transmissive electrodes that are aligned across the layer of liquid crystal material may not be aligned with each other across the layer of liquid crystal material.

The display device may further comprising a control system arranged to control the spatial light modulator and to apply voltages across the first and second transmissive electrodes for driving the layer of liquid crystal material, wherein the control system may be arranged to apply respective voltage signals to each of the at least one connection track connected to the distal regions of the first and second transmissive electrodes and to each of the at least one proximal region having amplitude and phase that may be selected to apply voltages across the first and second transmissive electrodes for driving the layer of liquid crystal material into a desired state in accordance with a mode of operation in each of the distal regions, the overlap between the at least one connection track and the at least one proximal region and in the remainder of the at least one proximal region.

According to a seventh aspect of the present disclosure, there is provided display device for use in ambient illumination comprising: a spatial light modulator arranged to output light, wherein the spatial light modulator comprises an output polariser arranged on the output side of the spatial light modulator, the output polariser being a linear polariser; a view angle control arrangement comprising: an additional polariser arranged on the output side of the output polariser, the additional polariser being a linear polariser; a reflective polariser arranged between the output polariser and the additional polariser, the reflective polariser being a linear polariser; and at least one polar control retarder arranged between the reflective polariser and the additional polariser, the at least one polar control retarder including a switchable liquid crystal retarder comprising a layer of liquid crystal material, and first and second transmissive electrodes on opposite sides of the layer of liquid crystal material, wherein at least one of the first and second transmissive electrodes is patterned to provide plural regions separated by gaps, at least one of the regions being in a shape of a mark for display to an observer, wherein the plural regions include at least one distal region that is not adjacent to an edge of the first and second transmissive electrodes and at least one proximal regions that is adjacent to an edge, wherein the at least one distal region is connected to the at least one proximal region by a connector that is configured to provide a resistance between the at least one distal region and the at least one proximal region.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1F is a schematic graph illustrating the polar variation of reflectivity for a polar control retarder of FIG. 1A when the electrodes are arranged to drive the liquid crystal retarder layer for high off-axis reflectivity;

FIG. 1G is a schematic graph illustrating the polar variation of reflectivity for a polar control retarder of FIG. 1A when the electrodes are arranged to drive the liquid crystal retarder layer for low off-axis reflectivity;

FIG. 5A is a schematic diagram illustrating a front perspective view of a laptop computer comprising a switchable privacy display operating in mark privacy mode comprising a patterned electrode liquid crystal polar control retarder wherein the patterned electrodes are driven with different voltages and wherein image data is provided on the spatial light modulator;

FIG. 5B is a schematic diagram illustrating a look-down off-axis perspective view of a laptop illuminated by an ambient light source comprising a switchable privacy display operating in mark privacy mode comprising a patterned electrode liquid crystal polar control retarder wherein the patterned electrodes are driven with different voltages and wherein image data is provided on the spatial light modulator;

FIG. 5C is a schematic diagram illustrating a look-down off-axis perspective view of a laptop computer comprising a switchable privacy display operating in full screen privacy mode;

FIG. 5D is a schematic diagram illustrating a look-down off-axis perspective view of a laptop computer comprising a switchable privacy display operating in mark privacy mode comprising a patterned electrode liquid crystal polar control retarder with no reflective polariser wherein the patterned electrodes are driven with different voltages and wherein image data is provided on the spatial light modulator;

FIG. 11A is a schematic phase diagram of the respective phases for driving the arrangement of FIGS. 8A-D in the mark display mode by means of phase control;

FIG. 11B is a schematic diagram illustrating exemplary voltage signals for the addressing of the patterned electrodes of FIGS. 8A-D comprising constant amplitude voltages and phase shift control;

FIG. 12A is a schematic diagram illustrating a top view of the top electrode of the switchable liquid crystal polar control retarder for a mark with an island region;

FIG. 12B is a schematic diagram illustrating a top view of the bottom electrode of the switchable liquid crystal polar control retarder for a mark with an island region;

FIG. 12C is a schematic diagram illustrating a top view of the alignment of top and bottom electrodes of FIGS. 12A-B of the switchable liquid crystal polar control retarder for a mark with an island region;

FIG. 16 is a schematic diagram illustrating a top view of alternative electrodes of the switchable liquid crystal polar control retarder;

FIG. 17A, FIG. 17B, and FIG. 17C are schematic diagrams illustrating a top view of connector of the top electrode of FIG. 16;

FIG. 18 is a schematic circuity diagram illustrating the driving of the voltages across the electrodes of FIG. 16;

DETAILED DESCRIPTION

Figure 1A:
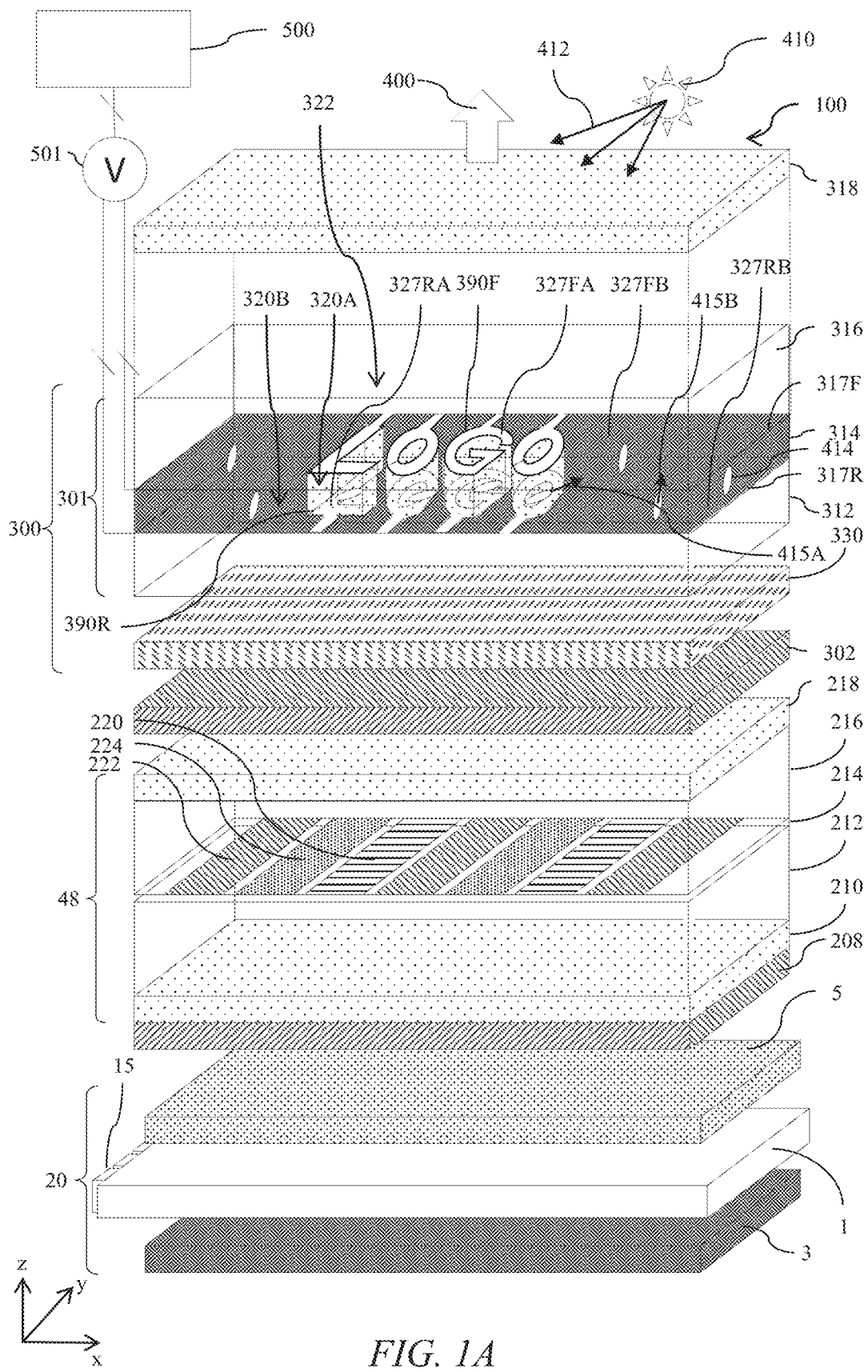
FIG. 1A is a schematic diagram illustrating a front perspective view of a privacy display arranged to operate in ambient illumination and comprising a transmissive spatial light modulator illuminated by a backlight, a reflective polariser and a polar control retarder comprising a liquid crystal polar control retarder comprising patterned electrodes.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/i \qquad \text{eqn. 5}$$

so the visual security level may be further given as:

$$V=(P \cdot Y_{max}+I \cdot \rho/\pi)/(P \cdot (Y_{max}-Y_{max}/C)) \qquad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; $\pi$ is a solid angle factor (with units steradians) and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur may at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. allowing the visual security level to be approximated to:

$$V=1+I \cdot \rho/(\pi \cdot P \cdot Y_{max}) \qquad \text{eqn. 7}$$

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that a Security Factor, S is given by $$S = \log_{10}(V) \qquad \text{eqn. 8}$$

$$S = \log_{10}(1 + \alpha \cdot \rho/(\pi \cdot P)) \qquad \text{eqn. 9}$$

where $\alpha$ is the ratio of illuminance I to maximum luminance $Y_{max}$.

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by and measuring the variation of recorded reflective luminance with polar viewing angle taking into account the variation of reflectivity $\rho(\theta)$. The measurements of $P(\theta)$, $\rho(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=0)$, for different background lighting conditions and for different observers.

From the above measurements S<1.0 provides low or no visual security, and S≥1 makes the image not visible. In the range 1.0≤S<1.5, even though the image is not visible for practical purposes, some features of the image may still be perceived dependent on the contrast, spatial frequency and temporal frequency of image content, whereas in the range 1.5≤S<1.8, the image is not visible for most images and most observers and in the range S≥1.8 the image is not visible, independent of image content for all observers.

In practical display devices, this means that it is desirable to provide a value of S for an off-axis viewer who is a snooper that meets the relationship $S \geq S_{min}$, where: $S_{min}$ has a value of 1.0 or more to achieve the effect that in practical terms the displayed image is not visible to the off-axis viewer.

At an observation angle $\theta$ in question, the security factor $S_n$ for a region of the display labelled by the index n is given from eqn. 8 and eqn. 9 by:

$$S_n(\theta) = \log_{10}[1 + \rho_n(\theta) \cdot \alpha(\theta)/(\pi \cdot P_n(\theta))] \qquad \text{eqn. 10}$$

where: $\alpha$ is the ratio of illuminance $I(\theta)$ onto the display that is reflected from the display to the angle in question and with units lux (lumen·m$^{-2}$), to maximum luminance $Y_{max}$ with units of nits (lumen·m$^{-2}$·sr$^{-1}$) where the units of $\alpha$ are steradians, $\pi$ is a solid angle in units of steradians, $\rho_n(\theta)$ is the reflectivity of the display device along the observation direction in the respective n$^{th}$ region, and $P_n(\theta)$ is the ratio of the luminance of the display device along the observation direction in the respective n$^{th}$ region.

In human factors measurement, it has been found that desirable privacy displays of the present embodiments described hereinbelow typically operate with security factor $S_n \geq 1.0$ at the observation angle when the value of the ratio $\alpha$ of illuminance I to maximum luminance $Y_{max}$ is 4.0. For example the illuminance $I(\theta = -45°)$ that illuminates the display and is directed towards the snooper at the observation direction ($\theta = +45°$) after reflection from the display may be 1000 lux and the maximum display illuminance $Y_{max}$ that is provided for the user may be 250 nits. This provides an image that is not visible for a wide range of practical displays.

More preferably, the display may have improved characteristics of reflectivity $\rho_n(\theta = 45°)$ and privacy $P_n(\theta = 45°)$ by operating with security factor $S_n \geq 1.0$ at the observation angle when the ratio $\alpha$ is 2.0. Such an arrangement desirably improves the relative perceived brightness and contrast of the display to the primary user near to the direction of $Y_{max}$ while achieving desirable security factor, $S_n \geq 1.0$. Most preferably, the display may have improved characteristics of reflectivity $\rho_n(\theta = 45°)$ and privacy $P_n(\theta = 45°)$ by operating with security factor $S_n \geq 1.0$ at the observation angle when the ratio $\alpha$ is 1.0. Such an arrangement achieves desirably high perceived brightness and contrast of the display to the primary user near to the direction of $Y_{max}$ in comparison to the brightness of illuminated regions around the display, while achieving desirable security factor, $S_n \geq 1.0$ for an off-axis observer 47 at the observation direction.

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.2 may provide acceptable visibility (perceived contrast ratio) of the displayed image and more desirably S<0.1. In practical display devices, this means that it is desirable to provide a value of S for an on-axis viewer who is the intended user of the display device that meets the relationship $S \geq S_{max}$, where $S_{max}$ has a value of 0.2.

In the present discussion the colour variation $\Delta\varepsilon$ of an output colour $(u_w' + \Delta u', v_w' + \Delta v')$ from a desirable white point $(u_w', v_w')$ may be determined by the CIELUV colour difference metric, assuming a typical display spectral illuminant and is given by:

$$\Delta\varepsilon = (\Delta u'^2 \Delta v'^2)^{1/2} \qquad \text{eqn. 11}$$

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

FIG. 1A is a schematic diagram illustrating a front perspective view of a privacy display device 100 arranged to operate (in various modes as will be described) when illuminated by an ambient light source 410 and comprising a transmissive spatial light modulator 48 illuminated by a backlight 20, a reflective polariser 302 and a polar control retarder 300 comprising passive retarder 330, and a liquid crystal polar control retarder 301 comprising patterned electrodes 317F, 317R.

A display device 100 for use in ambient illumination 410 comprises: a spatial light modulator 48 arranged to output light, wherein the spatial light modulator 48 comprises an output polariser 218 arranged on the output side of the spatial light modulator 48, the output polariser 218 being a linear polariser; a view angle control arrangement comprising: an additional polariser 318 arranged on the output side of the output polariser 218, the additional polariser 318 being a linear polariser; a reflective polariser 302 arranged between the output polariser 218 and the additional polariser 318, the reflective polariser 302 being a linear polariser; and at least one polar control retarder 300 arranged between the reflective polariser 302 and the additional polariser 318, the at least one polar control retarder 300 including a switchable liquid crystal retarder 301 comprising a layer 314 of liquid crystal material 414, and first and second transmissive electrodes 317F, 317R on opposite sides of the layer 314 of liquid crystal material 414.

At least one of the first and second transmissive electrodes 317F, 317R is patterned in areas 327A, 327B separated by gaps 390. In the embodiment of FIG. 1A, the first transmissive electrode 317F is patterned with areas 327FA, 327FB and the second transmissive electrode 317R is patterned with areas 327RA, 327RB.

The electrodes 317F, 317R provide plural addressable regions 320A, 320B of the layer 314 of liquid crystal material 414, being plural addressable mark regions 320A (or in a more general case at least one addressable mark region 320A) in a shape of a mark 322 for display to an off-axis observer 47, and plural addressable background regions 320B in the shape of the background to the mark 322 (i.e. the inverse of the mark 322). In at least one of the modes of operation of the display device 100, the regions 320A, 320B are addressed with a desirable drive scheme, illustrative examples of which will be described hereinbelow, such that the alignment direction 415A of the liquid crystal material 414 in the mark region 320A is different to the alignment direction 415B of the liquid crystal material 414 in the background region 320B.

In the embodiment of FIG. 1A, both of the first and second transmissive electrodes 317F, 317R are patterned with areas 327FA, 327FB, 327RA, 327RB that are in the shape of a mark 322 that comprises the text 'LOGO'. More generally the mark 322 may be an icon or text or some other graphical image.

A control system 500 is arranged to control the spatial light modulator 48 and to apply voltages across the first and second transmissive electrodes 317F, 317R for driving the layer 314 of liquid crystal material 414.

The at least one polar control retarder 300 further comprises a passive retarder 330.

The spatial light modulator 48 is a transmissive spatial light modulator 48 and the display device 100 further comprises a backlight 20 arranged to supply light to the spatial light modulator 48.

The structure of the display device 100 will now be described in further detail.

The display device 100 comprises a backlight 20 arranged to output light 400 and a transmissive spatial light modulator 48 arranged to receive output light from the backlight 20.

The backlight apparatus 20 comprises a rear reflector 3 and a waveguide arrangement comprising waveguide 1, light sources 15, and light control components 5 that may comprise optical elements such as light turning films or brightness enhancement films, as well as diffusers and arranged to receive light exiting from the waveguide 1 and direct through the spatial light modulator 48.

In an alternative embodiment, the light sources 15 may comprise a mini-LED array, the waveguide 1 may be omitted and colour conversion films and light scattering films may be provided to illuminate the spatial light modulator 48. Advantageously increased dynamic range and brightness may be achieved.

In the embodiment of FIG. 1A, the spatial light modulator 48 may comprise a liquid crystal display device comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers such as an iodine polariser on stretched PVA.

Optionally a reflective polariser 208 may be provided between the backlight 20 and the input polariser 210 to improve the efficiency of output light from the backlight 20. The reflective polariser 208 is different to the reflective polariser 302 described hereinbelow. Reflective polarisers 208, 302 may be provided by materials such as DBEF™ or APF™ from 3M Corporation.

Additional polariser 318 is arranged on the output side of the spatial light modulator 48 as the additional polariser 318 being a linear polariser. Reflective polariser 302 is arranged between the additional polariser 318 and the output polariser 218. The display output polariser 218, reflective polariser 302 and the additional polariser 318 have electric vector transmission directions respectively that are parallel, and orthogonal to the input polariser 218 transmission direction. Advantageously transmission efficiency is increased.

Polar control retarder 300 is arranged between the reflective polariser 302 and the display polariser 218, the polar control retarder 300 including a switchable liquid crystal retarder 301 comprising a layer 314 of liquid crystal material 414 arranged between substrates 312, 316 that are provided with transparent electrodes 317F, 317R.

The structure of the switchable liquid crystal retarder 301 will be further described with reference to FIGS. 15A-C hereinbelow.

The polar control retarder of FIG. 1A further comprises at least one passive compensation retarder 330. Such passive compensation retarder 330 may comprise C-plates, A-plates or combination thereof and advantageously achieves an increased size of polar region over which reduced luminance and increased reflectivity can be achieved as will be described hereinbelow.

The display device 100 is illuminated by light rays 412 from an ambient light source 410.

The structure and operation of the polar control retarder 300, additional polariser 318 and reflective polariser is described further hereinbelow with respect to FIGS. 21A-D and in U.S. Pat. No. 10,976,578, which is herein incorporated by reference in its entirety.

The electrode 317F comprises first and second areas 327FA, 327FB separated by gaps 390F and the electrode 317R comprises first and second areas 327RA, 327RB separated by gaps 390R. In the embodiment of FIG. 1A, the electrode 317F is shown as between the electrode 317R and the additional polariser 318. In an alternative embodiment of FIG. 1A and in alternative embodiments of those described hereinbelow, the electrode 317R may be arranged between the electrode 317F and the additional polariser 318.

Control system 500 is arranged to provide control of voltage driver 501 that is arranged drive the voltage to the electrode areas 327FA, 327FB, 327RA, 327RB respectively, as will be described hereinbelow.

Figure 1B:
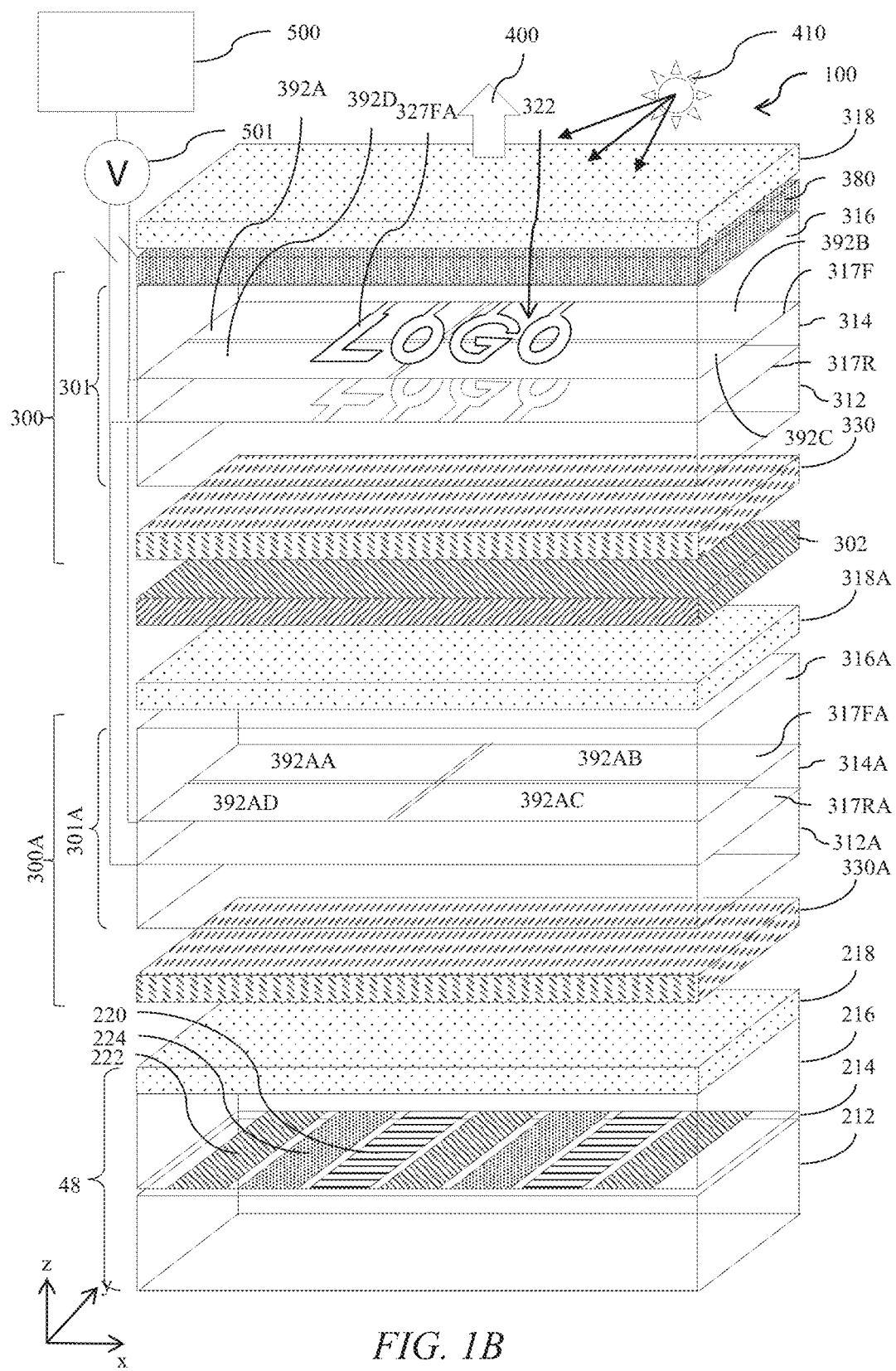
FIG. 1B is a schematic diagram illustrating a front perspective view of a privacy display arranged to operate in ambient illumination and comprising an emissive spatial light modulator, a reflective polariser and a polar control retarder comprising a liquid crystal polar control retarder comprising patterned electrodes and further comprising a colour filter layer.

FIG. 1B is a schematic diagram illustrating a front perspective view of a privacy display device 100 arranged to operate when illuminated by an ambient light source 410 and comprising an emissive spatial light modulator 48, a reflective polariser 302 and a polar control retarder 300 comprising a liquid crystal polar control retarder 301 comprising patterned electrodes 317F, 317R and further comprising an optional colour filter layer 380. Features of the embodiment of FIG. 1B not discussed in further detail may be assumed to correspond to the features with equivalent reference numerals as discussed above, including any potential variations in the features.

The alternative embodiment of FIG. 1B differs from the arrangement of FIG. 1A in several respects. In a first aspect spatial light modulator 48 is an emissive spatial light modulator 48 and has no input polariser 210.

A further additional polariser 318A is provided between the reflective polariser 302 and the output polariser 218. Further polar control retarder 300A comprising further liquid crystal retarder 301A and passive compensation retarder 330A is provided between the further additional polariser 318A and the output polariser 218. Further liquid crystal retarder 301 comprises transparent substrates 312A, 316A and liquid crystal layer 314A between uniform electrodes 317FA, 317RA.

In comparison to the arrangement of FIG. 1A, the spatial light modulator 48 may provide a light cone that has higher luminance in off-axis positions, such that the security factor, S is lower than that which may be achievable by a directional backlight 20. The additional polar control retarder 300A may advantageously achieve reduced off-axis luminance in privacy mode and image visibility from wide viewing positions in share mode. Advantageously security factor may be increased for privacy display operation.

In the alternative embodiment of FIG. 1B, the electrodes 317F may further comprise segmented regions 392A-D respectively as will be described further hereinbelow. The additional polar control retarder 301A may comprise one of the electrodes 317AF, 317AR that is also segmented in regions 392AA-AD, although may not have the mark 322. The segments 392A-D and 392AA-AD may be aligned respectively. Advantageously a display device comprising mixed wide angle and privacy regions may be provided. The segments may be quadrants as shown, may be linear stripes or may have some other shapes.

In the alternative embodiment of FIG. 1B a colour filter 380 is provided between the reflective polariser 302 and the additional polariser 318. The reflected light rays may have a colour that is modified by the double pass through the colour filter 380 to provide a colour that matches the aesthetics of the environment or to match a brand colour for example. The colour of light output from the spatial light modulator 48 that has a single pass through the colour filter 380 may be modified to provide an appropriate white point.

The alternatives of FIG. 1B may further be applied to the arrangement of FIG. 1A. The further additional polariser 318A may be provided between the backlight 20 and the input display polariser 210. The polar control retarder 300A may be provided between the input display polariser 210 and the further additional polariser 318A. Advantageously increased off-axis luminance control may be achieved.

Figure 1C:
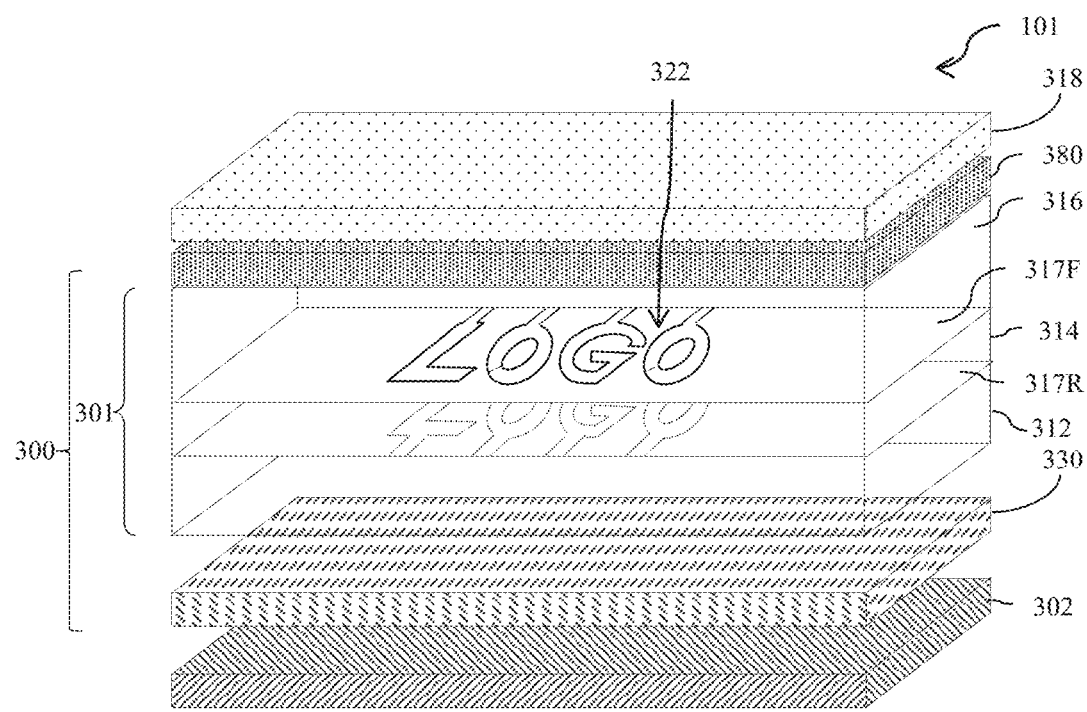
FIG. 1C is a schematic diagram illustrating a front perspective view of a view angle control optical element comprising a reflective polariser and a polar control retarder comprising a liquid crystal polar control retarder comprising patterned electrodes and further comprising a colour filter layer.

FIG. 1C is a schematic diagram illustrating a front perspective view of a view angle control optical element 101 comprising a reflective polariser 302 and a polar control retarder 300 comprising at least one passive retarder 330 and a liquid crystal polar control retarder 301 comprising patterned electrodes 317F, 317R and further comprising a colour filter layer 380. Features of the embodiment of FIG. 1C not discussed in further detail may be assumed to correspond to the features with equivalent reference numerals as discussed above, including any potential variations in the features.

In the alternative embodiment of FIG. 1C, a view angle control element 101 may be provided for use with a spatial light modulator 48. Advantageously a switchable privacy function may be achieved.

An illustrative arrangement of polar control retarder 300 is provided in TABLE 1 comprising a liquid crystal layer 314 with anti-parallel homogeneous alignment layers 417F, 417R (as described further hereinbelow). The alignment directions oriented parallel to the y-axis (rotated with respect to the horizontal display axis). A passive control retarder 330 comprising crossed A-plates 330A, 330B, and with share mode voltage that is approximately three times greater than privacy mode voltage. The voltage signals 520 are DC balanced and have square, sinusoidal or other shapes. Typically in operation the liquid crystal material 414 of the liquid crystal layer 314 responds to the rms voltage of the addressing voltages.

TABLE 1

| Layer | Alignment type | LC layer 314 retardance | Additional passive retarder 330 type | Additional passive retarder 330 retardance | Addressing voltage (privacy) | Addressing voltage (share) |
|---|---|---|---|---|---|---|
| 417F | Homogeneous | 750 nm | | | 2.3 V | >5 V |
| 417R | Homogeneous | | | | | e.g. 6.9 V |
| 330 | | | Negative C-plate | +450 nm | | |

P411 In the illustrative embodiment of TABLE 1 the addressing voltage for the privacy mode is desirably 2.3V. The addressing voltage for the share mode is typically >5V above which the realignment of the liquid crystal material 414 of the layer 314 is substantially saturated. An addressing voltage of three times the privacy voltage for share mode is thus a desirable level.

Structures with no reflective polariser 302 will now be described.

Figure 1D:
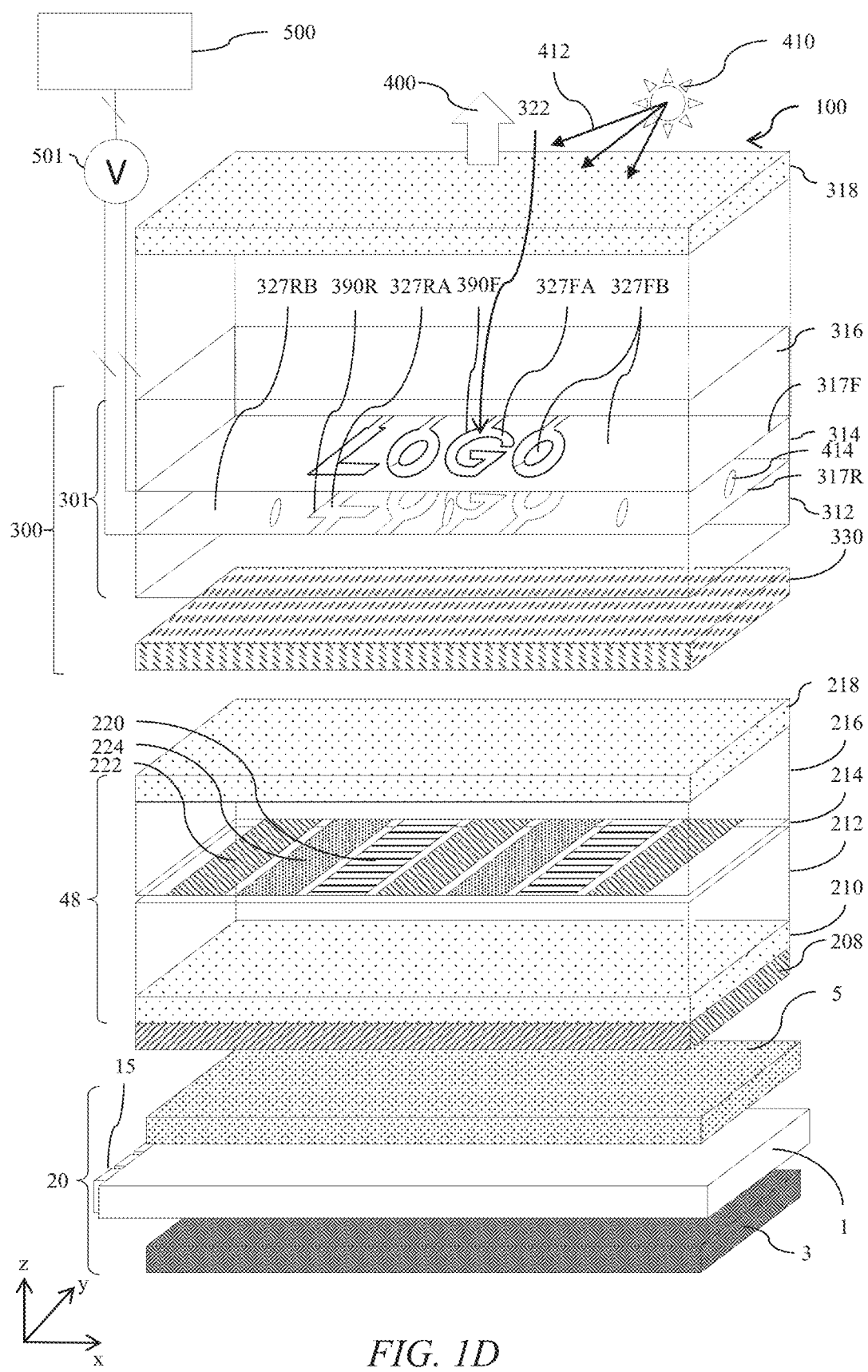
FIG. 1D is a schematic diagram illustrating a front perspective view of a privacy display device comprising a transmissive spatial light modulator illuminated by a backlight, an absorptive output display polariser and a polar control retarder comprising a liquid crystal polar control retarder comprising patterned electrodes.

FIG. 1D is a schematic diagram illustrating a front perspective view of a privacy display device 100 comprising a transmissive spatial light modulator 48 illuminated by a backlight 20, an absorptive output display polariser 218 and a polar control retarder 300 comprising a liquid crystal polar control retarder 301 comprising patterned electrodes 317F, 317R. Features of the embodiment of FIG. 1D not discussed in further detail may be assumed to correspond to the features with equivalent reference numerals as discussed above, including any potential variations in the features.

A display device 100 for use in ambient illumination 410 comprises a spatial light modulator 48 arranged to output light, wherein the spatial light modulator 48 comprises a display polariser arranged on a side of the spatial light modulator 48, the display polariser being a linear polariser and in FIG. 1D being the output polariser 218 arranged on the output side of the spatial light modulator 48. A view angle control arrangement comprises: an additional polariser 318 arranged on the same side of the spatial light modulator 48 as the display polariser, the additional polariser 318 being a linear polariser. At least one polar control retarder 300 is arranged between the display polariser 218 and the additional polariser 318, the at least one polar control retarder 300 including a switchable liquid crystal retarder 301 comprising a layer 314 of liquid crystal material 414, and first and second transmissive electrodes 317F, 317R on opposite sides of the layer 314 of liquid crystal material 414, wherein at least one of the first and second transmissive electrodes 317F, 317R is patterned in areas 327FA, 327FB, 327RA, 327RB separated by gaps 390F, 390R to provide plural addressable regions 320A, 320B of the layer 314 of liquid crystal material 414, at least one of the plural regions 320A, 320B being in a shape of a mark 322 for display to an observer 47.

The arrangement of FIG. 1D may further be provided by an alternative embodiment in which the spatial light modulator 48 comprises an emissive display and the backlight 20 is omitted.

In comparison to the embodiment of FIG. 1A, the alternative embodiment of FIG. 1D illustrates that the reflective polariser 302 may be omitted. Light 412 from the ambient light source 410 is reflected by the front surface of the additional polariser 318, however the display reflectivity p is determined by Fresnel reflections and modulated by surface roughness in the case a front surface diffusion is provided. Advantageously the stack complexity and cost is reduced. Display device 100 reflectivity may be reduced so that in the share mode increased image contrast is achieved for the display observers 45, 47; and to provide a blacker appearance display in the off-mode of operation. Advantageously an improved aesthetic appearance may be achieved.

As will be described in FIG. 5D hereinbelow, in operation in a mark privacy mode, then the security factor $S_A$ provided by the distal mark regions 320A may be provided to be different to the security factor $S_B$ provided by the proximal distal background regions 320B such that the mark 322 may be visible in mark privacy mode as difference in contrast of the outputted luminance between the distal mark region 320A and proximal background region 320B.

Figure 1E:
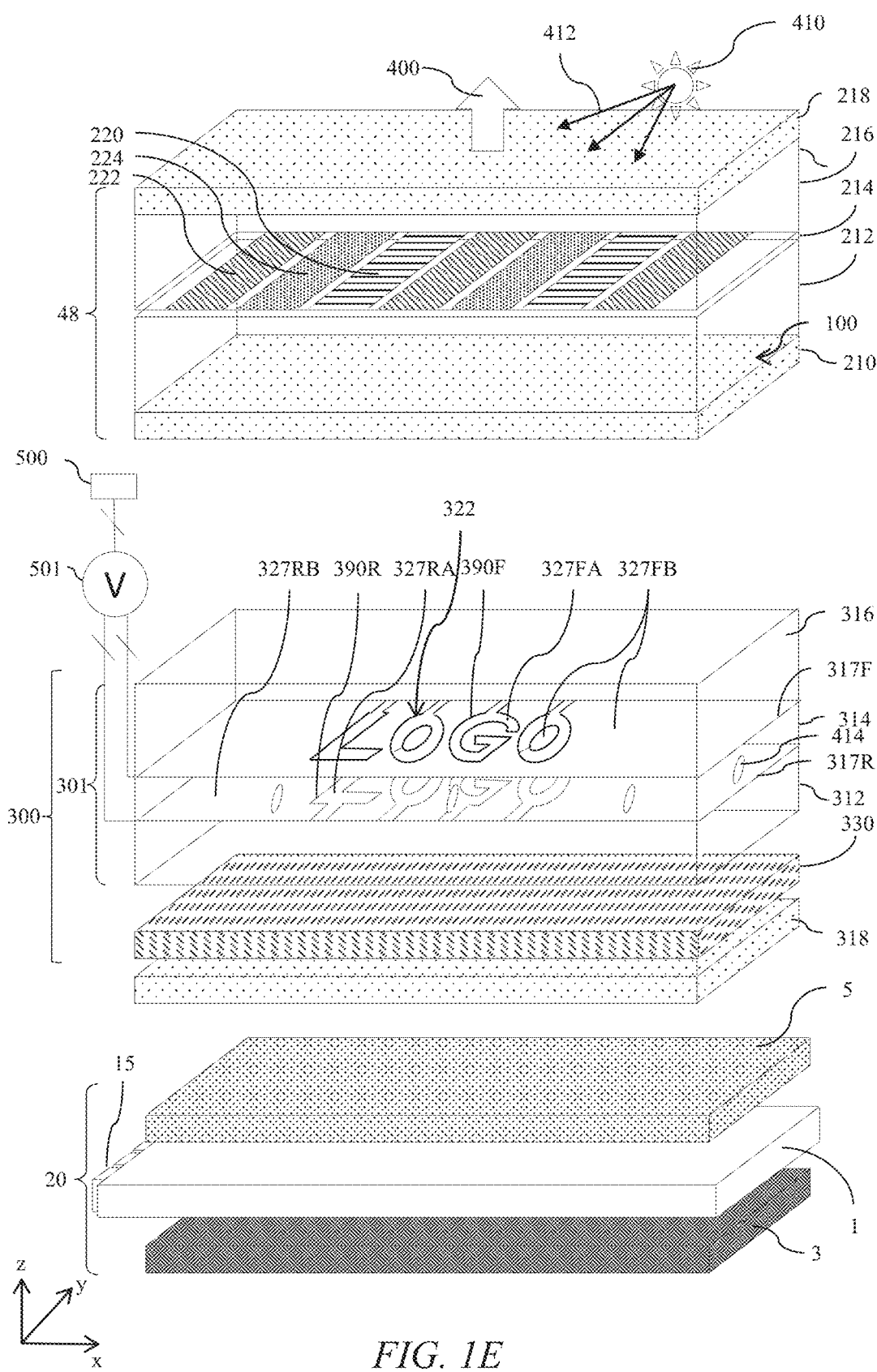
FIG. 1E is a schematic diagram illustrating a front perspective view of a privacy display device comprising a backlight, a polar control retarder comprising a liquid crystal polar control retarder comprising patterned electrodes and a transmissive spatial light modulator comprising an absorptive input display polariser.

FIG. 1E is a schematic diagram illustrating a front perspective view of a privacy display device 100 comprising a backlight 20, a polar control retarder 300 comprising a liquid crystal polar control retarder 301 comprising patterned electrodes 317F, 317R and a transmissive spatial light modulator 48 comprising an absorptive input display polariser 210. Features of the embodiment of FIG. 1E not discussed in further detail may be assumed to correspond to the features with equivalent reference numerals as discussed above, including any potential variations in the features.

In comparison to the embodiment of FIG. 1D, in the alternative embodiment of FIG. 1E the display polariser is a linear polariser being the input polariser 210 arranged on the input side of the spatial light modulator 48. The additional polariser 318 is arranged on the input side of the spatial light modulator 48. The at least one polar control retarder 300 is arranged between the input polariser 210 and the additional polariser 318.

In comparison to the embodiment of FIG. 1D, in the alternative embodiment of FIG. 1E, the display polariser is the input polariser 210 of the spatial light modulator 48 and the liquid crystal polar control retarder 301 comprising the patterned electrodes 317F, 317R is arranged between the additional polariser 318 and the input polariser 210.

Advantageously the visibility of residual reflections from the patterned electrodes 317F, 317R that may be visible in the arrangement of FIG. 1D may be reduced and an improved black appearance for the display device 100 achieved.

Figure 1H:
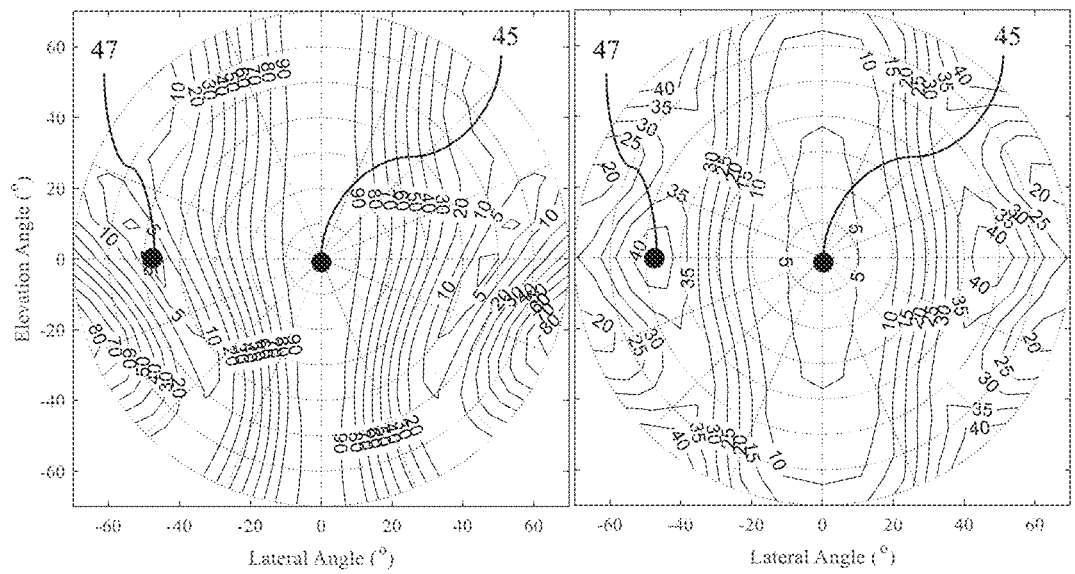
FIG. 1H is a schematic graph illustrating the polar variation of luminance of an illustrative backlight of FIG. 1A.
Figure 1H:
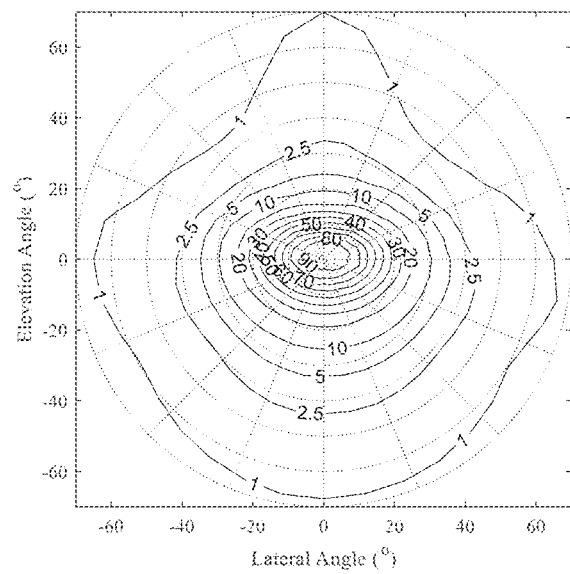

FIG. 1F is a schematic graph illustrating the polar variation of reflectivity for a polar control retarder 300A of FIG. 1A and the illustrative embodiment of TABLE 1 when the electrodes 317F, 317R are arranged to drive the liquid crystal layer 314 for high off-axis reflectivity; FIG. 1G is a schematic graph illustrating the polar variation of reflectivity for a polar control retarder 300A of FIG. 1A and the illustrative embodiment of TABLE 1 when the electrodes 317F, 317R are arranged to drive the liquid crystal layer 314 for low off-axis reflectivity; and FIG. 1H is a schematic graph illustrating the polar variation of luminance of an illustrative backlight 20 of FIG. 1A. Polar locations 445, 447 of exemplary observers 45, 47 are illustrated.

Variation of security factor with polar angle for different arrangements will now be described.

Figures 1I, 1J:
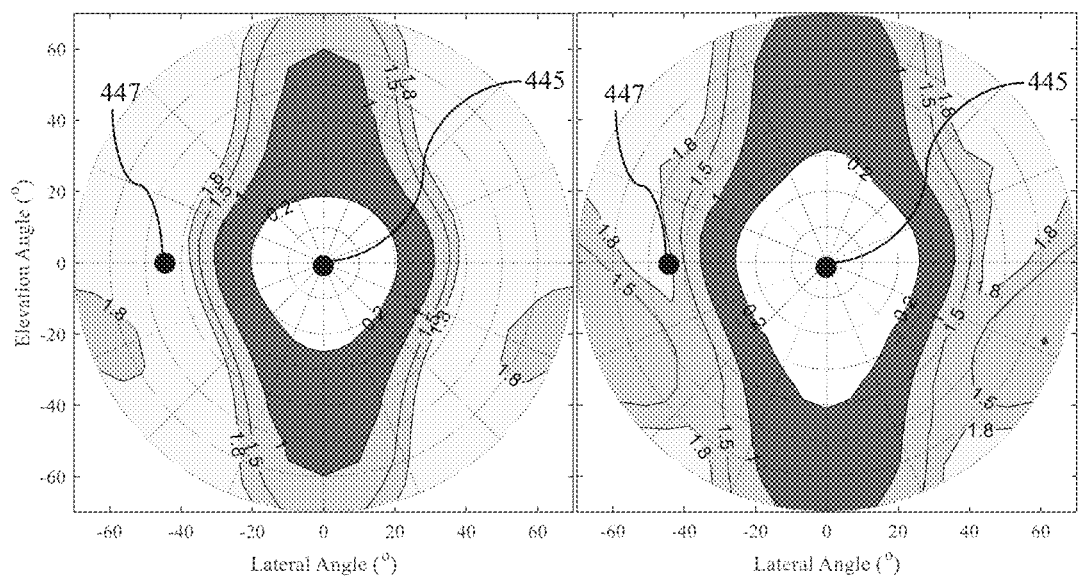
FIG. 1I is a schematic graph illustrating the polar variation of security factor for the display of FIG. 1A and TABLE 1 operating in privacy mode for a lux per nit ratio α of 4.0.
FIG. 1J is a schematic graph illustrating the polar variation of security factor for the display of FIG. 1A and TABLE 1 operating in privacy mode for a lux per nit ratio α of 1.0.
Figures 1K, 1L:
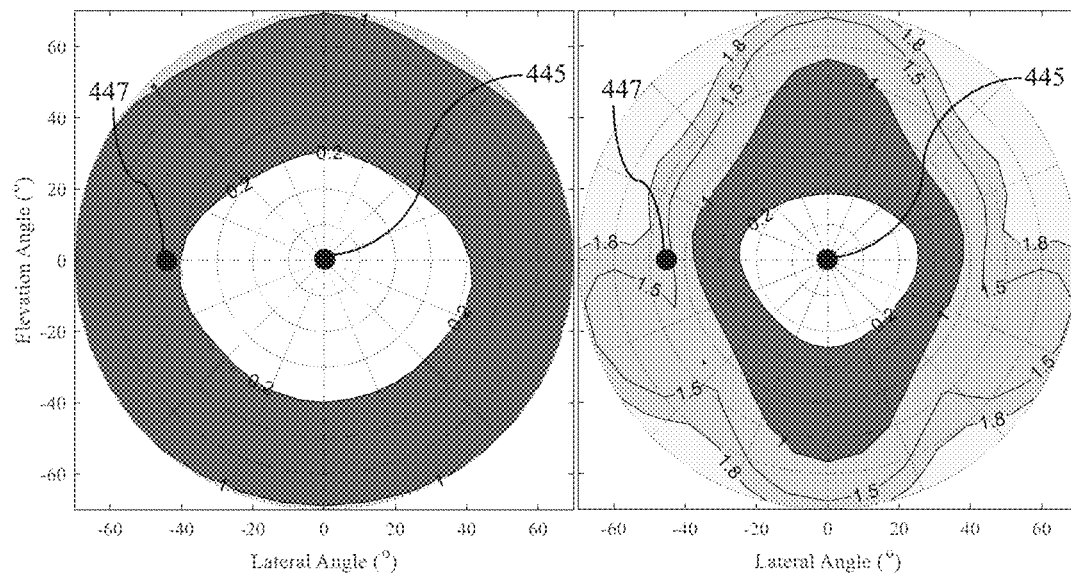
FIG. 1K is a schematic graph illustrating the polar variation of security factor for the display of FIG. 1A and TABLE 1 operating in share mode for a lux per nit ratio α of 1.0.
FIG. 1L is a schematic graph illustrating the polar variation of security factor for the display of FIG. 1E and TABLE 1 operating in privacy mode for a lux per nit ratio α of 4.0.

FIG. 1I is a schematic graph illustrating the polar variation of security factor S for the display of FIG. 1A and TABLE 1 with the backlight 20 profile of FIG. 1H operating in privacy mode for a lux per nit ratio α of 4.0; FIG. 1J is a schematic graph illustrating the polar variation of security factor S for the display of FIG. 1A and TABLE 1 with the backlight 20 profile of FIG. 1H operating in privacy mode for a lux per nit ratio α of 1.0; FIG. 1K is a schematic graph illustrating the polar variation of security factor S for the display of FIG. 1A and TABLE 1 with the backlight 20 profile of FIG. 1H operating in share mode for a lux per nit ratio α of 1.0; and FIG. 1L is a schematic graph illustrating the polar variation of security factor S for the display of FIG. 1E and TABLE 1 with the backlight 20 profile of FIG. 1H operating in privacy mode for a lux per nit ratio α of 4.0. Features of the embodiment of FIGS. 1H-K not discussed in further detail may be assumed to correspond to the features with equivalent reference numerals as discussed above, including any potential variations in the features.

In the present description, the term 'polar angle' refers to the direction of viewing of the display by an observer 45, 47. In the following description, the polar angle is described using a coordinate convention having an elevation coordinate angle and a lateral coordinate angle. In an alternative coordinate convention the polar angle may have a polar coordinate angle (which is different to the polar angle referred to herein) which is the angle of inclination from the normal direction to a plane, and the azimuthal coordinate angle which is the rotation angle in the said plane from a reference direction in said plane.

Referring to FIGS. 1H-K, the nominal polar angle for an on-axis observer 45 is marked by polar angle 445 and the nominal polar angle for an on-axis observer 47 is marked by polar angle 447. Contours of iso-security factor are illustrated that indicate the size of the polar regions for which various levels of image security are achieved as established by human factors measurement described hereinabove.

FIGS. 1H-I illustrate the variation in security factor, S of the privacy mode (light cone 401) for different illumination conditions. In the narrow angle mode of operation, the size of the narrow angle light cone 401 may be illustrated by the polar area for which S<0.2 so that the observer 45 at polar angle 445 sees the image. Reducing the ratio α of illuminance to maximum display luminance (which in FIGS. 1H-K is in the normal direction to the plane of the display device 100) reduces the size of the polar region for which S≥1.

FIG. 1K illustrates the security factor, S in the share mode of operation, that is for the light cone 402. In the share mode of operation, the wide angle light cone 402 may be the polar area for which S<1.0. In the embodiment of FIG. 1K, the security factor Sat the observer 47 polar angle 447 is close to 0.2, and thus the image will be clearly visible although perhaps not with the most desirable contrast ratio.

By way of comparison with FIG. 11, FIG. 1L illustrates the effect of removing the reflective polariser 302 from the optical stack, reducing the display reflectivity ρ. Thus the security factor S at the observer 47 is not as high as achievable with the optical stack of FIG. 1A.

The control system 500 is arranged to be operable in plural modes of operation as will now be described.

Figure 2A:
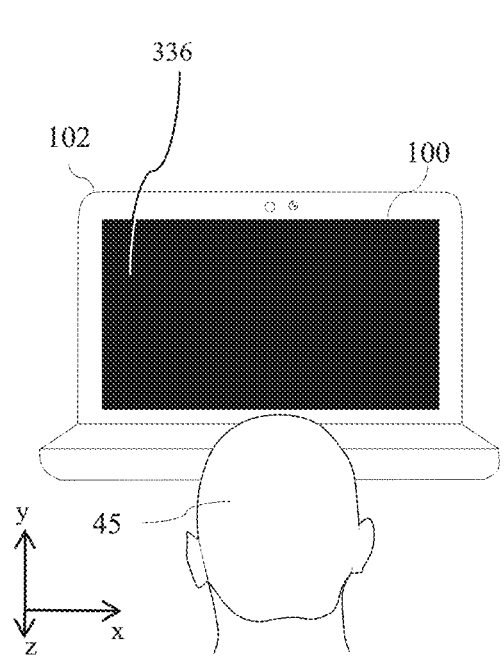
FIG. 2A is a schematic diagram illustrating a front perspective view of a laptop illuminated by an ambient light source comprising a switchable privacy display device comprising a patterned electrode liquid crystal polar control retarder wherein no light is output from the spatial light modulator.
Figure 2B:
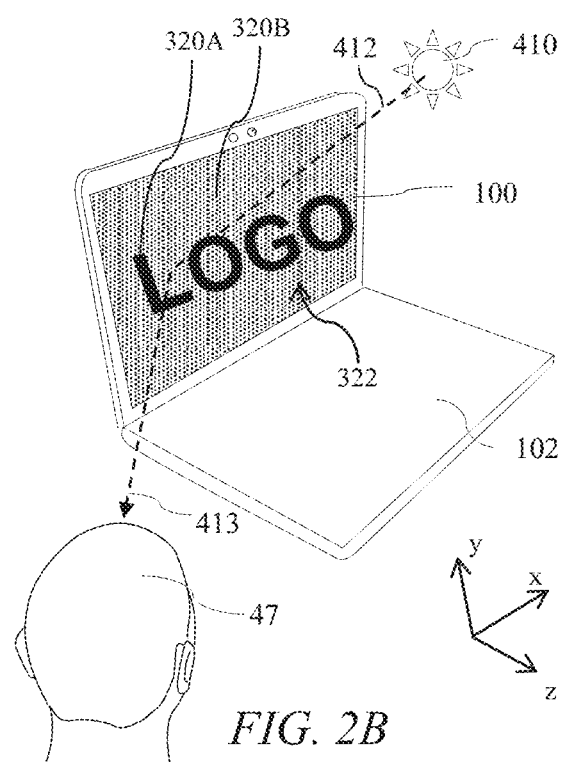
FIG. 2B is a schematic diagram illustrating a look-down off-axis perspective view of a laptop illuminated by an ambient light source comprising a switchable privacy display device comprising a patterned electrode liquid crystal polar control retarder wherein no light is output from the spatial light modulator.

FIG. 2A is a schematic diagram illustrating a front perspective view of a laptop computer 102 illuminated by an ambient light source 410 comprising a switchable privacy display device 100 comprising a liquid crystal polar control retarder 301 with patterned electrodes 317F, 317R wherein no light 400 is output from the spatial light modulator 48; and FIG. 2B is a schematic diagram illustrating a look-down off-axis perspective view of a laptop computer 102 illuminated by an ambient light source 410 comprising a switchable privacy display device 100 comprising a liquid crystal polar control retarder 301 with patterned electrodes 317F, 317R wherein no light 400 is output from the spatial light modulator 48. Features of the embodiment of FIGS. 2A-B not discussed in further detail may be assumed to correspond to the features with equivalent reference numerals as discussed above, including any potential variations in the features.

FIGS. 2A-B illustrate the operation of a mark display mode that may be also termed a "Mark Sleep Mode". The display device 100 may comprise for example the display devices 100 of FIGS. 1A or FIG. 1B. The control system 500 controls the spatial light modulator 48 to display no image (for example by switching off the spatial light modulator 48 and where present the backlight 20, and applies voltages $V_F$, $V_R$ across the first and second transmissive electrodes 317F, 317R that drive the layer 314 of liquid crystal material 414 into different states in different regions 320A, 320B such that the mark 322 is not visible at the narrow angle to an observer 45 but is visible at a wide angle to the observer 47.

The control system 500 applies voltages $V_F$, $V_R$ across the first and second transmissive electrodes 317F, 317R as will be described further hereinbelow. The respective voltages $V_F$, $V_R$ drive the layer 314 of liquid crystal material 414 into different states in different regions 320A, 320B, that is voltages $V_{FA}$, $V_{RA}$ may be provided in mark region 320A and voltages $V_{FB}$, $V_{RB}$ may be provided in background region 320B.

The mark 322 comprises distal mark region 320A and proximal background region 320B, with typically the distal mark region 320A comprising the iconography, images, text or other mark information to be displayed.

The at least one mark display mode includes a mark display mode in which the control system 500 controls the spatial light modulator 48 to display no image 336 and applies voltages $V_F$, $V_R$ across the first and second transmissive electrodes 317F, 317R that drive the layer 314 of liquid crystal material 414 into different states in different regions 320A, 320B such that the mark region 320A is visible at wide angles to off-axis observer 47 but not narrow angles to observer 45.

In the present embodiments, observer 45 may typically (but not necessarily) be located in or near to an on-axis position and is typically a display user. Observer 47 may typically be located in an off-axis position and may be a display snooper, that is an unwanted recipient of image data or in a vehicle may be a driver of the vehicle where received image data may present a distraction.

The operation of the display device 100 in the mark display mode will now be further described.

FIG. 2A illustrates the appearance of the display to a head-on display observer 45 when no light is output from the spatial light modulator 48.

Considering transmitted light through the view angle control element 302, 300, 318, there is no output from the spatial light modulator 48 and thus no display output luminance. Such an arrangement may be provided in a sleep mode of operation. Advantageously the display device 100 power consumption is a very low power to drive only the polar control retarder 300 and not the spatial light modulator 48 or backlight 20. Such an arrangement may also be provided in a sales mode of operation, when the mark 322 is provided to achieve branding or other aesthetic appeal to prospective purchasers.

Considering incident ambient light rays 412 that may be seen by the head-on display observer 45 then the polar control retarder 300 operates to provide no phase shift for the incident polarisation state transmitted by the additional polariser 318 in both regions 320A, 320B, irrespective of the voltages $V_F$, $V_R$ across the liquid crystal layer 314. Polarised ambient light that is incident onto the reflective polariser 302 is transmitted rather than reflected. The observer 45 thus sees low reflectivity from the display for both regions 320A, 320B and the mark is not visible.

FIG. 2B illustrates the appearance of the display to an off-axis display off-axis observer 47 when no light is output from the spatial light modulator 48.

Considering transmitted light through the view angle control element 302, 300, 318, there is no output from the spatial light modulator 48 and thus no display output luminance.

Considering incident ambient light rays 412 that may be seen as reflected light rays 413 by the off-axis display off-axis observer 47 then the polar control retarder 300 operates to provide a first phase shift for the incident polarisation state transmitted by the additional polariser 318 in mark regions 320A that are driven by first drive voltages $V_{FA}$, $V_{RA}$; and a second, different phase shift for the incident polarisation state transmitted by the additional polariser 318 in background region 320B that is driven by second drive voltages $V_{FB}$, $V_{RB}$.

The different phase shifts provide different polarisation states that are incident onto the reflective polariser 302, and thus different reflectivity at the reflective polariser 302. The reflected light rays 413 are transmitted through the additional polariser 318 and reflected to the off-axis observer 47.

In one mark region 320A, a first reflectivity may be provided and a different reflectivity may be provided in background region 320B. For example, in the illustrative example of FIG. 2B, the mark region 320A may have low reflectivity and the background region 320B may have high reflectivity such that the mark region 320A is visible to the off-axis observer 47 as a dark mark on a reflective background.

Returning to the illustrative embodiment of TABLE 1 and FIGS. 1D-1E. The mark region 320A is provided by the polar reflectivity profile of FIG. 1G such that off-axis observer 47 sees a low reflectivity at a polar location of −45 degrees lateral angle with zero elevation. The background region 320B is provided by the polar reflectivity profile of FIG. 1F such that off-axis observer 47 sees a high reflectivity at the same polar location. In both regions 320A, 320B then the observer 45 sees the same low reflectivity and no mark is observed or is observed with low contrast.

The mark may advantageously achieve the display of branding information, or safety information for example.

In comparison to the power consumption for providing light from the spatial light modulator 48, the power consumption to drive the regions 320A, 320B of the polar control retarder 300 may be substantially lower. In an illustrative example the power consumption of the polar control retarder 300 may be less than 250mW while the power consumption of the spatial light modulator in operation may be 5W for a typical laptop. The mark may be visible to off-axis observer 47 with advantageously low power consumption.

The operation of a further mark display mode will now be described. It may be desirable to provide mark information to the head-on display observer 45 while providing the off-axis display off-axis observer 47 with reflective mark region 320A.

Figure 3A:
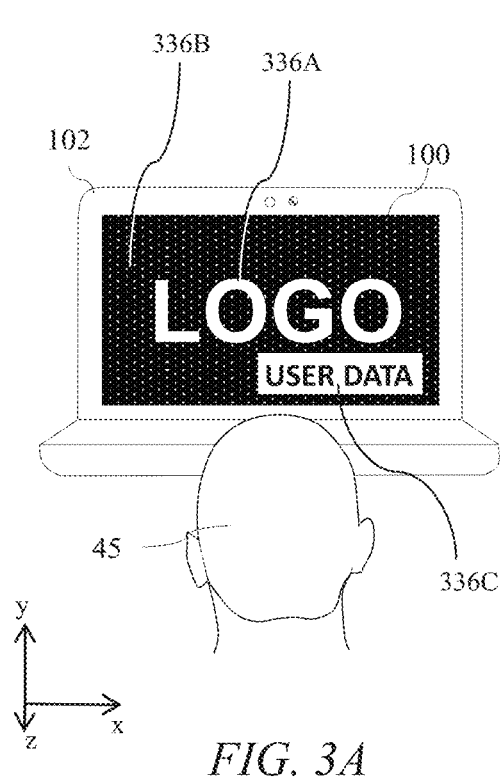
FIG. 3A is a schematic diagram illustrating a front perspective view of a laptop illuminated by an ambient light source comprising a switchable privacy display device comprising a patterned electrode liquid crystal polar control retarder wherein light is output from the spatial light modulator and an image is provided on the spatial light modulator.
Figure 3B:
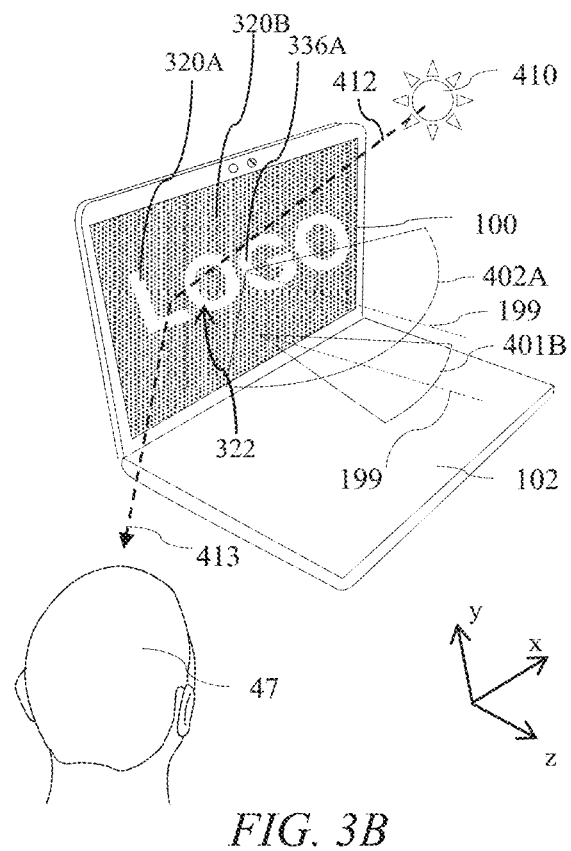
FIG. 3B is a schematic diagram illustrating a look-down off-axis perspective view of a laptop illuminated by an ambient light source comprising a switchable privacy display device comprising a patterned electrode liquid crystal polar control retarder wherein light is output from the spatial light modulator and an image is provided on the spatial light modulator.

FIG. 3A is a schematic diagram illustrating a front perspective view of a laptop computer 102 illuminated by an ambient light source 410 comprising a switchable privacy display device 100 comprising a comprising a liquid crystal polar control retarder 301 with patterned electrodes 317F, 317R wherein light 400 is output from the spatial light modulator 48 and an image 336 is provided on the spatial light modulator 48; and FIG. 3B is a schematic diagram illustrating a look-down off-axis perspective view of a laptop computer 102 illuminated by an ambient light source 410 comprising a switchable privacy display device 100 comprising a liquid crystal polar control retarder 301 with patterned electrodes 317F, 317R wherein light 400 is output from the spatial light modulator 48 and an image 336 is provided on the spatial light modulator 48. Features of the embodiment of FIGS. 3A-B not discussed in further detail may be assumed to correspond to the features with equivalent reference numerals as discussed above, including any potential variations in the features. P811 The alternative embodiments of FIGS. 3A-B illustrate a narrow-angle operational display mode that may be termed a "Mark Privacy Mode", in which the control system 500 controls the spatial light modulator 48 to display an operational image 338 and applies voltages $V_F$, $V_R$ across the first and second transmissive electrodes 317F, 317R that drive the layer 314 of liquid crystal material 414 into different states in different regions 320A, 320B such that the operational background image 336B, 336C is not visible at a wide angle and is visible at a narrow angle (i.e. at an angle within the narrow angle light cone 401). The mark 322 provided by the illumination mark image 336A is visible at the narrow angle to the observer 45 and the mark 322 provided by the illumination mark image 336A and the regions 320A, 320B of the polar control retarder 300 is visible at the wide angle to the observer 47.

The operation of the display device 100 in the alternative mark display mode of FIGS. 3A-B will now be further described.

FIG. 3A illustrates the appearance of the display to a head-on display observer 45 when an illumination image is output from the spatial light modulator 48. The observer 45 may see the mark illumination mark image 336A that is a still illumination image on a background image 336B. The mark illumination image 336A may be aligned with the mark region 320A of the polar control retarder 300. Advantageously visibility of the mark 322 may be provided in common location independent of viewing angle.

The image may further be provided with user data 336C that is visible to the observer 45 but is private for the off-axis observer 47, for example infotainment or control information.

Considering transmitted light through the view angle control element 302, 300, 318, the polar control retarder 300 operates to provide no phase shift for the incident polarisation state transmitted by the display polariser 218 and reflective polariser 302 in both regions 320A, 320B, irrespective of the voltages $V_F$, $V_R$ across the liquid crystal layer 314. Polarised light from the spatial light modulator 48 that is incident onto the additional polariser 318 is transmitted. The observer thus sees the image regions 336A, 336B, 336C. In an alternative embodiment the mark illumination image 336A may not be illuminated and image data for the observer 45 may be provided in the regions 336B, 336C.

Considering incident ambient light rays 412 that may be seen by the head-on display observer 45, the operation is the same as that described with respect to FIG. 2A.

FIG. 3B illustrates the appearance of the display to an off-axis display off-axis observer 47 when an image is output from the spatial light modulator 48. In mark region 320A, a wide angle light cone 402A is provided, and in background region 320B, a narrow angle light cone 401B is provided for output light from the spatial light modulator 48. In alternative embodiments including the embodiment of FIG. 10E the mark region 320A may be provided with a narrow angle light cone 401A and the background region 320B may be provided with a wide angle light cone 402B.

Considering transmitted light through the view angle control element 302, 300, 318, the polar control retarder 300 operates to provide a first phase shift for the incident polarisation state transmitted by the display polariser 218 in mark regions 320A that are driven by first drive voltages $V_{FA}$, $V_{RA}$; and a second, different phase shift for the incident polarisation state transmitted by the display polariser 218 in background region 320B that are driven by second drive voltages $V_{FB}$, $V_{RB}$ The different phase shifts provide different polarisation states that are incident onto the additional polariser 318, and thus different transmission at angles directed towards the off-axis observer 47. In background region 320B, the off-axis transmission to the off-axis observer 47 is reduced as illustrated by narrow angle light cone 401B. By comparison in mark region 320A a higher transmission is achieved and the size of wide angle light cone 402A is increased in comparison to narrow angle light cone 401B. In the illustrative example of FIG. 3B, low transmission to off-axis observer 47 is provided in the background region 320B whereas high transmission is provided in the mark region 320A.

In an illustrative embodiment, the narrow angle light cone 401 is in a range of polar angles of from 0° to 20° from a normal to the spatial light modulator at the predetermined azimuth angle at which the image is visible in a narrow-angle operational mode. In this mode, the image is visible at angles within the narrow angle light cone 401, as a result of operating with security factor S<1, desirably S<0.2 and more desirably S<0.1.

The display observer 45 may have a nominal viewing angle that is on-axis, that is normal to the centre of the display for example for a laptop computer 102. Alternatively, the observer 45 may have a nominal viewing angle that is off-axis, for example in an automotive vehicle, wherein the observer 45 may be on-axis or may have a nominal location of for example 0° to 10° off-axis location compared to the display centre and further depend on the sitting geometry in the automotive cabin.

In an illustrative embodiment, the wide angle light cone 402 is the range of angles from the display centre at which at which the image is visible in a wide-angle operational mode. In this mode, the image is visible at angles within the wide angle light cone 402 as a result of operating with security factor S<1, desirably security factor S<0.2, and more desirably security factor S<0.1.

Considering incident ambient light rays 412 that may be seen as reflected light rays 413 by the off-axis display off-axis observer 47, the operation is the same as that described with respect to FIG. 2B.

In the illustrative example of FIG. 3B, the mark region 320A may have low reflectivity and the background region 320B may have high reflectivity such that the mark region 320A is visible to the off-axis observer 47 as an illuminated mark on a reflective background. Further the region 336C comprising image data is obscured with a security factor determined by the ambient illuminance, the display reflectivity and display luminance at the viewing angle of the off-axis observer 47.

In the present embodiments, the mark or logo region has an operational transparent electrode rather than being an area without a transparent conductive electrode. This means that the regions 320A, 320B have matched transmission which reduces the visibility of the mark electrode area which may occur because of the slight reduction in transmission though a conductive electrode compared to a non-electrode region. Secondly the presence of an electrode in the mark or logo region enables a voltage to be applied to it which can tune the visibility or contrast of the logo and that of the electrode wiring to be visible from defined angles and invisible from different angles as appropriate. The mark region may be lower contrast than in the backlight of mode described with reference to FIG. 2A.

The colour of the mark region 320A may advantageously be modified to match desired brand appearance and the observer 45 may further observe the mark region 336A.

A narrow angle operational display mode will now be described.

Figures 4A, 4B:
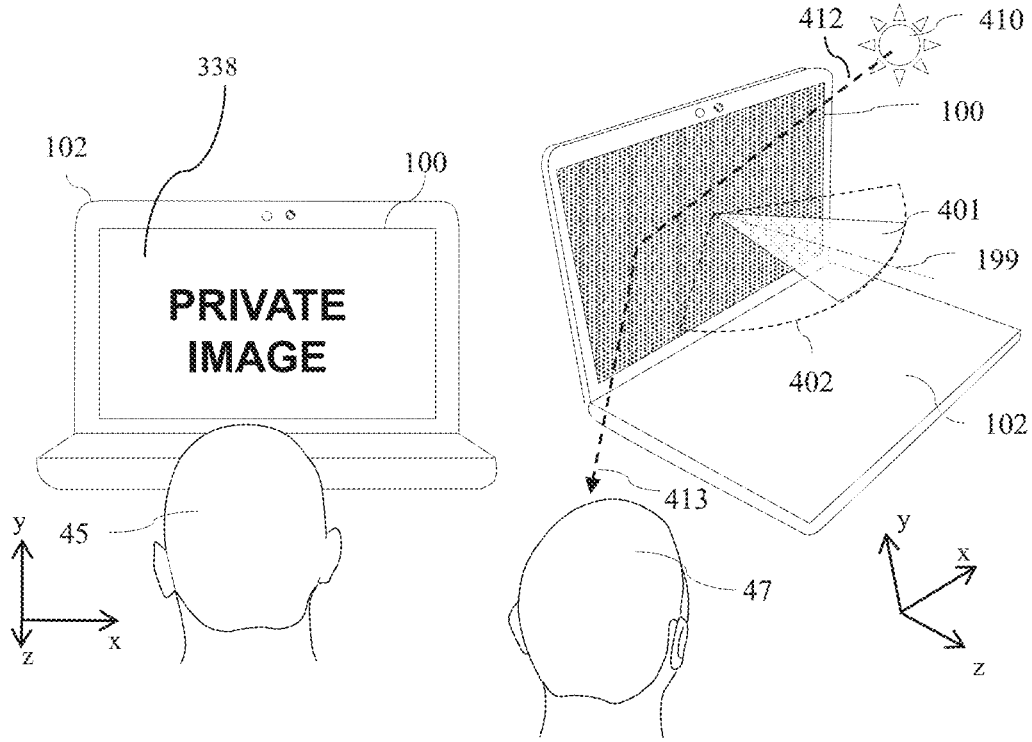
FIG. 4A is a schematic diagram illustrating a front perspective view of a laptop illuminated by an ambient light source comprising a switchable privacy display operating in privacy mode comprising a patterned electrode liquid crystal polar control retarder wherein the patterned electrodes are driven with a common voltage and wherein light is output from the spatial light modulator and an image is provided on the spatial light modulator.
FIG. 4B is a schematic diagram illustrating a look-down off-axis perspective view of a laptop illuminated by an ambient light source comprising a switchable privacy display operating in privacy mode comprising a patterned electrode liquid crystal polar control retarder wherein the patterned electrodes are driven with a common voltage and wherein light is output from the spatial light modulator and an image is provided on the spatial light modulator.

FIG. 4A is a schematic diagram illustrating a front perspective view of a laptop computer 102 illuminated by an ambient light source 410 comprising a switchable privacy display device 100 operating in privacy mode comprising a liquid crystal polar control retarder 301 with patterned electrodes 317F, 317R wherein the patterned electrodes 317F, 317R are driven with a common voltage and wherein light 400 is output from the spatial light modulator 48 and an image 336 is provided on the spatial light modulator 48; and FIG. 4B is a schematic diagram illustrating a look-down off-axis perspective view of a laptop computer 102 illuminated by an ambient light source 410 comprising a switchable privacy display device 100 operating in privacy mode comprising a liquid crystal polar control retarder 301 with patterned electrodes 317F, 317R wherein the patterned electrodes 317F, 317R are driven with a common voltage and wherein light 400 is output from the spatial light modulator 48 and an image 336 is provided on the spatial light modulator 48. Features of the embodiment of FIGS. 4A-B not discussed in further detail may be assumed to correspond to the features with equivalent reference numerals as discussed above, including any potential variations in the features.

FIGS. 4A-B illustrate a narrow-angle operational display mode that may be termed a "Uniform Privacy Mode", in which the control system 500 controls the spatial light modulator 48 to display an operational image 338 and applies voltages $V_F$, $V_R$ across the first and second transmissive electrodes 317F, 317R that drive the layer 314 of liquid crystal material 414 into the same state in different regions 320A, 320B such that the operational image 338 is not visible at a wide angle and is visible at a narrow angle (i.e. at an angle within the narrow angle light cone 401). The mark 322 is not visible at the narrow angle to the observer 45 or at the wide angle to the observer 47.

In other words, the at least one narrow-angle operational display mode includes a narrow-angle operational display mode in which the control system 500 controls the spatial light modulator 48 to display an operational image 338 and applies voltages across the first and second transmissive electrodes 317F, 317R that drive the layer 314 of liquid crystal material 414 into the same state in different regions 320A, 320B such that the mark 322 is not visible at the wide angle.

Considering FIG. 4A, transmitted light through the view angle control element 302, 300, 318, the polar control retarder 300 operates to provide no phase shift for the incident polarisation state transmitted by the display polariser 218 and reflective polariser 302 in both regions 320A, 320B. Polarised light from the spatial light modulator 48 that is incident onto the additional polariser 318 is transmitted. The observer 45 thus sees the operational image 338.

Considering incident ambient light rays 412 that may be seen by the head-on display observer 45, the operation is the same as that described with respect to FIG. 2A and the display device 100 has substantially low reflectivity across the display device 100.

FIG. 4B illustrates the appearance of the display to an off-axis display off-axis observer 47 when the operational image 338 is output from the spatial light modulator 48.

Considering transmitted light through the view angle control element 302, 300, 318, the polar control retarder 300 operates to provide a phase shift for the incident polarisation state transmitted by the display polariser 218 in mark regions 320A that are driven by first drive voltages $V_{FA}$, $V_{RA}$; and the same phase shift for the incident polarisation state transmitted by the display polariser 218 in background region 320B that is driven by second drive voltages $V_{FB}$, $V_{RB}$.

The same polarisation state is incident onto the additional polariser 318 for both regions 320A, 320B, and thus the same transmission at angles directed towards the off-axis observer 47 as illustrated by wide angle light cone 402 that is reduced size in comparison to the narrow angle light cone 401 from the spatial light modulator 48.

Considering incident ambient light rays 412 that may be seen as reflected light rays 413 by the off-axis display off-axis observer 47 then the polar control retarder 300 operates to provide a phase shift for the incident polarisation state transmitted by the additional polariser 318 in mark regions 320A that are driven by drive voltages $V_{FA}$, $V_{RA}$; and the same phase shift for the incident polarisation state transmitted by the additional polariser 318 in background region 320B that is driven by drive voltages $V_{FB}$, $V_{RB}$ that may be the same as drive voltages $V_{FA}$, $V_{RA}$.

The phase shifts provide the same polarisation states that are incident onto the reflective polariser 302, and thus the same reflectivity at the reflective polariser 302. The reflected light rays 413 are transmitted through the additional polariser 318 and reflected to the off-axis observer 47.

The same high reflectivity is provided in regions 320A, 320B for the off-axis observer 47. Image data from image 338 is obscured with a security factor determined by the ambient illuminance, the display reflectivity and display luminance at the viewing angle of the off-axis observer 47.

Observer 45 that is a user has high image visibility and off-axis observer 47 that is an unwanted snooper is provided with a high security factor so that the image 338 is difficult to discern or is invisible. A privacy display operation mode is advantageously achieved.

A wide angle operational display mode will now be described.

Figures 4C, 4D:
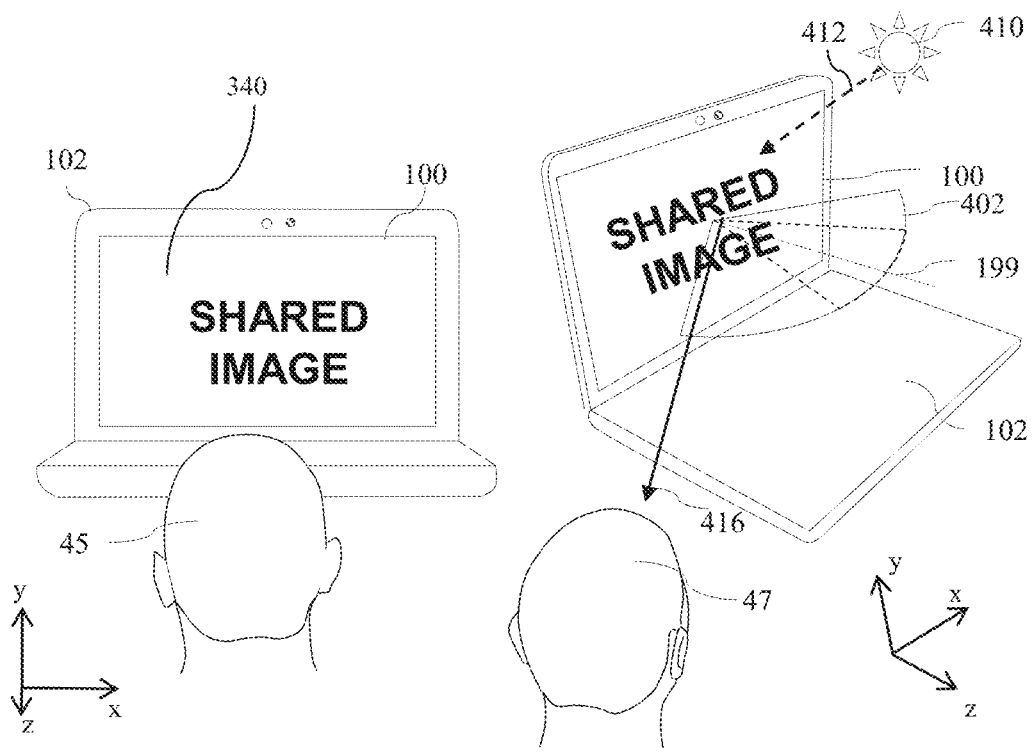
FIG. 4C is a schematic diagram illustrating a front perspective view of a laptop illuminated by an ambient light source comprising a switchable privacy display operating in share mode comprising a patterned electrode liquid crystal polar control retarder wherein the patterned electrodes are driven with a common voltage and wherein light is output from the spatial light modulator and an image is provided on the spatial light modulator.
FIG. 4D is a schematic diagram illustrating a look-down off-axis perspective view of a laptop illuminated by an ambient light source comprising a switchable privacy display operating in share mode comprising a patterned electrode liquid crystal polar control retarder wherein the patterned electrodes are driven with a common voltage and wherein light is output from the spatial light modulator and an image is provided on the spatial light modulator.

FIG. 4C is a schematic diagram illustrating a front perspective view of a laptop computer 102 illuminated by an ambient light source 410 comprising a switchable privacy display device 100 operating in share mode comprising a liquid crystal polar control retarder 301 with patterned electrodes 317F, 317R wherein the patterned electrodes 317F, 317R are driven with a common voltage and wherein light 400 is output from the spatial light modulator 48 and an image 336 is provided on the spatial light modulator 48; and FIG. 4D is a schematic diagram illustrating a look-down off-axis perspective view of a laptop computer 102 illuminated by an ambient light source 410 comprising a switchable privacy display device 100 operating in share mode comprising a liquid crystal polar control retarder 301 with patterned electrodes 317F, 317R wherein the patterned electrodes 317F, 317R are driven with a common voltage and wherein light 400 is output from the spatial light modulator 48 and an image 336 is provided on the spatial light modulator 48. Features of the embodiment of FIGS. 4C-D not discussed in further detail may be assumed to correspond to the features with equivalent reference numerals as discussed above, including any potential variations in the features.

FIGS. 4C-D illustrate a wide-angle operational display mode that may be termed a "Uniform Share Mode", in which the control system 500 controls the spatial light modulator 48 to display an operational image 338 and applies voltages $V_F$, $V_R$ across the first and second transmissive electrodes 317F, 317R that drive the layer 314 of liquid crystal material 414 into the same state in different regions 320A, 320B such that the operational image 338 is visible at a wide angle (i.e. an angle within wide angle light cone 402) and is visible at a narrow angle (i.e. at an angle within the narrow angle light cone 401). The mark 322 is not visible at the narrow angle to the observer 45 or the wide angle to the observer 47.

In the embodiments of FIGS. 4C-D the control system 500 controls the spatial light modulator 48 to display an operational image 340 and applies voltages $V_F$, $V_R$ across the first and second transmissive electrodes 317F, 317R that drive the layer 314 of liquid crystal material 414 into the same state in different regions 320A, 320B such that the operational image 338 is visible at the narrow angle and at the wide angle and the mark is not visible at the narrow angle or the wide angle.

Considering FIG. 4C, transmitted light through the view angle control element 302, 300, 318, the polar control retarder 300 operates to provide no phase shift for the incident polarisation state transmitted by the display polariser 218 and reflective polariser 302 in both regions 320A, 320B. Polarised light from the spatial light modulator 48 that is incident onto the additional polariser 318 is transmitted. The observer 45 thus sees the operational image 340.

Considering incident ambient light rays 412 that may be seen by the head-on display observer 45, the operation is the same as that described with respect to FIG. 4A and the display device 100 has substantially low reflectivity across the display device 100.

FIG. 4D illustrates the appearance of the display to an off-axis display off-axis observer 47 when the operational image 340 is output from the spatial light modulator 48.

Considering transmitted light through the view angle control element 302, 300, 318, the polar control retarder 300 operates to provide substantially no phase shift for the incident polarisation state transmitted by the display polariser 218 in mark regions 320A that are driven by drive voltages $V_{FA}$, $V_{RA}$; and substantially no phase shift for the incident polarisation state transmitted by the display polariser 218 in background region 320B that is driven by drive voltages $V_{FB}$, $V_{RB}$ that may be the same as voltages $V_{FA}$, $V_{RA}$ but are different to the drive voltages of FIGS. 4A-B as will be described below.

The same polarisation state is incident onto the additional polariser 318 for both regions 320A, 320B, and thus the same transmission at angles directed towards the off-axis observer 47 as illustrated by wide angle light cone 402 that is the same size in comparison to the narrow angle light cone 401 from the spatial light modulator 48. Light rays 416 are output from the display device 100 to the off-axis observer 47.

Considering incident ambient light rays 412 that may be seen as reflected light rays 413 by the off-axis display off-axis observer 47 then the polar control retarder 300 operates to provide substantially no phase shift for the incident polarisation state transmitted by the additional polariser 318 in mark regions 320A that are driven by drive voltages $V_{FA}$, $V_{RA}$; and substantially no phase shift for the incident polarisation state transmitted by the additional polariser 318 in background region 320B that is driven by drive voltages $V_{FB}$, $V_{RB}$ that may be the same as drive voltages $V_{FA}$, $V_{RA}$.

The polarisation states are incident onto the reflective polariser 302 are aligned to the electric vector transmission direction of the reflective polariser 302 and thus are not reflected.

The same low reflectivity is provided in regions 320A, 320B for the off-axis observer 47. Image data from image 340 is visible with high image visibility for the off-axis observer 47. A share display operation mode is advantageously achieved.

Operation of a mark privacy mode will now be described.

FIG. 5A is a schematic diagram illustrating a front perspective view of a laptop computer 102 comprising a switchable privacy display device 100 operating in mark privacy mode comprising a patterned electrode liquid crystal polar control retarder 301 wherein the patterned electrodes 317F, 317R are driven with different voltages and wherein image data is provided on the spatial light modulator 48; and FIG. 5B is a schematic diagram illustrating a look-down off-axis perspective view of a laptop computer 102 illuminated by an ambient light source 410 comprising a switchable privacy display device 100 operating in mark privacy mode comprising a patterned electrode liquid crystal polar control retarder 301 wherein the patterned electrodes 317F, 317R are driven with different voltages and wherein image data is provided on the spatial light modulator 48. Features of the embodiment of FIGS. 5A-B not discussed in further detail may be assumed to correspond to the features with equivalent reference numerals as discussed above, including any potential variations in the features.

The alternative embodiments of FIGS. 5A-B illustrate a narrow-angle operational display mode that may be termed a "Mark Privacy Mode", in which the control system 500 controls the spatial light modulator 48 to display an operational image 338 and applies voltages $V_F$, $V_R$ across the first and second transmissive electrodes 317F, 317R that drive the layer 314 of liquid crystal material 414 into different states in different regions 320A, 320B such that the operational image 338 is not visible at a wide angle and is visible at a narrow angle (i.e. at an angle within the narrow angle light cone 401). The mark 322 is not visible at the narrow angle to the observer 45 and is visible at the wide angle to the observer 47.

The alternative embodiment of FIGS. 5A-5B illustrates a display device 100 for use in ambient illumination 410 for example of the type of FIG. 1A, wherein the view angle control arrangement further comprises a reflective polariser 302 and wherein the control system 500 is arranged to be operable in plural modes of operation.

In a wide-angle operational display mode, for example as illustrated in FIG. 4B wherein the control system 500 controls the spatial light modulator 48 to display an operational image 338 and applies voltages across the first and second transmissive electrodes 317F, 317R that drive the layer 314 of liquid crystal material 414 into the same state in different regions 320A, 320B such that the operational image 338 is visible at a wide angle in cone 402 and at a narrow angle, and the mark is not visible at the narrow angle or the wide angle.

In at least one narrow-angle operational display mode illustrated in FIG. 5B, the control system 500 controls the spatial light modulator 48 to display an operational image 338 and applies voltages across the first and second transmissive electrodes 317F, 317R that drive the layer 314 of liquid crystal material 414 into different states in different regions 320A, 320B such that the operational image 338 is visible at the narrow angle (in narrow angle light cone 401) but not at the wide angle (in wide angle light cone 402), and the mark 322 is not visible at the narrow angle, but is visible at the wide angle.

Referring to eqn. 10 and associated description hereinabove, the security factor $S_n$ is given by the equation:

$$S_n = \log_{10}[1 + \rho_n \cdot \alpha/(\pi \cdot P_n)] \qquad \text{eqn. 12}$$

wherein: $\rho_n$ is the reflectivity of the display device at the angle in question, $P_n$ is the ratio of the luminance of the display device at the angle in question to the maximum luminance of the display device; $\pi$ is a solid angle in units of steradians; and a is a factor having a value of 4.0 steradians, so that the measurement condition for eqn. 12 refers to a display illuminance I that is reflected towards the angle in question and measured in lux that is four times the peak display luminance $Y_{max}$ measured in nits.

The operational image 338 is visible when a security factor $S_n$ defined at the angle in question is, for all the regions 320A, 320B, less than 1.0. More desirably for a high contrast image for the off-axis observer 47 acting as a display user, the security factor $S_n$ defined at the angle in question is, for all the regions 320A, 320B, desirably 0.2 or less. For values of the security factor $S_n$ greater than 0.2 and less than 1.0, an off-axis observer 47 acting as a display user will see the image with reduced contrast.

The operational image 338 is not visible, when a security factor $S_n$ defined at the angle in question is, for all the regions 320A, 320B, at least 1.0. For values of the security factor $S_n$ between 0.2 and 1.0 an off-axis observer 47 acting as a display snooper will experience some image visibility and as such the display device 100 may be considered as not private at the angle in question.

Further, the mark 322 is visible when the security factor $S_{320A}$ defined at the angle in question in the plural mark region 320A (in a shape of a mark 322) is different to the security factor $S_{320B}$ in the other region 320B respectively. The mark 322 is not visible when the security factor $S_{320A}$ defined at the angle in question in the plural mark region 320A is the same as the security factor $S_{320B}$ in the other of the background regions 320B.

In the present description, the wide angle is a polar angle of 45° from a normal to the display device at a predetermined azimuth angle around the normal to the display device 100; and the narrow angle is in a range of polar angles of from 0° to 20° from a normal to the spatial light modulator at the predetermined azimuth angle.

Illustrative examples of the embodiment of FIG. 5B is given in TABLE 3D hereinbelow.

It may be desirable to reduce the cost and frontal reflectivity of the display device 100.

FIG. 5C is a schematic diagram illustrating a look-down off-axis perspective view of a laptop computer 102 comprising a switchable privacy display device 100 operating in full screen privacy mode. Features of the embodiment of FIG. 5C not discussed in further detail may be assumed to correspond to the features with equivalent reference numerals as discussed above, including any potential variations in the features.

The alternative embodiment of FIG. 5C illustrates an embodiment wherein the display device 100 comprises no reflective polariser 302, for example as illustrated in FIG. 1D or FIG. 1E. The regions 320A, 320B are driven so the layer 314 of liquid crystal material is driven with the same state as described elsewhere herein. A privacy display with relatively low frontal reflectivity is provided. Advantageously aesthetic appearance maybe improved in some applications where that is considered desirable, and cost may be reduced.

FIG. 5D is a schematic diagram illustrating a look-down off-axis perspective view of a laptop computer 102 comprising a switchable privacy display device 100 operating in mark privacy mode comprising a patterned electrode liquid crystal polar control retarder 301 with no reflective polariser wherein the patterned electrodes 317F, 317R are driven with different voltages and wherein image data is provided on the spatial light modulator 48. Features of the embodiment of FIG. 5D not discussed in further detail may be assumed to correspond to the features with equivalent reference numerals as discussed above, including any potential variations in the features.

The alternative embodiment of FIG. 5D illustrates a similar embodiment to that of FIG. 5B, wherein both regions 320A, 320B are provided with a security factor $S_{320A}$, $S_{320B}$ that is 1.0 or greater, but the respective security factors $S_{320A}$, $S_{320B}$ are different.

The purpose of the privacy mark modes is to provide desirable security factor within both the mark regions 320A and the background regions 320B, and a contrast of security factor $S_{320A}$, $S_{320B}$ as between the regions 320A and the background regions 320B such that the mark is visible.

By way of comparison with the present embodiments, some types of prior art privacy display provide a security factor that is insufficient for making the image not visible at wide angles in the privacy mode of operation at desirable levels of illuminance and maximum display luminance. To compensate for insufficient security factor S, prior art camouflage displays provide a disruptive structure which add an image disruption pattern to the image seen by an off-axis snooper. While some implementations may involve patterning of an electrode to form the disruptive pattern, the purpose is different from the techniques described herein, with the result that the shape of the pattern and the operation is different. Typically, in a narrow-angle operational display mode parts of the operational image seen by an off-axis observer are visible through regions of the display forming the disruptive pattern, but the shape of the disruptive pattern is chosen so that when the parts of the image are seen through it, then the content of the operational image is disrupted and so in principle the overall operational image is not difficult to perceive. The purpose and function of camouflage displays is thus different to the purpose of the mark modes of the present embodiments, and in the narrow-angle operational display mode a camouflage display is operated to allow the image to be visible through the disruptive pattern, which is not the case in the narrow-angle operational display mode described herein.

The display device 100 of the present embodiments may be provided in at least monitors, laptops, graphical terminals (such as point of sale terminals), mobile phones and other display devices including automotive display. An arrangement of the display device 100 in an automotive vehicle will now be described.

Figure 6A:
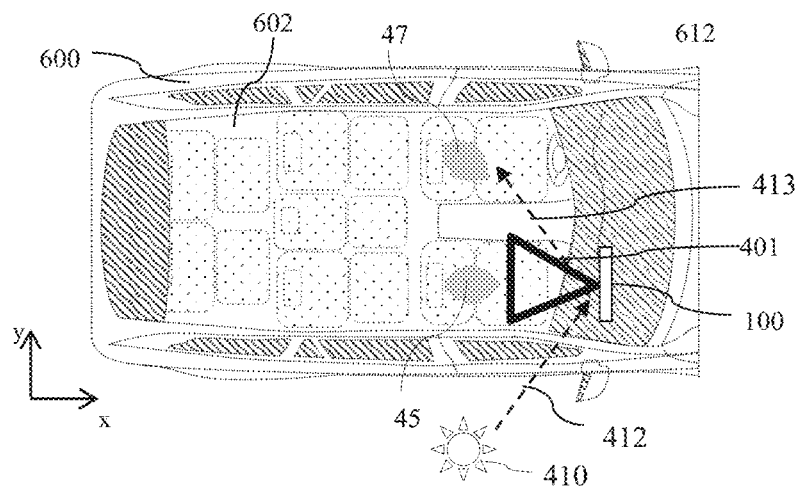
FIG. 6A is a schematic diagram illustrating a top view of an automotive vehicle comprising a switchable privacy passenger infotainment display operating in privacy mode.
Figure 6B:
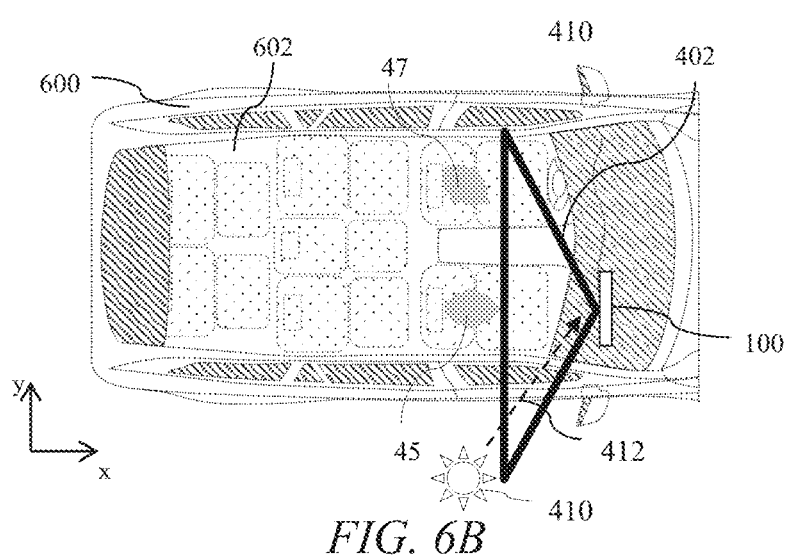
FIG. 6B is a schematic diagram illustrating a top view of an automotive vehicle comprising a switchable privacy passenger infotainment display operating in share mode.
Figure 6C:
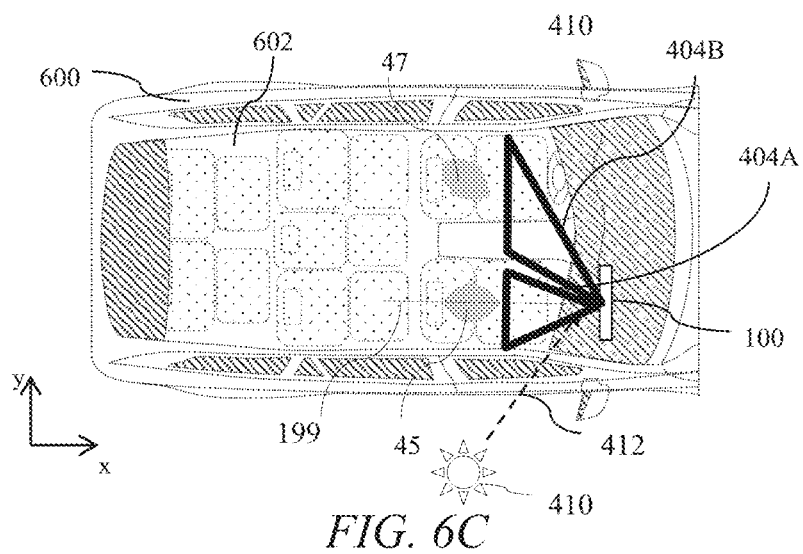
FIG. 6C is a schematic diagram illustrating a top view of an automotive vehicle comprising an alternative switchable privacy passenger infotainment display operating in share mode.

FIG. 6A is a schematic diagram illustrating a top view of an automotive vehicle 600 comprising a switchable privacy passenger infotainment display device 100 operating in uniform privacy mode, mark sleep mode or mark privacy mode; FIG. 6B is a schematic diagram illustrating a top view of an automotive vehicle 600 comprising a switchable privacy passenger infotainment display device 100 operating in a first uniform share mode; and FIG. 6C is a schematic diagram illustrating a top view of an automotive vehicle 600 comprising an alternative switchable privacy passenger infotainment display device 100 operating in a second share mode. Features of the embodiments of FIGS. 6A-C not discussed in further detail may be assumed to correspond to the features with equivalent reference numerals as discussed above, including any potential variations in the features.

The display device 100 of FIGS. 6A-C may have at least the same modes as those described with respect to the laptop 102 of FIGS. 2A-B, FIGS. 3A-B, FIGS. 4A-D and FIGS. 5A-D.

In comparison to the laptop 102, the switchable privacy display device 100 for example for use as a passenger infotainment display device 100 may be arranged to minimise distraction to the observer 47 that is a driver and to provide high image visibility to the observer 45 that is a passenger or co-driver. In uniform privacy mode and mark privacy mode operation, the passenger observer 45 may advantageously view infotainment image. The visibility of user image 338 on the display device 100 at angles for which the driver observer 47 can lean towards the optical axis 199 of the display device 100 is advantageously reduced, and driver distraction reduced, advantageously increasing safety of operation of the display device 100.

Further the mark display mode may be provided as the mark sleep mode with low power consumption so that the driver observer 47 sees mark 322 at least: when no passenger observer 45 is viewing the display device 100; in a vehicle showroom; when the vehicle is configured in courtesy mode; or when the ambient illumination conditions and driver observer 47 location are unsuitable for desirable limits of security factor S to achieve low driver distraction, in which case a non-distracting image 338 may be presented on the display device 100 for viewing by the passenger observer 45.

In prior art non-private displays it is from time to time considered desirable to provide very low display reflectivity to achieve no driver distraction, for example a "plano-black" appearance can be considered aesthetically pleasing. Privacy displays typically rely on display reflectivity to achieve desirable security factors for low driver distraction and so privacy displays do not typically have a plano black appearance. Advantageously, the mark 322 appearance may achieve an enhanced aesthetic appearance for displays that use reflectivity to enhance display privacy performance, that is displays that do not have a plano-black appearance when no image is provided. For example, the driver observer 47 may perceive a display vehicle brand logo on the display surface while the passenger observer 45 does not see the logo. The brand logo mark region may have a higher reflectivity than the background region, or may have a lower reflectivity, depending on aesthetic preference that may be selected by the manufacturer or display user.

Further it may be desirable to provide matching to brand colouring, that can for example can be achieved by the mark display mode of FIGS. 3A-B. Further the appearance of the mark 320A in mark display mode may be arranged to be similar to that of the vehicles aesthetic environment such as the dashboard appearance, for example as illustrated in FIG. 14B hereinbelow.

Further the colour of reflectivity of the display may be modified by insertion of colour filter 380, for example as illustrated in the alternative embodiment of FIG. 1B. Alternatively the colour of reflectivity may be modified by selecting polarisers with a desirable transmission spectrum.

An alternative arrangement for a vehicle privacy display device 100 will now be described.

In the alternative embodiment of FIG. 6C an alternative arrangement of illumination for share mode is illustrated.

In comparison to the arrangement of FIG. 6B, two light cones 404A, 404B are provided directed to passenger observer 45 and driver observer 47 respectively. The illumination of light cones 404A, 404B may be independently controlled by means of a directional backlight 20. U.S. Pat. No. 11,442,316, herein incorporated by reference in its entirety, illustrates an enabling display backlight 20 comprising first and second arrays 15A, 15B of LEDs aligned to first and second waveguides 1A, 1B in place of the single waveguide 1 and single array 15 of LEDs of FIG. 1A. In operation, one of the arrays 15A, 15B is controlled to illuminate the light cone 404A and the other of the arrays 15A, 15B is controlled to illuminate the light cone 404B. When both light cones 404A, 404B are illuminated then the display device 100 operates in a similar manner to the wide angle light cone 402; and when only light cone 404A is illuminated then the display device 100 operates in a similar manner to the narrow angle light cone 401, as described hereinabove. When only the light cone 404B is illuminated then the display device 100 achieves lower power consumption for illumination of the driver observer 47 only.

Such an arrangement of light cones 404A, 404B may achieve improved performance in privacy mode, as in comparison to the light cone 402, stray light from the backlight 20 that is directed into light cone 404B may be suppressed by the transmission and reflectivity of polar control retarder 300. The visibility of the display device 100 at angles for which the driver observer 47 leans into the optical axis 199 is advantageously reduced, and driver distraction reduced in comparison to the arrangement of FIG. 6B. Complexity and cost of the display device 100 may advantageously be reduced.

The structure and operation of an illustrative passenger infotainment display device 100 of FIG. 6C will now be described.

Figure 7A:
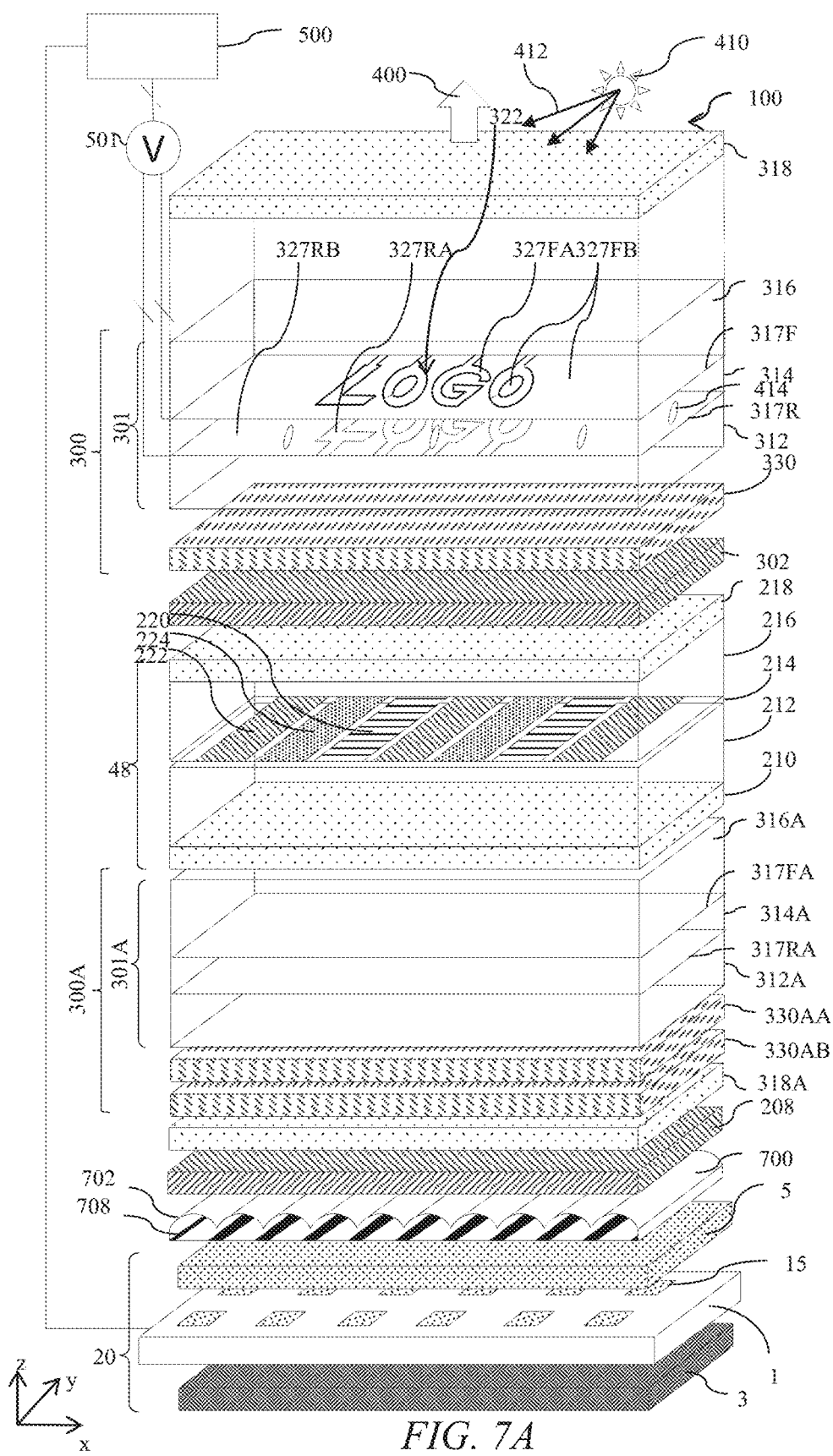
FIG. 7A is a schematic diagram illustrating a front perspective view of a privacy display for use in the automotive display of FIG. 6C.

FIG. 7A is a schematic diagram illustrating a front perspective view of a privacy display device 100 for use in the automotive display device 100 of FIG. 6C. Features of the embodiment of FIG. 7A not discussed in further detail may be assumed to correspond to the features with equivalent reference numerals as discussed above, including any potential variations in the features.

In comparison to the arrangement of FIG. 1A, a further additional polariser 318A is provided between the backlight 20 and the input polariser 210. Further polar control retarder 300A comprises switchable liquid crystal retarder 301 and crossed A-plate passive compensation retarders 330A, 330B and is provided between the further additional polariser 318A and input polariser 210. In an illustrative embodiment the polar control retarder 300 and further polar control retarder 300A may be arranged as described in TABLE 2.

TABLE 2

| Item | Layer | Alignment type | LC layer 314 retardance | Additional passive retarder 330 type | Additional passive retarder 330 retardance |
|---|---|---|---|---|---|
| 300 | 417F<br>417R | Homogeneous<br>Homeotropic | 1000 nm | | |
| | 330 | | | Negative C-plate | −880 nm |
| 300A | 417AA<br>417AB | Homogeneous<br>Homogeneous | 1000 nm | | |
| | 330AA | | | Positive A-plate @ 135° | +800 nm |
| | 330AB | | | Positive A-plate @ 45° | +800 nm |

In comparison to the waveguide 1 with edge input light sources 15 of FIG. 1A, the backlight 20 comprises an array of mini-LED light sources 15. Light control components 5 may comprise colour conversion layers such as phosphor or quantum dot sheets, diffusers and prismatic films such as brightness enhancement films, BEF™ from 3M corporation. In alternative embodiments the light control components 15 may further comprise at least one waveguide or other catadioptric optical element.

The array of mini-LED light sources 15 may be controlled by controller 500 and provided with image data that is aligned to the pixels 220, 222, 224 of the spatial light modulator 48. Advantageously high dynamic range operation, power savings and high luminance may be achieved.

The optical stack may further comprise a backlight angle control element 700 arranged between the backlight 20 and the further additional polariser 318A. In alternative embodiments the further additional polariser 318A, further polar control retarder 300A may be omitted to advantageously achieve reduced cost and complexity.

The operation of the backlight angle control element 700 will now be described.

Figure 7B:
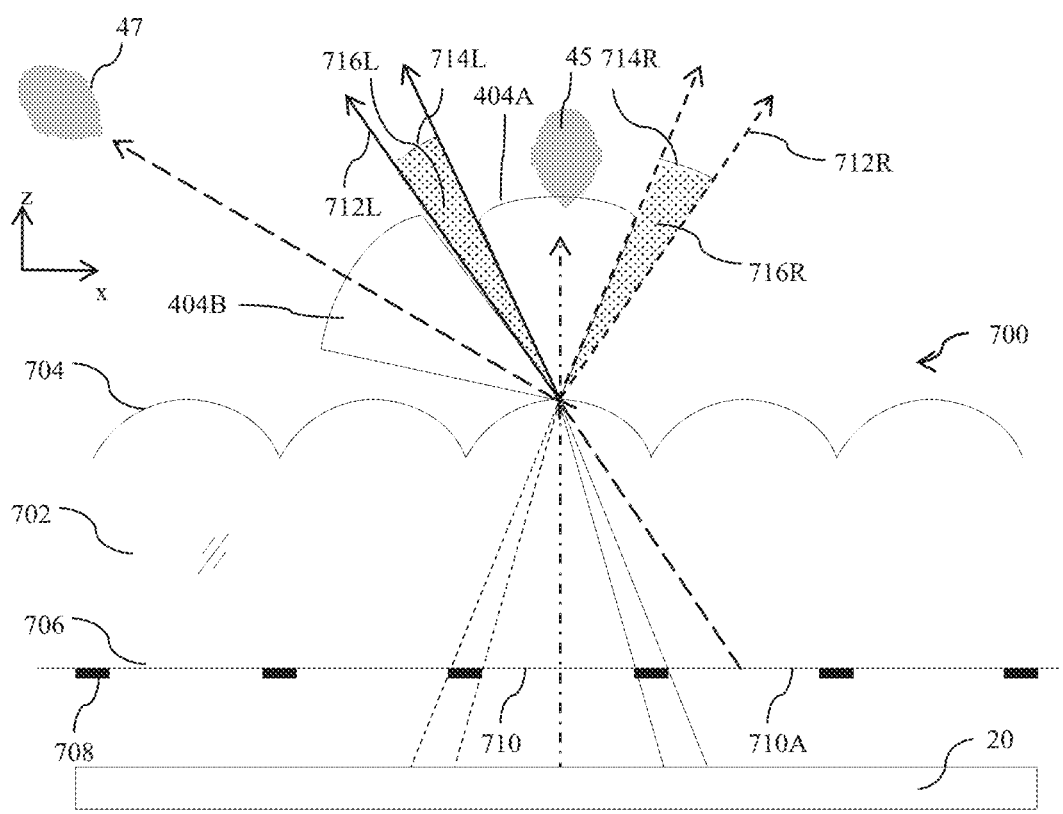
FIG. 7B is a schematic diagram illustrating a side view of the backlight angle control element of FIG. 7A.

FIG. 7B is a schematic diagram illustrating a side view of the backlight angle control element 700 of FIG. 7A. Features of the embodiment of FIG. 7B not discussed in further detail may be assumed to correspond to the features with equivalent reference numerals as discussed above, including any potential variations in the features.

The backlight control element 700 comprises a lens array 702 than comprises a structured front surface 704 and a rear surface 706 that comprises an array of light absorbing regions 708 and aperture regions 710. The structured front surface may comprise a lens array that may be two dimensional or may be one dimensional, such as a lenticular lens.

The lens array 704 is arranged to image the aperture region 710 that is aligned with the respective lens towards the passenger observer 45 and to image the aperture region 710A that is aligned with an adjacent lens towards the driver observer 47. Light cones 404A, 404B of FIG. 6C are thus provided with intermediate light cones 716L with size 714L that are formed by light rays 712L.

Figure 7C:
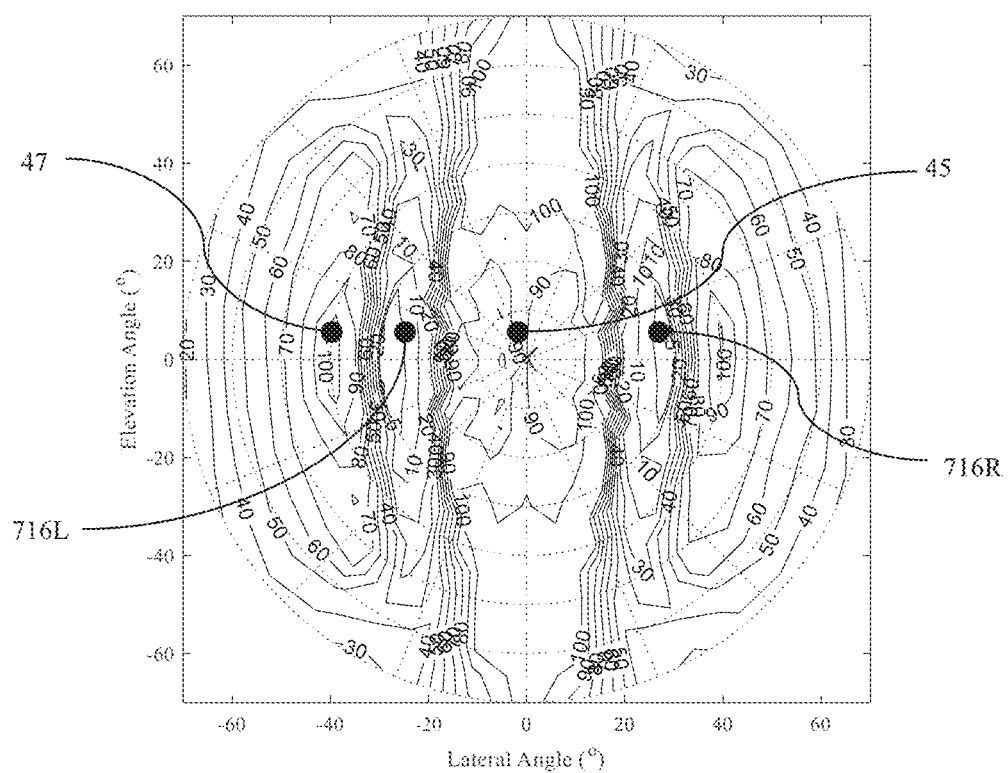
FIG. 7C is a schematic graph illustrating the polar variation of transmission for a backlight angle control element of FIG. 7B.

FIG. 7C is a schematic graph illustrating the polar variation of transmission for a backlight angle control element of FIG. 7B. Nominal driver observer 47 and passenger observer 45 locations are marked, for a look-down viewing angle of about 10 degrees onto the display centre. Around the limit of driver observer 47 lean towards the passenger, the light cone 716L has minimum transmission. Further on the side towards the passenger window then luminance is advantageously decreased, to prevent visibility in night-time operation.

The performance of the illustrative display stack of FIG. 7A and TABLE 2 in privacy mode, that for the automotive display device 100 of FIG. 6C in the privacy mode, which for a passenger infotainment display is the low driver distraction mode, will now be described.

Figure 7D:
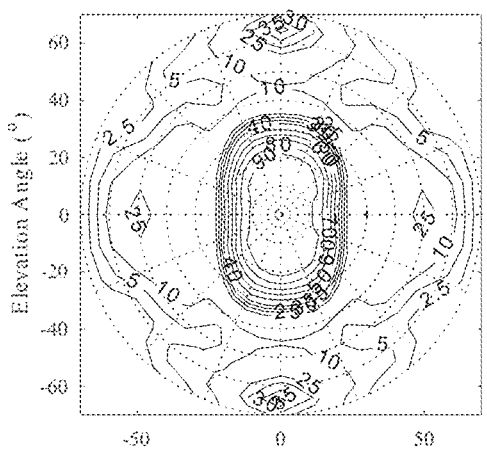
FIG. 7D is a schematic graph illustrating the polar variation of luminance for a backlight and backlight angle control element of FIG. 7A.

FIG. 7D is a schematic graph illustrating the polar variation of luminance for a backlight 20 comprising a mini-LED array and brightness enhancement films, and a backlight angle control element 700 of FIG. 7A and FIG. 7C.

Figure 7E:
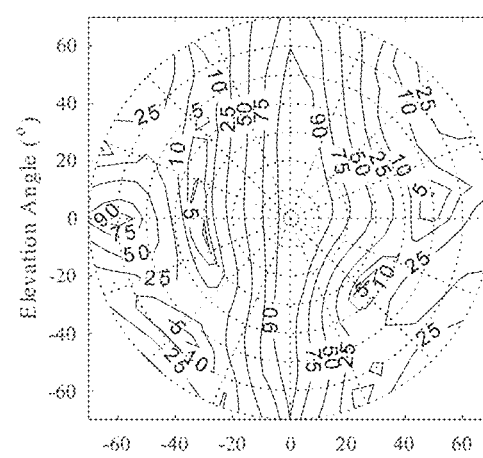
FIG. 7E is a schematic graph illustrating the polar variation of transmission for a further polar control retarder of FIG. 7A in low driver distraction mode.

FIG. 7E is a schematic graph illustrating the polar variation of transmission for a further polar control retarder 300A of FIG. 7A and TABLE 2 in low driver distraction mode.

Figure 7F:
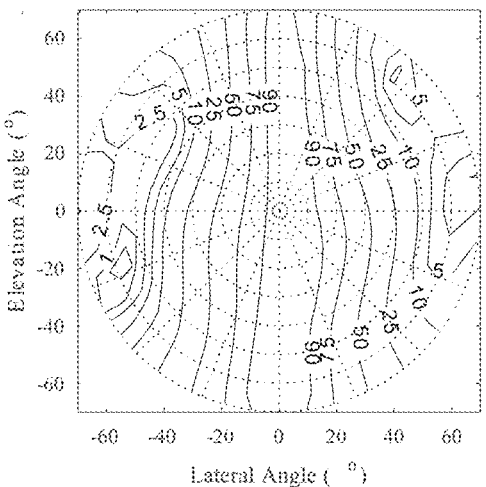
FIG. 7F is a schematic graph illustrating the polar variation of transmission for a polar control retarder of FIG. 7A in low driver distraction mode.
Figure 7G:
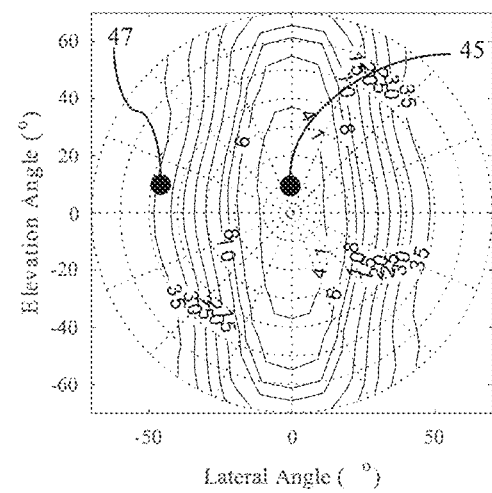
FIG. 7G is a schematic graph illustrating the polar variation of reflectivity for a polar control retarder of FIG. 7A in low driver distraction mode.

FIG. 7F is a schematic graph illustrating the polar variation of transmission for a polar control retarder 300 of FIG. 7A and TABLE 2 in low driver distraction mode; and FIG. 7G is a schematic graph illustrating the polar variation of reflectivity for a polar control retarder 300 of FIG. 7A and TABLE 2 in low driver distraction mode.

Figure 7H:
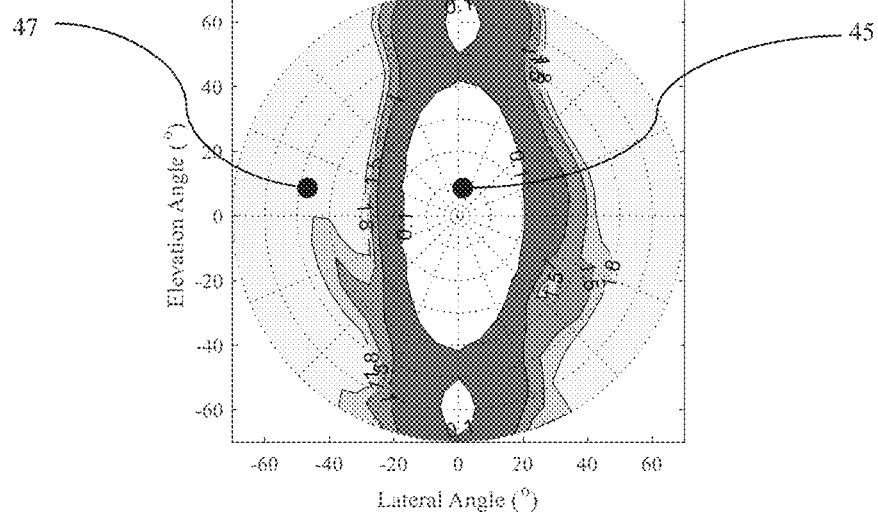
FIG. 7H is a schematic graph illustrating the polar variation of security factor, S for the illustrative embodiment of TABLE 2 in a privacy mode of operation for the display device of FIG. 7A with luminance profile of FIG. 7D, transmission profile of FIGS. 7E-F and reflectivity profile of FIG. 7G with a display head-on luminance, of value Y. measured in nits that is half of the illuminance of value I measured in lux.

FIG. 7H is a schematic graph illustrating the polar variation of security factor, S for the illustrative embodiment of TABLE 2 in a privacy mode of operation for the display device of FIG. 7A with luminance profile of FIG. 7D, transmission profile of FIGS. 7E-F and reflectivity profile of FIG. 7G with a display head-on luminance, of value $Y_{max}$ measured in nits that is half of the illuminance of value I measured in lux. Advantageously the driver observer 47 is provided with high image security over a large angular range while the passenger observer 45 has high image visibility.

The performance of the illustrative display stack of FIG. 7A and TABLE 2 in privacy mode, that for the automotive display device 100 of FIG. 6C is the low driver distraction mode will now be described.

Figure 7I:
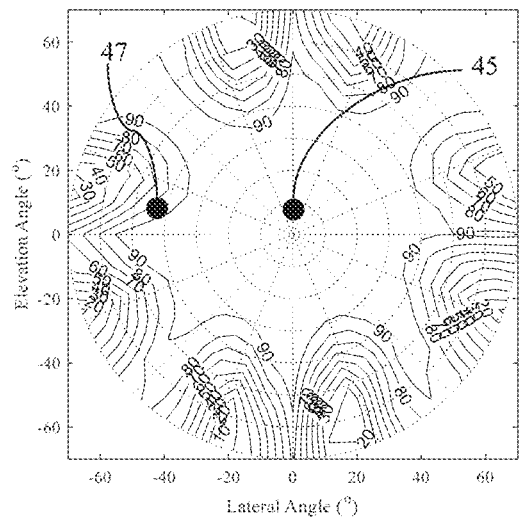
FIG. 7I is a schematic graph illustrating the polar variation of transmissive for a further polar control retarder of FIG. 7A in share mode.

FIG. 7I is a schematic graph illustrating the polar variation of transmissive for a further polar control retarder 300A of FIG. 7A in share mode. High transmission is advantageously achieved for passenger observer 45 and driver 45.

Figure 7J:
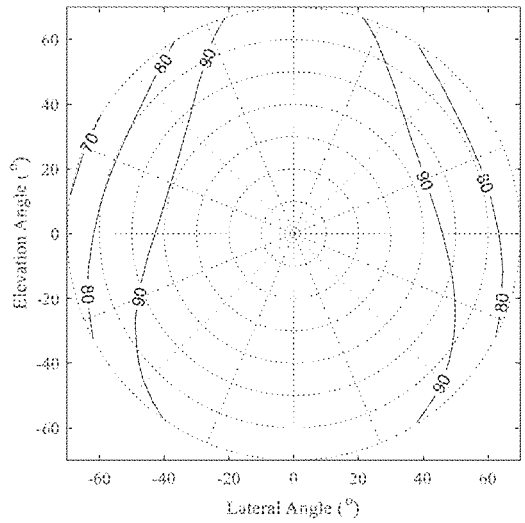
FIG. 7J is a schematic graph illustrating the polar variation of transmissive for a polar control retarder of FIG. 7A in share mode.
Figure 7K:
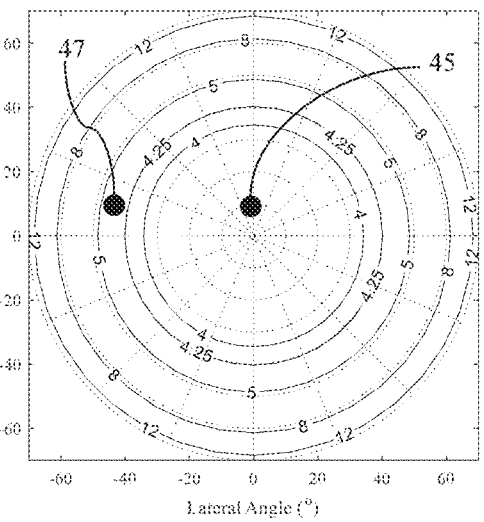
FIG. 7K is a schematic graph illustrating the polar variation of reflectivity for a polar control retarder of FIG. 7A in share mode.

FIG. 7J is a schematic graph illustrating the polar variation of transmissive for a polar control retarder of FIG. 7A in share mode; and FIG. 7K is a schematic graph illustrating the polar variation of reflectivity for a polar control retarder of FIG. 7A in share mode.

Figure 7L:
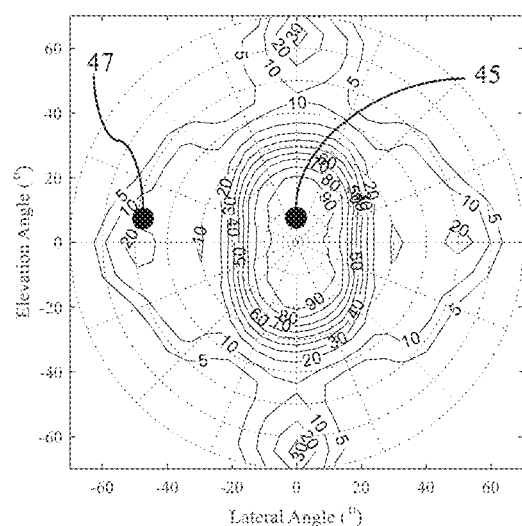
FIG. 7L is a schematic graph illustrating the polar variation of luminance for the display of FIG. 7A in share mode.

FIG. 7L is a schematic graph illustrating the polar variation of luminance for the display of FIG. 7A in share mode. Advantageously the driver observer 47 may observe the display with acceptable luminance while the passenger observer 45 sees a high luminance image.

Returning to the description of FIG. 1A and FIG. 2B for a display device 100 comprising the polar control retarder 300 of FIG. 7A, the high reflectivity background region 320B for the off-axis observer 47 may be provided by the reflectivity illustrated in FIG. 7G and the low reflectivity mark region 320A for the off-axis observer 47 may be provided by the reflectivity illustrated in FIG. 7K. The difference in the reflectivity for the off-axis observer 47 at said location may provide high background region 320B visibility in ambient illumination 412.

It would be desirable to provide control of a switchable privacy display device 100. Some approaches providing control are implemented in the following examples. In the following examples, specific examples of electrode structures and control circuits are shown, but this is not limitative and in general any of the electrode structures and control circuits disclosed herein may alternatively be applied in the following examples. Similarly, the various features of the following examples may be combined together in any combination.

The structure and addressing of illustrative electrodes 317F, 317R for the polar control retarder 300 will now be described.

Figure 8A:
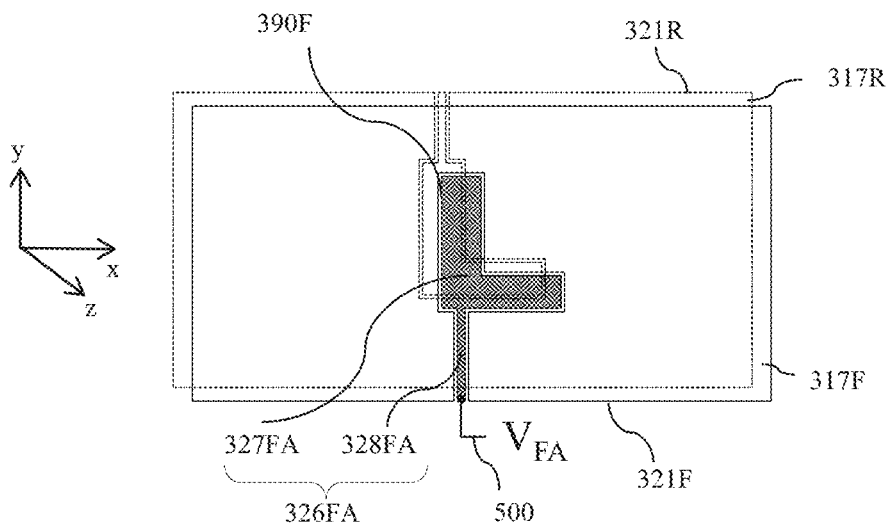
FIG. 8A is a schematic diagram illustrating a top view of the electrodes of the switchable liquid crystal polar control retarder and the driving of the top electrode pattern region A by a voltage $V_{FA}$.
Figure 8B:
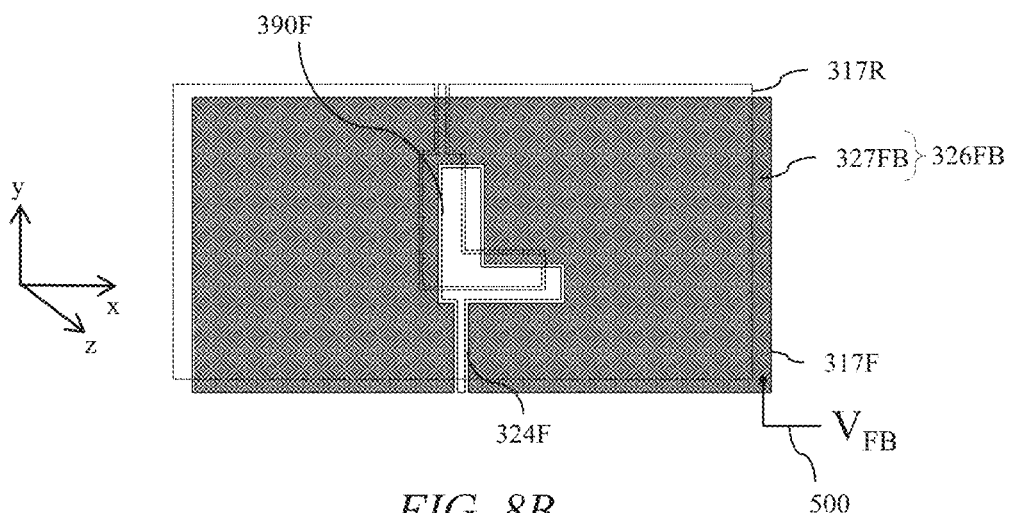
FIG. 8B is a schematic diagram illustrating a top view of the electrodes of the switchable liquid crystal polar control retarder and the driving of the top electrode pattern region B by a voltage $V_{FB}$.
Figure 8C:
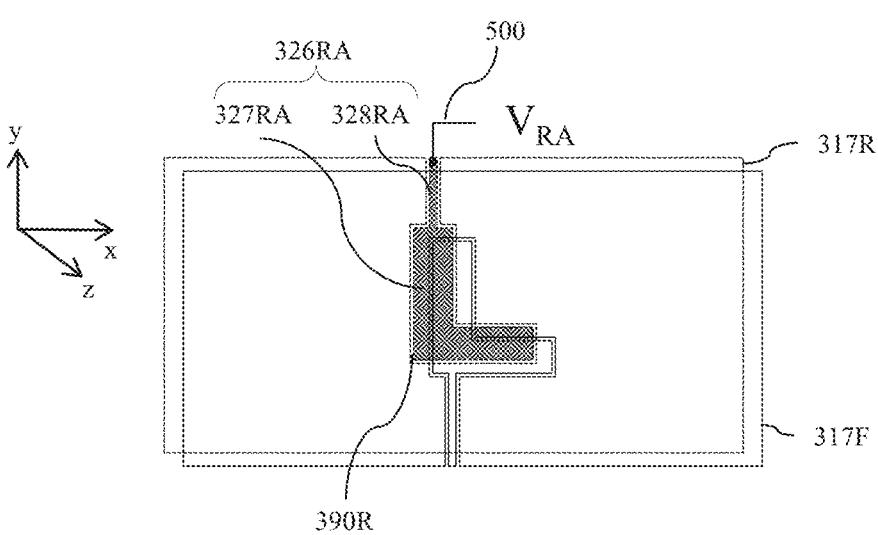
FIG. 8C is a schematic diagram illustrating a top view of the electrodes of the switchable liquid crystal polar control retarder and the driving of the bottom electrode pattern region A by a voltage $V_{RA}$.
Figure 8D:
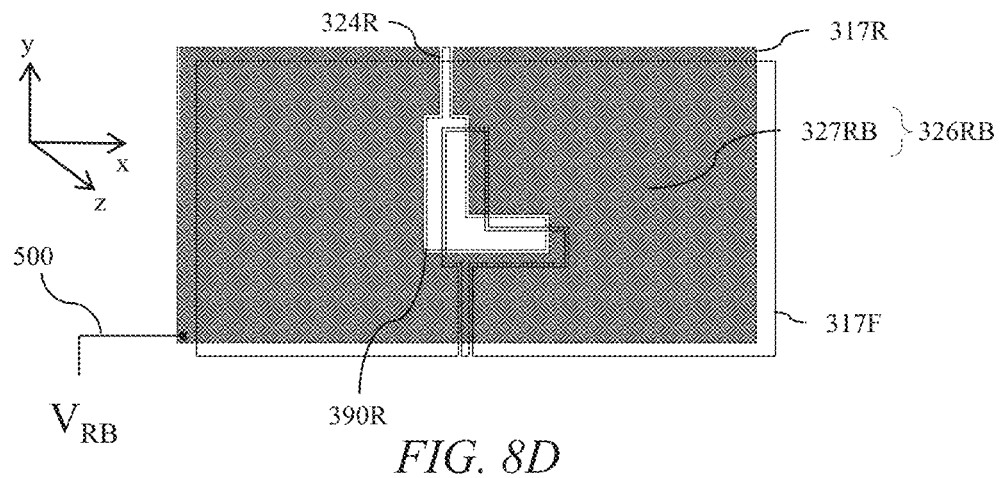
FIG. 8D is a schematic diagram illustrating a top view of the electrodes of the switchable liquid crystal polar control retarder and the driving of the bottom electrode pattern region B by a voltage $V_{RB}$.

FIG. 8A is a schematic diagram illustrating a top perspective view of the electrodes 317F, 317R of the switchable liquid crystal polar control retarder 301 and the driving of the shaded top electrode pattern region 326FA by a voltage $V_{F4}$; FIG. 8B is a schematic diagram illustrating a top perspective view of the electrodes of the switchable liquid crystal polar control retarder 301 and the driving of the shaded top electrode pattern area 327FB by a voltage $V_{FB}$; FIG. 8C is a schematic diagram illustrating a top perspective view of the electrodes of the switchable liquid crystal polar control retarder 301 and the driving of the shaded bottom electrode pattern region 326RA by a voltage $V_{R4}$; and FIG. 8D is a schematic diagram illustrating a top perspective view of the electrodes of the switchable liquid crystal polar control retarder 301 and the driving of the shaded bottom electrode pattern area 327RB by a voltage $V_{RB}$. Features of the embodiment of FIGS. 8A-D not discussed in further detail may be assumed to correspond to the features with equivalent reference numerals as discussed above, including any potential variations in the features.

In the present description, in the case that an electrode feature is adjacent the outer edge 321F, 321R of the active area of the electrode 317F, 317R respectively then the electrode feature is termed proximal (i.e. situated near to the point of connection). In the case that the electrode feature is separated from the outer edge 321F, 321R of the active area of the electrode 317F, 317R then the electrode feature is termed distal (i.e. situated away from the point of connection).

Considering FIG. 8A, the first transmissive electrode 317F is patterned to provide an electrode 326FA comprising a distal area 327FA that is not adjacent to an outer edge 321F of the first transmissive electrode 317F and a connection track 328FA that extends between the distal area 327FA and the outer edge 321F of the electrode 317F. Voltage $V_{F4}$ is applied to the connection electrode 328FA at a location outside the active area (visible portion) of the display device 100.

Considering FIG. 8B, the first transmissive electrode 317F is patterned to provide an electrode 326FB comprising a proximal area 327FB that is adjacent to an outer edge 321F of the first transmissive electrode 317F. The area 327FB is proximal, so connection track 328FB may be omitted and the electrode 326FB comprises the proximal area 327FB. Voltage $V_{FB}$ is applied to the proximal area 327FB at a location outside the active area (visible portion) of the display device 100.

The distal area 327FA and proximal area 327FB, and the connection track 328FA, and proximal area 327FB are separated by gaps 390F, and the second transmissive electrode 317R is patterned to provide plural areas 327RA, 327RB separated by gaps 390R.

Considering FIG. 8C, the second transmissive electrode 317R is patterned to provide an electrode 326RA comprising a distal area 327RA that is not adjacent to an outer edge 321R of the first transmissive electrode 317R and a connection track 328RA that extends between the distal area 327RA and the outer edge 321R of the electrode 317R. Voltage $V_{R4}$ is applied to the connection electrode 328RA at a location outside the active area (visible portion) of the display device 100.

Considering FIG. 8D, the first transmissive electrode 317R is patterned to provide an electrode 326RB comprising a proximal area 327RB that is adjacent to an outer edge 321R of the first transmissive electrode 317R. The area 327RB is proximal, so connection track 328RB may be omitted and the electrode 326RB comprises the proximal area 327RB. Voltage $V_{RB}$ is applied to the proximal area 327RB at a location outside the active area (visible portion) of the display device 100.

The distal area 327RA and proximal area 327RB, and the connection track 328RA, and proximal area 327RB are separated by gaps 390R, and the second transmissive electrode 317R is patterned to provide plural areas 327RA, 327RB separated by gaps 390R.

The plural distal areas 327FA, 327RA are each in a shape of a mark 322A for display to an off-axis observer 47 of FIG. 2B for example. The plural areas 327FA, 327RA of the first and second transmissive electrodes 317F, 317R are aligned across the layer 314 of liquid crystal material 414.

Thus referring again to the illustrative embodiment of FIG. 1A, a display device 100 for use in ambient illumination 410 comprises: a spatial light modulator 48 arranged to output light, wherein the spatial light modulator 48 comprises an output polariser 218 arranged on the output side of the spatial light modulator 48, the output polariser 218 being a linear polariser; a view angle control arrangement comprising: an additional polariser 318 arranged on the output side of the output polariser 218, the additional polariser 318 being a linear polariser; a reflective polariser 302 arranged between the output polariser 218 and the additional polariser 318, the reflective polariser 302 being a linear polariser; and at least one polar control retarder 300 arranged between the reflective polariser 302 and the additional polariser 318, the at least one polar control retarder 300 including a switchable liquid crystal retarder 301 comprising a layer 314 of liquid crystal material 414, and first and second transmissive electrodes 317F, 317R on opposite sides of the layer 314 of liquid crystal material 414, wherein each of the first and second transmissive electrodes 317F, 317R is patterned to provide plural addressable areas 327A, 327B separated by gaps 390, and at least one of the plural addressable areas 327A, 327B being in a shape of a mark region 320A for display to an off-axis observer 47.

The plural regions each include at least one distal area 327FA, 327RA that is not adjacent to an outer edge 321F, 321R of the first and second transmissive electrodes 317F, 317R and at least one proximal area 327FB, 327RB that is adjacent to an outer edge 321F, 321R of the first and second transmissive electrodes 317F, 317R.

Figure 8E:
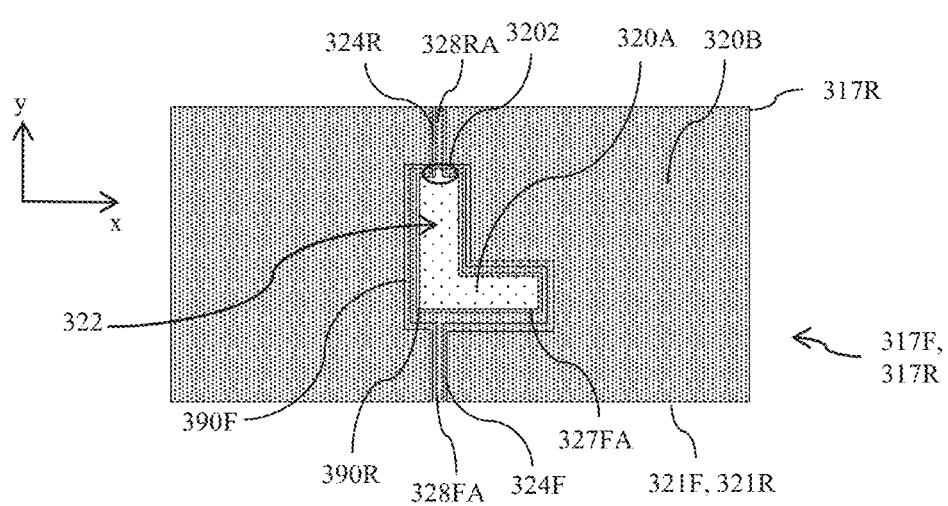
FIG. 8E is a schematic diagram illustrating in front view aligned first and second electrodes of FIGS. 8A-8D arranged to provide distal and proximal regions.

FIG. 8E is a schematic diagram illustrating in front view aligned first and second electrodes of FIGS. 8A-8D arranged to provide distal and proximal regions 320A, 320B of the mark 322. Features of the embodiment of FIG. 8E not discussed in further detail may be assumed to correspond to the features with equivalent reference numerals as discussed above, including any potential variations in the features.

The at least one connection tracks 328FA, 328RA connected to the areas 327FA, 327RA of the first and second transmissive electrodes 317F, 317R that are aligned with the at least one distal mark region 320A are not aligned with each other across the layer 314 of liquid crystal material 414. That is connection track 328FA is not aligned to connection track 328RA while distal area 327FA is aligned to distal area 327RA.

Areas of the first and second transmissive electrodes 317F, 317R that are aligned with the at least one proximal background region 320B have at least one connection slit 324F, 324R through which extend at least one connection track 328FA, 328RA connected to areas of the first and second transmissive electrodes 317F, 317R that are aligned with the at least one distal mark region 320A, the at least one connection track 328FA, 328RA extending to the outer edge 321F, 321R of the first and second transmissive electrodes 317F, 317R, the control system 500 being connected to the at least one connection track 328FA, 328RA at the outer edge 321F, 321R for applying voltages $V_{FA}$, $V_{RA}$ to the at least one distal mark region 320A. In other words, the first and second transmissive electrodes 317F, 317R are further patterned to provide connection tracks 328FA, 328RA connected to the at least one distal areas 327FA, 327RA and extending to an outer edge 321F, 321R of the first and second transmissive electrodes 317F, 317R. The control system 500 is connected to the connection tracks 328FA, 328RA at the outer edge 321F, 321R respectively for applying voltages $V_{FA}$, $V_{RA}$ to the distal areas 327FA, 327RA.

FIG. 8E illustrates that in the region of alignment of the distal areas 327FA, 327RA then the first mark region 320A is provided, and otherwise the second background region 320B is provided.

The plural regions 320A, 320B include at least one distal mark region 320A that is not adjacent to an outer edges 321F, 321R of the first and second transmissive electrodes 317F, 317R and at least one proximal background region 320B that is adjacent to the outer edge of the first and second transmissive electrodes 317F, 317R.

The mark 322 may comprise distal mark region 320A advantageously without visibility of connection tracks 328FA, 328RA in the pattern of the mark 322.

FIG. 8E further illustrates connection overlap region 3202, as will be discussed further in FIG. 13B hereinbelow.

Figure 8F:
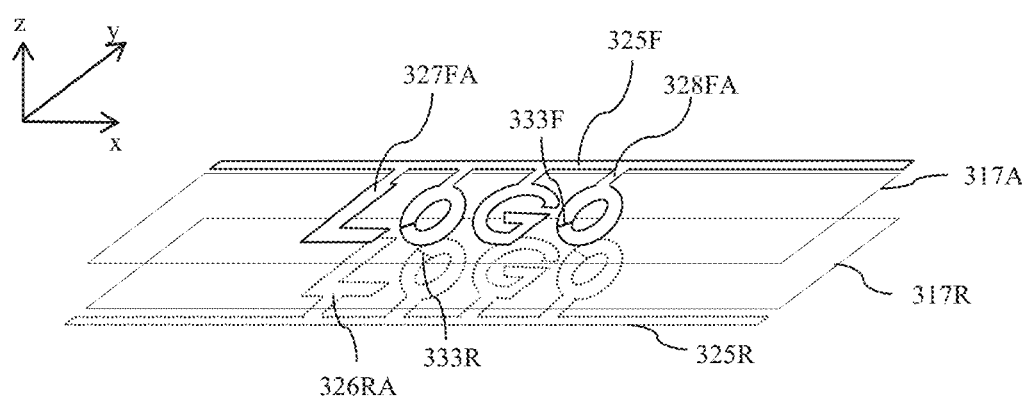
FIG. 8F is a schematic diagram illustrating a perspective side view of alternative top and bottom electrodes for a switchable liquid crystal polar control retarder.

FIG. 8F is a schematic diagram illustrating a perspective side view of alternative top and bottom electrodes 317F, 317R for a switchable liquid crystal polar control retarder 301. Features of the embodiment of FIG. 8F not discussed in further detail may be assumed to correspond to the features with equivalent reference numerals as discussed above, including any potential variations in the features.

FIG. 8F illustrates that connection electrodes 328FA may provide connection between the distal areas 327FA and a bus bar 325F, and that connection electrodes 328RA may provide connection between the distal areas 327RA and a bus bar 325R. Electrical connection the mark region 320A that corresponds to the overlap of areas 327FA, 327RA may be provided with reduced complexity. Bridging tracks 333F, 333R may be provided for connection to islands 329 in the mark 322 as will be described hereinbelow.

In operation, electrodes 326FA, 326FB, 326RA, 326RB are desirably driven as will be described hereinbelow such that the mark region 320A and mark background region 320B in the region of the overlap of areas of electrodes as described in TABLE 3A.

TABLE 3A

| Front electrode | Rear electrode | Mark 322 region provided in electrode overlap area |
|---|---|---|
| 326FA | 326RA | 320A |
| 326FA | 326RB | 320B |
| 326FB | 326RA | |
| 326FB | 326RB | |

Illustrative embodiments for various modes of operation will now be described. It would be desirable to provide driving of the mark 322 in FIGS. 1A-B comprising reflective polariser 302 with at least the properties of the modes illustrated in TABLE 3B.

TABLE 3B

| Electrode overlap | | Display properties to an off-axis observer 47 | | | | | |
|---|---|---|---|---|---|---|---|
| Front electrode 317F region | Rear electrode 317R region | Privacy mode | Share mode | Mark mode | Inverted mark mode | Privacy mark mode | Inverted privacy mark mode |
| Distal area 327FA | Distal area 327RA | High ρ & low P | Low ρ & high P | 320A: High ρ | 320A: Low ρ | 320A: High $ρ_A$ and & low $P_A$ | 320A: High $ρ_A$ and & low $P_A$ |
| Proximal area 327FB Distal area 327FA Proximal area 327FB Connection track 328FA Proximal area 327FB | Distal area 327RA Proximal area 327RB Proximal area 327RB Proximal area 327RB Connection track 328RA | | | 320B: Low ρ | 320B: High ρ | 320B: High $ρ_B > ρ_A$ & low $P_B < P_A$ | 320B: High $ρ_B < ρ_A$ & low $P_B > P_A$ |

In an illustrative embodiment of 'High ρ & low P', high display reflectivity ρ(θ=45°) to the off-axis observer 47 at an observation direction with an azimuthal angle θ of 45° may be 30% and low off-axis relative luminance, P(θ=45°) may be 0.3%.

In an illustrative embodiment of 'Low ρ & high P', low display reflectivity ρ(θ=45°) to the off-axis observer 47 at an observation direction with an azimuthal angle θ of 45° may be 6% and high off-axis relative luminance, P(θ=45°) may be 10%.

In an illustrative embodiment of 'High $ρ_B > ρ_A$', high display reflectivities ρ(θ)=45°) to the off-axis observer 47 at an observation direction with an azimuthal angle θ of 45° may be 25% and 30% and in an illustrative embodiment of low PB >PA' low off-axis relative luminances, P(θ=45°) may be 0.4% and 0.3% respectively. Such difference in reflectivity in luminance and reflectivity may be achieved by control of the voltages $V_{FA}$, $V_{FB}$, $V_{RA}$, $V_{RB}$ respectively as will be described further hereinbelow.

It would be desirable to provide driving of the mark 322 in FIG. 1D-G with at least the properties of the modes illustrated in TABLE 3C. The embodiments of TABLE 3C differ from TABLE 3B in that no reflective polariser 302 is provided so that the reflectivity is not switched between the modes of operation or between the distal mark region 320A and proximal mark background region 320B.

TABLE 3C

| Electrode overlap | | Appearance of mark 322 to an off-axis observer 47 | | | |
|---|---|---|---|---|---|
| Front electrode 317F region | Rear electrode 317R region | Privacy mode | Share mode | Privacy mark mode | Inverted privacy mark mode |
| Distal area 327FA | Distal area 327RA | Low P | HighP | Low $P_A$ | Low $P_A$ |
| Proximal area 327FB | Distal area 327RA | | | Low $P_B < P_A$ | Low $P_B > P_A$ |
| Distal area 327FA | Proximal area 327RB | | | | |
| Proximal area 327FB | Proximal area 327RB | | | | |
| Connection track 328FA | Proximal area 327RB | | | | |
| Proximal area 327FB | Connection track 328RA | | | | |

Illustrative embodiments of exemplary operating modes will now be described further in TABLE 3D.

Considering the illustrative embodiment of FIG. 2B, the off-axis observer 47 will see the contrast of the distal mark regions 320A and proximal background regions 320B because of the different reflectivities provided by the illumination of the display. Advantageously a mark 322 will be observed.

Considering the illustrative embodiment of FIG. 3B, the off-axis observer 47 will see the logo illuminated, while image data provided in the proximal background region 320B is provided with a high security factor S>1 so image data is not observed.

Considering the illustrative embodiment of FIG. 4B, the off-axis observer 47 is provided with S>1.0 so that no image is visible in both distal mark regions 320A and proximal background regions 320B.

Considering the illustrative embodiment of FIG. 4D, the off-axis observer 47 is provided with S<0.2 so that an image is visible in both distal mark regions 320A and proximal background regions 320B with desirably high contrast.

Considering the illustrative embodiment of FIG. 5B, the off-axis observer 47 is provided with S>1.0 so that no image is visible in both distal mark regions 320A and proximal background regions 320B. The distal and proximal mark regions 320A, 320B are provided with slightly different reflectivities and luminances, so that some contrast of the mark 322 is observed. Advantageously for the on-axis user, the variations in reflectivity and luminance seen on the display are small and a uniform high contrast image is seen.

An alternative arrangement of electrodes 326 will now be described.

Figure 9A:
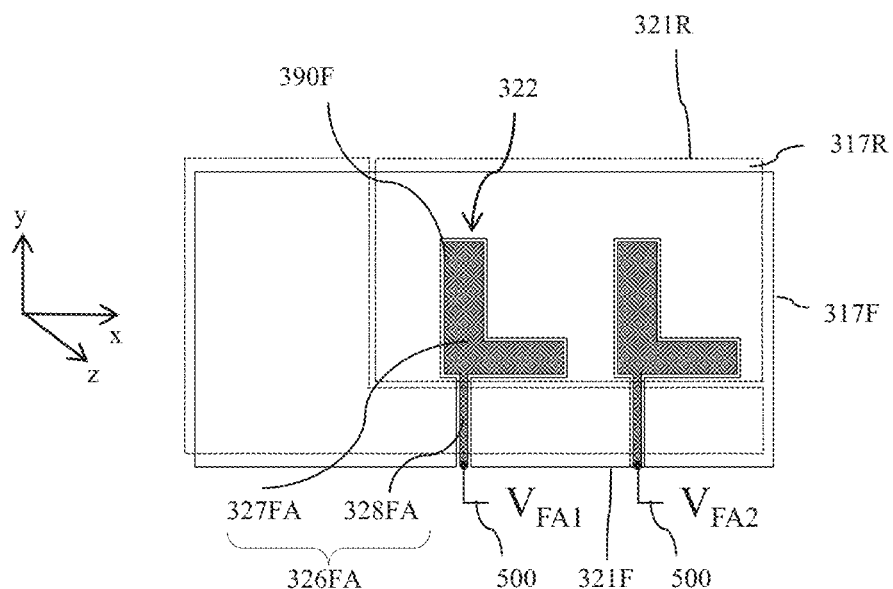
FIG. 9A is a schematic diagram illustrating a top view of alternative electrodes of the switchable liquid crystal polar control retarder and the driving of the top electrode pattern region A by a voltage $V_{FA}$.
Figure 9B:
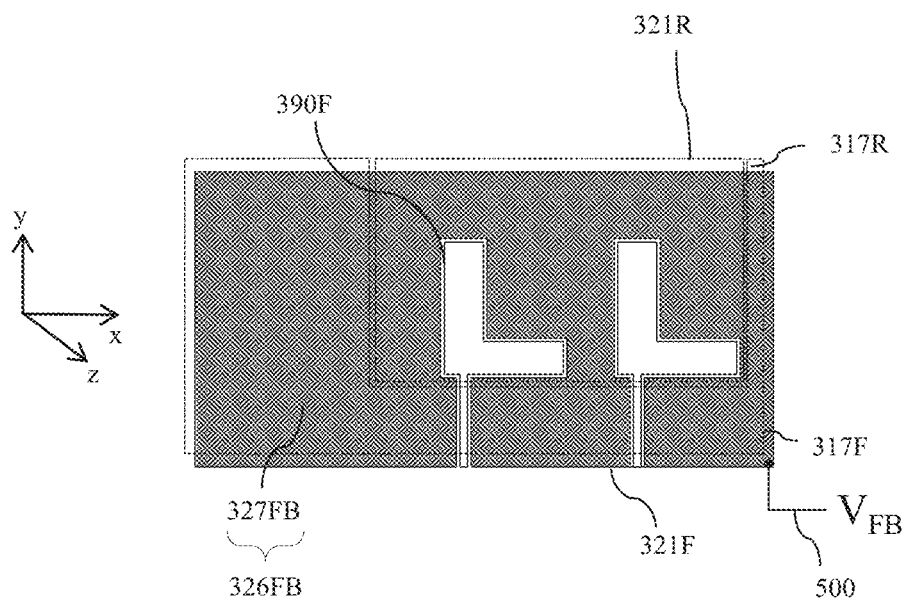
FIG. 9B is a schematic diagram illustrating a top view of alternative electrodes of the switchable liquid crystal polar control retarder and the driving of the top electrode pattern region B by a voltage $V_{FB}$.
Figure 9C:
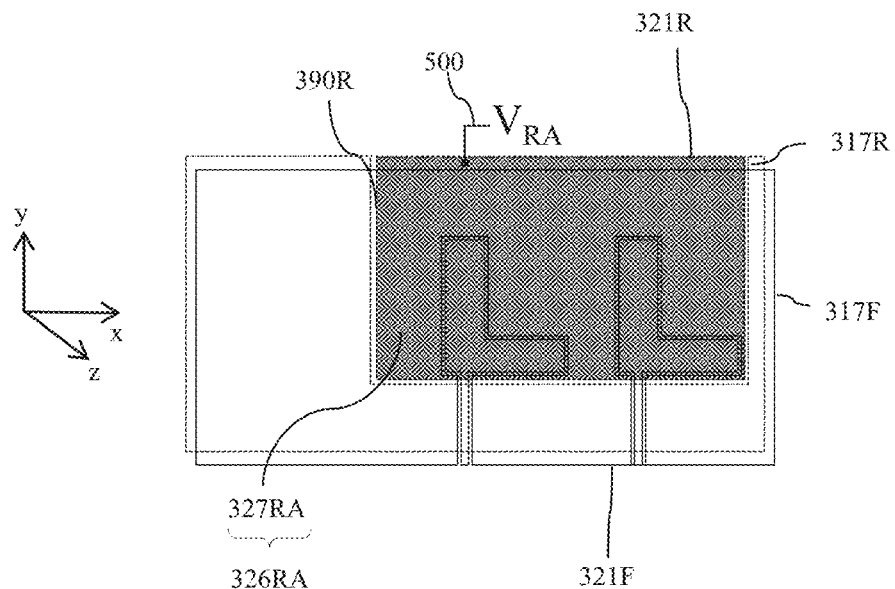
FIG. 9C is a schematic diagram illustrating a top view of alternative electrodes of the switchable liquid crystal polar control retarder and the driving of the bottom electrode pattern region A by a voltage $V_{RA}$.
Figure 9D:
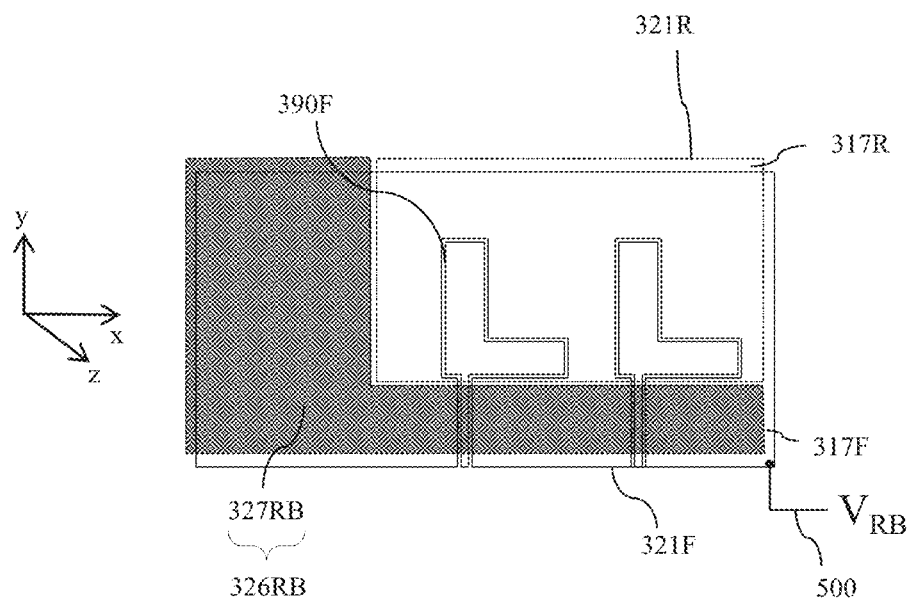
FIG. 9D is a schematic diagram illustrating a top view of alternative electrodes of the switchable liquid crystal polar control retarder and the driving of the bottom electrode pattern region B by a voltage $V_{RB}$.

FIG. 9A is a schematic diagram illustrating a top view of alternative electrodes of the switchable liquid crystal polar control retarder and the driving of the top electrode pattern region A by a voltage $V_{FA}$; FIG. 9B is a schematic diagram illustrating a top view of alternative electrodes of the switchable liquid crystal polar control retarder and the driving of the top electrode pattern region B by a voltage $V_{FB}$; FIG. 9C is a schematic diagram illustrating a top view of alternative electrodes of the switchable liquid crystal polar control retarder and the driving of the bottom electrode pattern region A by a voltage $V_{RA}$; and FIG. 9D is a schematic diagram illustrating a top view of alternative electrodes of the switchable liquid crystal polar control retarder and the driving of the bottom electrode pattern region B by a voltage $V_{RB}$. Features of the embodiment of FIGS. 9A-D not discussed in further detail may be assumed to correspond to the features with equivalent reference numerals as discussed above, including any potential variations in the features.

In the alternative embodiment of FIGS. 9A-D, only the front electrode 317F comprises the electrode 326FA comprising distal area 327FA with the shape of the mark 322A, and connection track 328FA. By comparison with the embodiment of FIGS. 8A-8B, the rear electrode 317R comprises electrode 326RA with area 327RA that does not have the shape of the mark.

The operation and driving of the embodiment of FIGS. 9A-D is similar to or the same as for FIGS. 8A-8D to achieve the desirable mark 322A as described elsewhere herein.

TABLE 3D

| Illustrative embodiment | Mark region | Reflectivity, ρ | Relative luminance, P | Ratio of illuminance to luminance, α | Security Factor, S |
|---|---|---|---|---|---|
| FIG. 2B | 320A | 6% | | | |
| | 320B | 30% | | | |
| FIG. 3B | 320A | 6% | 10% | 1.0 | 0.08 |
| | 320B | 30% | 0.3% | | 1.5 |
| FIG. 4B | 320A | 30% | 0.3% | 1.0 | 1.5 |
| | 320B | | | | |
| FIG. 4D | 320A | 6% | 10% | 1.0 | 0.08 |
| | 320B | | | | |
| FIG. 5B | 320A | 25% | 0.4% | 1.0 | 1.3 |
| | 320B | 30% | 0.3% | | 1.5 |
| FIG. 5D | 320A | 5% | 0.4% | 4.0 | 1.2 |
| | 320B | 5% | 0.3% | | 1.3 |

The complexity of the rear electrode 317R may be reduced, advantageously achieving reduced cost.

Further, FIGS. 9A-D illustrate that the characters of the logo may be individually addressed to achieve dynamically modulated patterns from the logo for example. The dynamic modulation may be by gradually adjusting the voltage and/or phase values or may be step changes. The characters or parts of the logo may be addressed together or at different times. The addressing may be provided by adjustment of voltage to respective different connection tracks 328FA, for example providing different addressing signal timing, voltages and/or phases for $V_{FA1}$ and $V_{FA2}$. Advantageously the visibility of the logo may be increased. Such time modulated patterns may be provided in other of the marks as described elsewhere herein and said time modulation is not limited to the embodiment of FIGS. 9A-D.

Figure 10A:
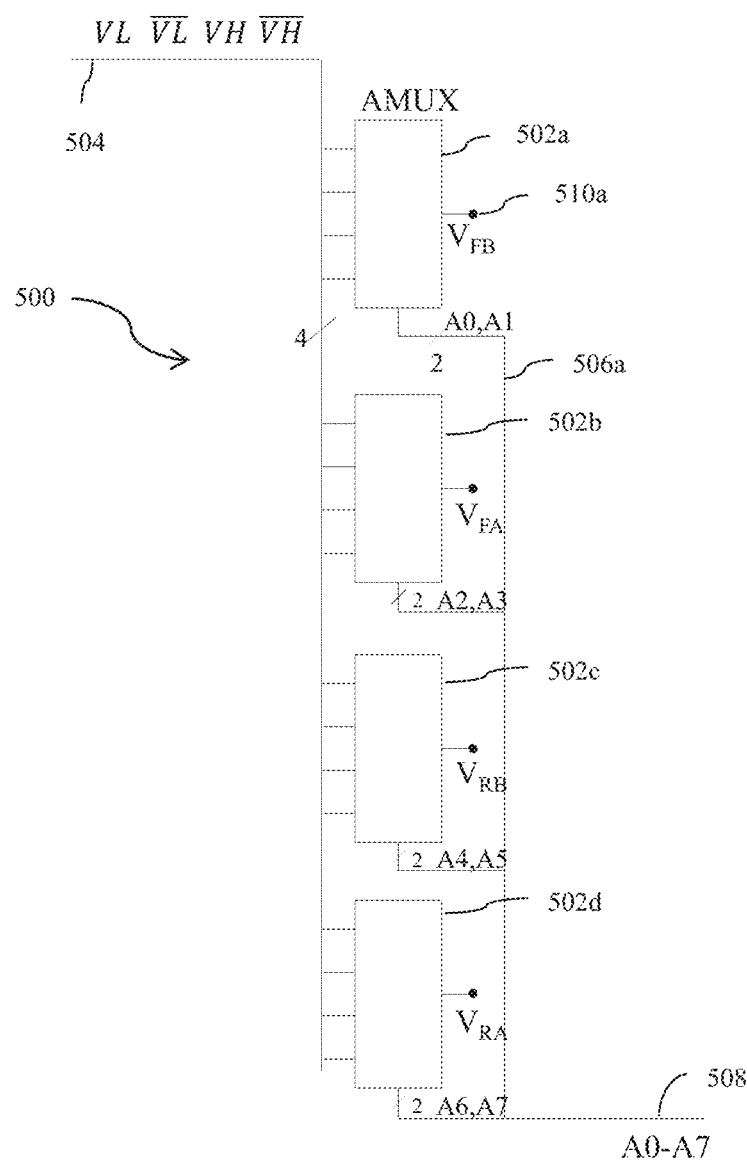
FIG. 10A is a schematic diagram illustrating an electrical circuit for the addressing of the patterned electrodes of FIGS. 7A-B and FIGS. 8A-B.

FIG. 10A is a schematic diagram illustrating an electrical circuit of the control system 500 for the driving of the patterned electrodes 317F, 317R of FIGS. 7A-B and FIGS. 8A-B. Features of the embodiment of FIG. 10A not discussed in further detail may be assumed to correspond to the features with equivalent reference numerals as discussed above, including any potential variations in the features.

Figure 10B:
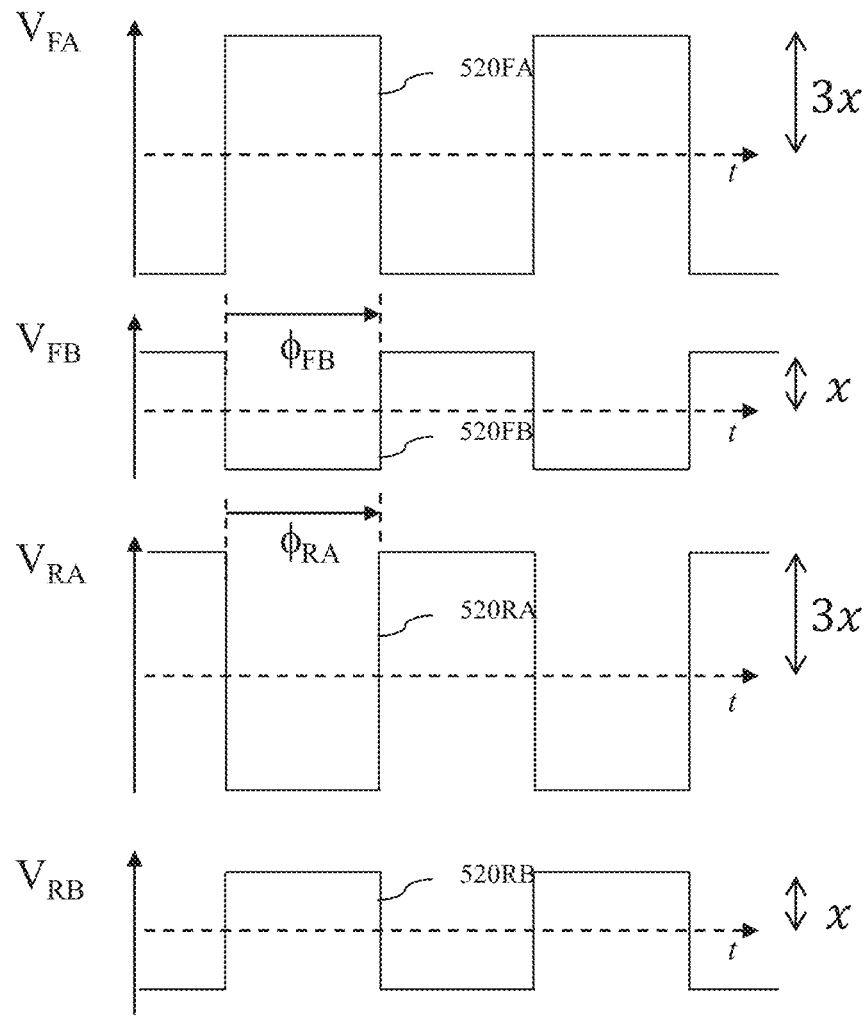
FIG. 10B is a schematic diagram illustrating exemplary voltage signals for the addressing of the patterned electrodes of FIGS. 8A-D.

Four voltages are formed into an input bus 504, which delivers signals to each of four multiplexers 502a-d. The voltages on the input bus 504 may be analog signals and may for example take the exemplary form of square waves consisting of two voltages and their inverse pairs as illustrated in FIG. 10B and FIG. 10D. Each multiplexer 502a-d selects one of the four input voltages and transfers it to its respective output 510a-d. Which of the four inputs is to be transferred to the output 510a is selected by the 2-bit digital address 506a. Similarly for the other multiplexers and outputs which are not labelled for simplicity. The four 2-bit addresses from each multiplexer 502a-d form an address A0-A7, byte 508. Thus each of the voltages $V_{FB}$, $V_{FA}$, $V_{RB}$, $V_{RA}$ may be independently selected from the four input voltages 504 as determined by the digital address byte 508. Controlling the address byte 508 from, for example, a microprocessor can be used to select which mode the privacy display device 100 operates in as described elsewhere herein.

Returning to the description of TABLE 1, the addressing voltage refers to the voltage applied across the liquid crystal layer 314 to achieve reorientation of the liquid crystal molecules 414 to achieve desirable retardation of light propagating through the cell for the selected mode.

Further the addressing voltage signal 520 provides DC balancing of the output. For a square wave voltage signal 520 in the illustrative example of TABLE 1 for the privacy mode, the square wave would thus provide output at +2.3V and −2.3V.

The driving of the arrangement of FIG. 1A using the plural electrodes 326FA, 326FB, 326RA, 326RB of FIGS. 8A-D will now be described.

Figure 10C:
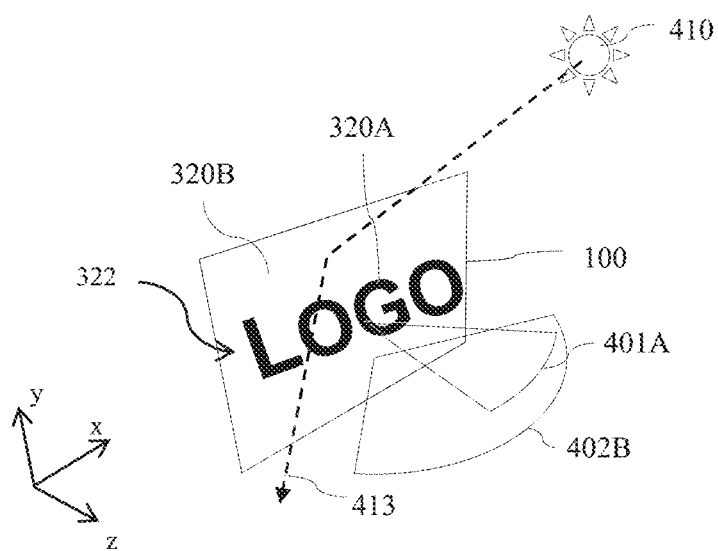
FIG. 10C is a schematic diagram illustrating a look-down off-axis perspective view of a display illuminated by an ambient light source wherein the patterned electrode liquid crystal polar control retarder is addressed with the voltage signals of FIG. 10B.
Figure 10D:
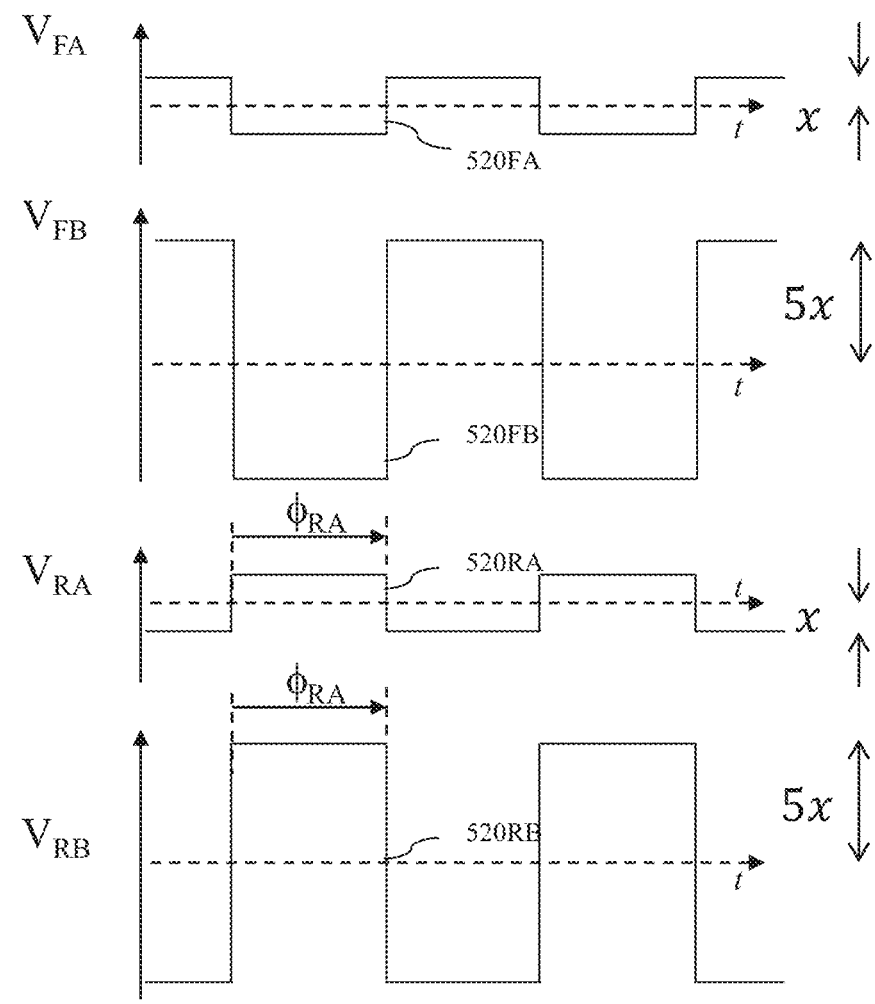
FIG. 10D is a schematic diagram illustrating exemplary voltage signals for the addressing of the patterned electrodes of FIGS. 8A-D.

FIG. 10B is a schematic diagram illustrating exemplary voltage signals 520FA, 520FB, 520RA, 520RB for voltages $V_{FA}$, $V_{FB}$, $V_{RA}$, $V_{RB}$ respectively against time, t for the addressing of the patterned electrodes 317F, 317R of FIGS. 8A-D; and FIG. 10C is a schematic diagram illustrating a look-down off-axis perspective view of a display device 100 illuminated by an ambient light source 410 wherein the liquid crystal polar control retarder 301 with patterned electrodes 317F, 317R is addressed with the voltage signals 520FA, 520FB, 520RA, 520RB of FIG. 10B. Features of the embodiments of FIGS. 10B-C not discussed in further detail may be assumed to correspond to the features with equivalent reference numerals as discussed above, including any potential variations in the features.

The control system 500 is arranged to apply respective voltage signals 520FA, 520RA to each of the connection tracks 328FA, 328RA connected to the distal areas 327FA, 327RA of the first and second transmissive electrodes 317F, 317R. The control system 500 is further arranged to apply respective voltage signals 520FB, 520RB to each of the proximal areas 327FB, 327RB, that is the control system 500 is further arranged to apply respective voltage signals 520FB, 520RB to the at least one proximal background region 320B.

The voltage signals 520FA, 520RA, 520FB, 520RB have amplitude and phase that are selected to apply voltages across the first and second transmissive electrodes 317F, 317R that drive the plural regions 320A, 320B of the layer 314 of liquid crystal material 414 into a desired state in accordance with the mode of operation in each of the at least one distal mark region 320A, the parts of the at least one proximal background region 320B aligned with the at least one connection track 328FA, 328RA, and the remainder of the proximal background regions 320B.

Illustrative amplitudes of voltage, $V_{FA}$, $V_{FB}$, $V_{RA}$, $V_{RB}$ and respective phases (1:1FA, (1:1FB, SRA, 4RB of the voltage signals is provided in the first data column of TABLE 4 where x is a selected voltage level. The overlap voltages, that are DC balanced are further provided.

TABLE 4

Figure 10E:
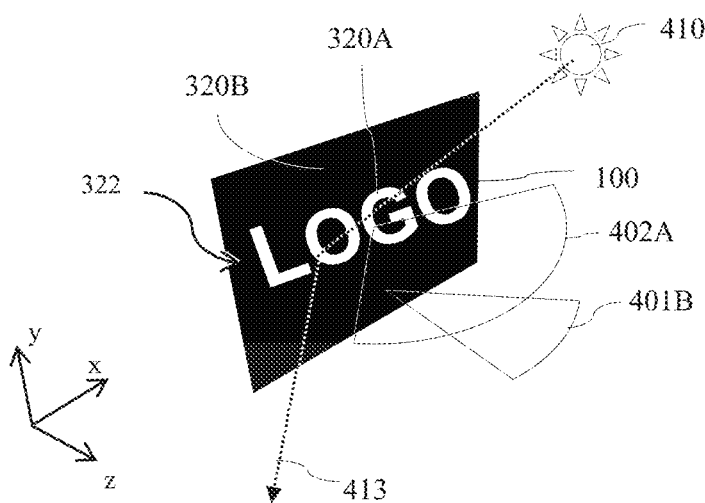
FIG. 10E is a schematic diagram illustrating a look-down off-axis perspective view of a display illuminated by an ambient light source wherein the patterned electrode liquid crystal polar control retarder is addressed with the voltage signals of FIG. 10D.

|  | FIGS. 10B-C | FIGS. 10D-E |
| --- | --- | --- |
| Mark 322 appearance to off-axis observer 47, Mark region 320A | Non-reflective | Reflective |
| Mark 322 appearance to off-axis observer 47, Background region 320B | Reflective | Non-reflective |
| $V_{FA}$ | 3x | x |
| $\phi_{FA}$ | 0 | 0 |
| $V_{FB}$ | x | 5x |
| $\phi_{FB}$ | π | 0 |
| $V_{RA}$ | 3x | x |
| $\phi_{RA}$ | π | π |
| $V_{RB}$ | x | 5x |
| $\phi_{RB}$ | 0 | π |
| Electrode 326FA-326RA overlap area difference voltage | 6x | 2x |
| Electrode 326FB-326RB overlap area difference voltage | 2x | 10x |
| Electrode 326FA-326RB & Electrode 326FB-326RA overlap area difference voltage | 2x | 6x |

Each of the voltage signals 520 have amplitude and phase that are selected to apply voltages $V_F$, $V_R$ across the first and second transmissive electrodes 317F, 317R that drive the layer 314 of liquid crystal material 414 into a desired state in accordance with the mode of operation in (i) each of the distal areas 327FA, 327RA overlap, (ii) the overlap between the connection tracks 328FA and the proximal areas 327RB, 327FB respectively and (iii) in the remainder of the proximal areas 327FB, 327RB.

For the illustrative embodiment of TABLE 1, and FIGS. 1D-E the value of x is 1.15V. In alternative embodiments comprising different structures of polar control retarder 300, the value of x may be adjusted accordingly to achieve desirable high reflectivity in the mark display mode.

In the mark display mode, the mark region 320A is provided by overlap areas of electrode 326FA with electrode 326RA with voltage that is 6.9V. The positive dielectric anisotropy liquid crystal molecules 414 are driven to a state that provides low reflectivity for off-axis observer 47, for example as illustrated in FIG. 1G.

In the mark display mode of FIGS. 2A-B the background region 320B is provided by the overlap of electrode 326FA with electrode 326RB, overlap of electrode 326FB with electrode 326RB, and overlap of electrodes 326FB with electrode 326RA with voltage that are each 6.9V. The positive dielectric anisotropy liquid crystal molecules 414 are driven to a state that provides low reflectivity for off-axis observer 47, for example as illustrated in FIGF. 1F.

Advantageously the visibility of the connection electrodes 328FA, 328RA is minimised. Large size connection electrodes 328FA, 328RA may be provided, with low resistance. High uniformity of voltage may be achieved across the aperture of the display device 100. Uniformity of transmission and reflectivity in narrow angle and wide angle operation modes may be advantageously achieved.

In the operational share mode and narrow angle mode of the display device 100, the electrodes 317FA, 317FB may be driven with a common voltage signal and the electrodes 317RA, 317RB may for example be connected to ground. Advantageously the complexity of the addressing arrangement may be reduced and visibility of residual mark region 320A reduced.

It may be desirable to provide a reflective mark region 320A and non-reflective background region 320B.

FIG. 10D is a schematic diagram illustrating alternative exemplary voltage signals 520FA, 520FB, 520RA, 520RB for voltages $V_{FA}$, $V_{FB}$, $V_{RA}$, $V_{RB}$ respectively against time, t for the addressing of the patterned electrodes 317F, 317R of FIGS. 8A-D; and FIG. 10E is a schematic diagram illustrating a look-down off-axis perspective view of a display device 100 illuminated by an ambient light source 410 wherein the liquid crystal polar control retarder 301 with patterned electrodes 317F, 317R is addressed with the voltage signals 520FA, 520FB, 520RA, 520RB of FIG. 10D. Features of the embodiments of FIGS. 10D-E not discussed in further detail may be assumed to correspond to the features with equivalent reference numerals as discussed above, including any potential variations in the features.

In the alternative embodiment of FIGS. 10D-E, illustrative amplitudes of voltage $V_{FA}$, $V_{FB}$, $V_{RA}$, $V_{RB}$ and respective phases $\phi_{FA}$, $\phi_{FB}$, $\phi_{RA}$, $\phi_{RB}$ of the voltage signals is provided in the second data column of TABLE 4. The overlap voltages, that are DC balanced are further provided for the illustrative embodiment of TABLE 1, and FIGS. 1D-E the exemplary value of x is 1.15V.

In the mark display mode the mark region 320A is provided by a voltage of 2.3V. The positive dielectric anisotropy liquid crystal molecules 414 are driven to a state that provides high reflectivity for off-axis observer 47, for example as illustrated in FIG. 1G.

In the mark display mode the background region 320B is provided by the overlap of electrode 326FB with electrode 326RB voltage that is 11.5V; and by the overlap of electrodes 326FA with electrode 326RB or overlap of electrode 326FB with electrode 326RA that are each 6.9V. At such different voltages the positive dielectric anisotropy liquid crystal molecules 414 are driven a substantially saturated alignment state, that is the alignment directions are effectively the same for the two different voltages. High reflectivity for example as illustrated in FIG. 1F is advantageously provided for the mark region 320A for off-axis observer 47 and the background region 320B has low reflectivity.

The electrode 326FA, 326RA and electrode 326FB, 326RB have different areas according to the shape of mark 322 so that the capacitance associated with the mark regions 320A, 320B are mark shape dependent. Similarly, the sheet resistance of the electrodes means that the series resistance of the electrodes in the two regions driven by the drive circuit are also slightly different. In general, the two regions 320A, 320B present slightly different RC (resistance* capacitance) impedances to the drive circuit. This difference may be corrected by adding resistors in series with the electrodes and/or capacitors in parallel with a pair of electrodes (for example electrode 326FA and electrode 326RA) to improve the matching of the respective RC loads to the drive circuit. The capacitance may be added to the electrode pair with the smallest intrinsic capacitance. The phase and/or amplitude of the respective drive signals may be adjusted to tune the visual appearance of the display. The visibility of the electrodes to the user 47 in share mode, privacy mode and head-on use mode may advantageously be reduced. Balancing the impedance of regions 320A, 320B means that it is possible to drive the regions with the same voltage rather than slightly different voltages in some modes of operation. Alternatively the electrode voltages and/or phases may be adjusted to compensate for the difference in impedance of the two regions 320A, 320B.

It may be desirable to provide control of voltages by means of phase alone.

FIG. 11A is a schematic phase diagram of the respective phases for an exemplary driving embodiment of the arrangement of FIGS. 8A-D in the mark display mode by means of phase control; and FIG. 11B is a schematic diagram illustrating exemplary voltage signals for the addressing of the patterned electrodes of FIGS. 8A-D comprising constant amplitude voltages and phase shift control. Features of the embodiments of FIGS. 11A-B not discussed in further detail may be assumed to correspond to the features with equivalent reference numerals as discussed above, including any potential variations in the features.

The operation of a liquid crystal layer driven by a phase controlled signal will now be described.

Considering a pair of electrodes 317F, 317R across a liquid crystal layer 314, for example as illustrated in FIGS. 8A-D, the voltage $V_F$ is applied to the first electrode 317F and the voltage $V_R$ is applied to the second electrode 317R. For an amplitude A, angular frequency ω and phase difference φ, then the time t dependent voltages $V_F$, $V_R$ are given by the expressions:

$$V_F(t) = A \sin(\omega t) \qquad \text{eqn. 13a}$$

$$V_R(t) = A \sin(\omega t + \phi) \qquad \text{eqn. 13b}$$

The liquid crystal material 414 of the liquid crystal layer 314 responds to the RMS voltage applied across the layer which can be shown by integration over a cycle, to be:

$$V_{rms} = A\sqrt{1-\cos\phi} \qquad \text{eqn. 14}$$

Considering the embodiment of FIGS. 8A-D, an alternative drive scheme may be provided where signals are provided with a constant sinusoidal amplitude A and a phase modification is provided, wherein the respective drive voltages $V_{FA}$, $V_{FB}$, $V_{RA}$, $V_{RB}$ are provided with relative phases $\Delta_{FA}$, $\phi_{FB}$, $\phi_{RA}$, $\phi_{RB}$ wherein:

$$VFA(t) = A\sin(\omega t + \phi_{FA}) \qquad \text{eqn. 15a}$$

$$VRB(t) = A\sin(\omega t + \phi_{FB}) \qquad \text{eqn. 15b}$$

$$VRA(t) = A\sin(\omega t + \phi_{RA}) \qquad \text{eqn. 15c}$$

$$VRB(t) = A\sin(\omega t + \phi_{RB}) \qquad \text{eqn. 15d}$$

In the illustrative embodiment of FIG. 11A, phases $\phi_{FA}$, $\phi_{FB}$, $\phi_{RA}$, $\phi_{RB}$ are illustrated, with respective common phase differences, $\Delta$.

In the alternative embodiment of FIG. 11B, signals $V_{FA}$, $V_{FB}$, $V_{RA}$, $V_{RB}$ have equal amplitudes A and varying phase time shifts $\Phi$ in multiples of time shift i corresponding to phase shift $\Delta$. The equal phase differences between adjacent phases $\phi_{FA}$, $\phi_{FB}$, $\phi_{RA}$, $\phi_{RB}$ means they have the same RMS voltage and therefore will drive the liquid crystal cell polar control retarder 301 to the same optical state in respective electrode overlap areas. The phase difference between the electrodes $\phi_{FA}$ and $\phi_{RA}$ corresponding to the mark (logo) region is however 3Δ, resulting in a different RMS voltage and a different optical state of liquid crystal cell polar control retarder 301.

For a desirable RMS addressing voltage $V_B$ for the proximal mark background region 320B, the phase difference $\Delta$ is given by the relation:

$$\Delta = \cos^{-1}\left(1 - \frac{V_B^2}{A^2}\right) \qquad \text{eqn. 16}$$

and since the phase difference of the drive waves in the distal mark region 320A is 3Δ, its RMS voltage $V_A$ is $$V_A = A \cdot \sqrt{(1-\cos(3\Delta))} \qquad \text{eqn. 17}$$

giving a voltage drive RMS ratio $V_A/V_B$, =RMSr:

$$RMSr(\Delta) = \sqrt{\frac{1-\cos(3\Delta)}{1-\cos(\Delta)}} \qquad \text{eqn. 18}$$

Figure 11C:
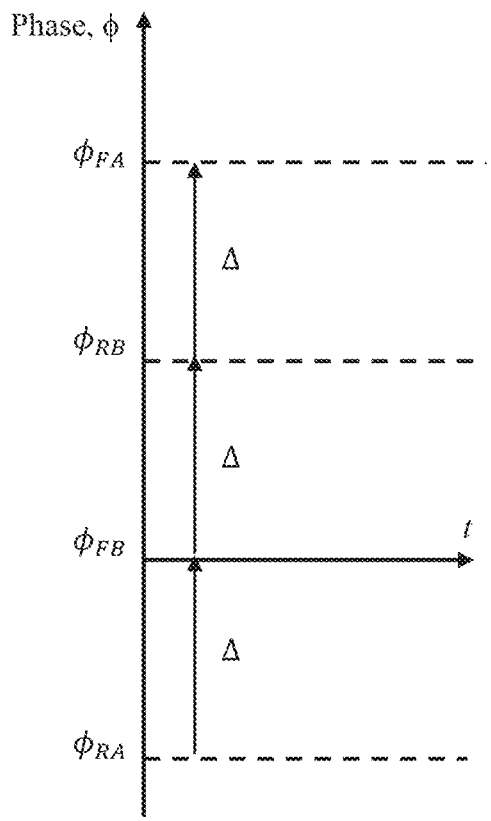
FIG. 11C is a schematic graph illustrating the ratio of the normalised RMS voltage ratio as a function of phase step.
Figure 11C:
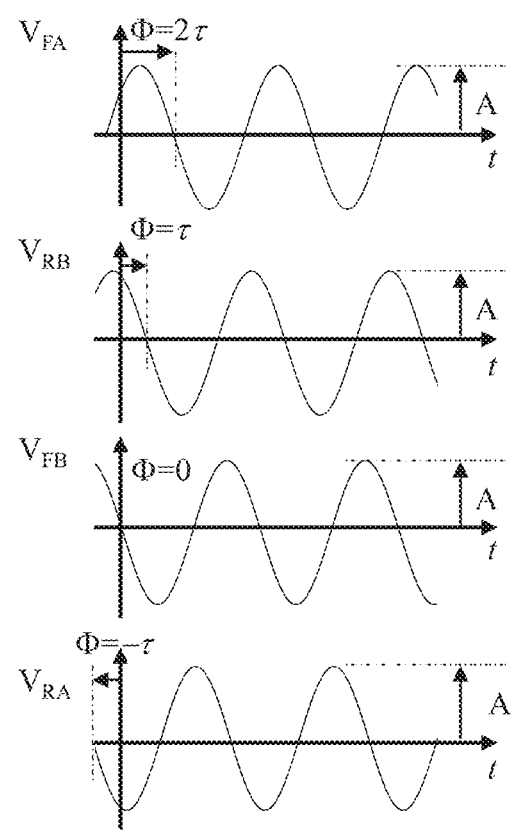
Figure 11C:
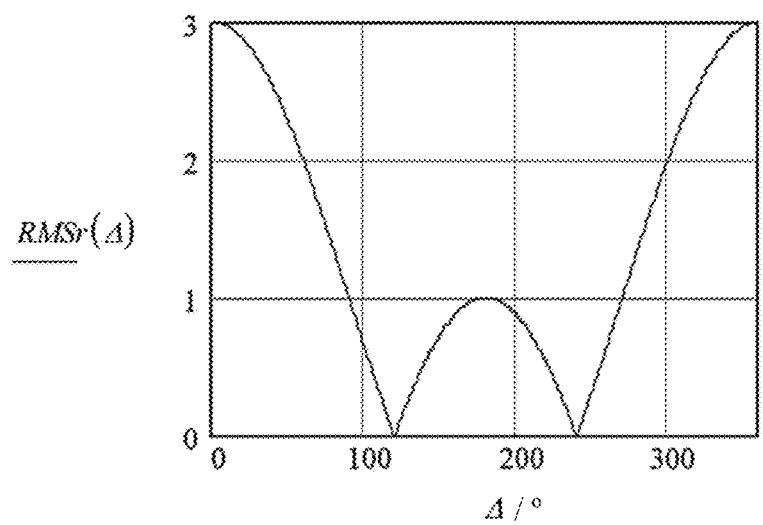

FIG. 11C is a schematic graph illustrating the ratio of the normalised RMS voltage ratio, RMSr as a function of phase step Δ. Features of the embodiment of FIG. 11C not discussed in further detail may be assumed to correspond to the features with equivalent reference numerals as discussed above, including any potential variations in the features.

The normalised RMS voltage $V_A$ that drives the distal mark region 320A can be smaller than $V_B$ that drives the proximal background region 320B or greater up to a maximum of a factor of three.

Continuing the illustrative example of TABLE 1 and FIGS. 2A-B, where the privacy and share voltages are illustrated as both non-zero, the difference between the $V_A$ and $V_B$ voltages and their ratios can be used to choose an operating point. The phase shift Δ of each of the voltage signals $V_{FA}$, $V_{FB}$, $V_{RA}$, $V_{RB}$ with common sinusoidal amplitudes A may be adjusted so that the RMS voltage $V_B$ is 2.3V to achieve optimum reflectivity, and the RMS voltage VA may be up to 6.9V to achieve a non-reflective distal mark region 320A. In other words, the amplitude A of addressing the respective electrodes 326FA, 326FB, 326RA, 326RB is the same and phase is modified accordingly. Advantageously cost and complexity of the control system may be reduced.

Similar analysis methods may be performed for other than sinusoidal input voltages, for example square waves as will now be described.

Figure 11D:
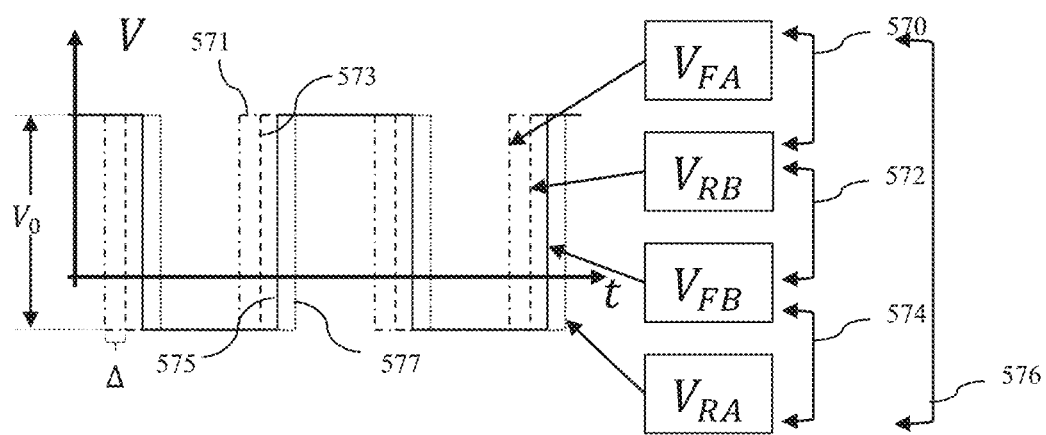
FIG. 11D is a schematic diagram illustrating exemplary digital voltage signals for the addressing of the patterned electrodes of FIGS. 8A-D.
Figure 11E:
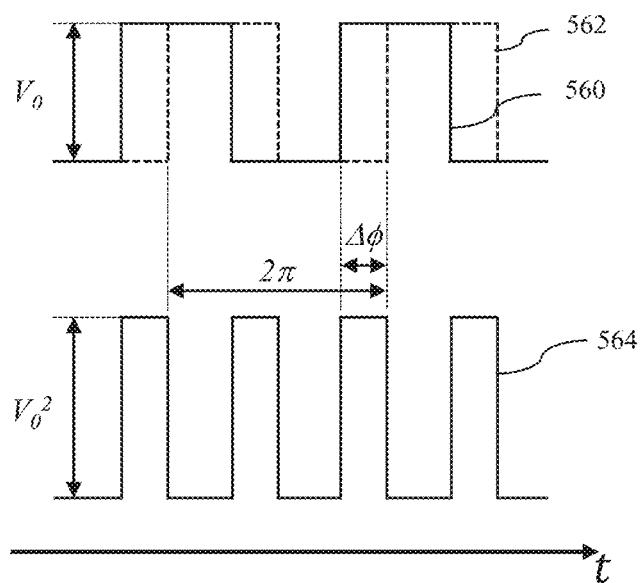
FIG. 11E is a schematic graph illustrating the resultant applied voltage across switchable liquid crystal retarder for the arrangement of FIG. 11D.
Figure 11F:
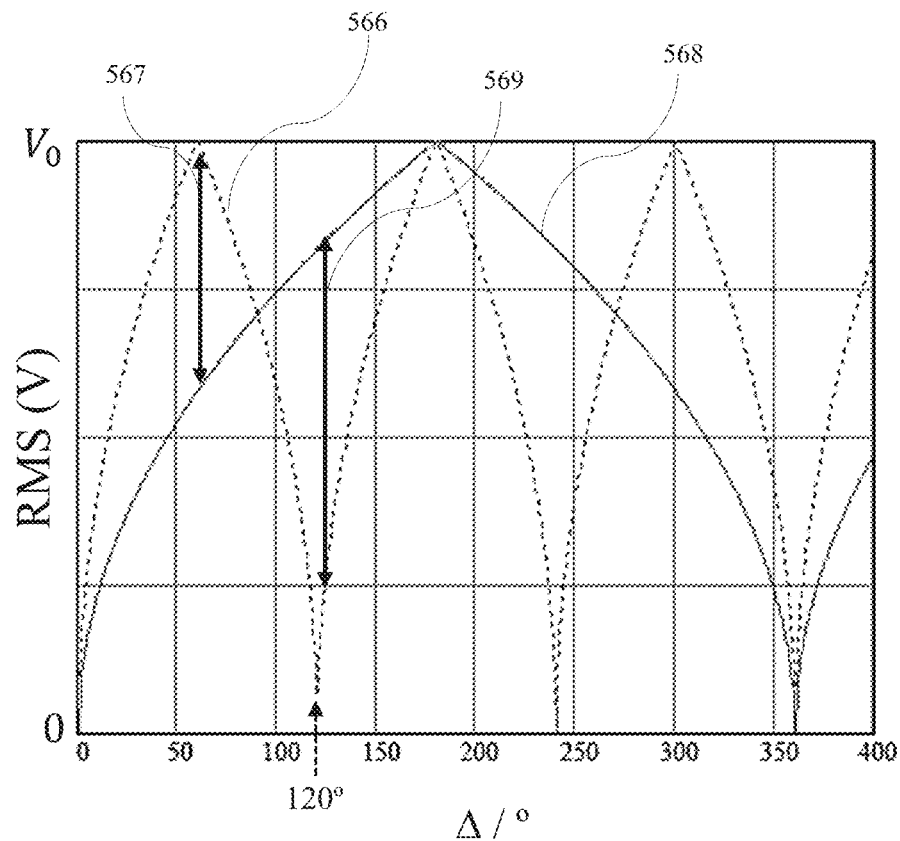
FIG. 11F is a schematic graph illustrating the rms voltage as a function of the phase step A for the arrangement of FIG. 11D.

FIG. 11D is a schematic diagram illustrating exemplary digital voltage signals for the addressing of the patterned electrodes of FIGS. 8A-D; the bottom trace of FIG. 11E is a schematic graph illustrating the resultant applied voltage difference across switchable liquid crystal retarder 301 for the arrangement of two phased voltages as illustrated in the top trace of FIG. 11E; and FIG. 11F is a schematic graph illustrating the RMS voltage in volts as a function of the phase step A in degrees for the arrangement of FIG. 11D. Features of the embodiment of FIGS. 11D-F not discussed in further detail may be assumed to correspond to the features with equivalent reference numerals as discussed above, including any potential variations in the features.

In the alternative embodiment of FIG. 11D, four digitally phased waveforms with equal amplitude and frequency but separated by phase steps A are illustrated. Profiles 571, 573, 575, 577 are arranged for the driving of the electrode areas 326FA, 326RB, 326FB, 326RA respectively, for example as illustrated in FIGS. 8A-D.

Referring to TABLE 3A, the three electrode overlap areas that provide the mark background region 320B have voltage differences 570, 572, 574 and a common phase step A between them.

The mark region 320A is by comparison provide by the voltage difference 576 and has a 3Δ step between $V_{FA}$ and $V_{RA}$. The RMS voltages experienced by the three overlap areas to provide mark background region 320B can be different even though the voltage amplitudes and frequencies of the square waves are the same.

The RMS voltage for digitally phased waveforms with square waves can be calculated in a similar manner to that described in FIG. 11C.

The drive waveforms 571, 573, 575, 577 can be arbitrarily offset from a common ground which achieves unipolar square wave driving since applied fields to the liquid crystal cell polar control retarder 301 are differential. The above simplifies the implementation of a digital drive circuit. Advantageously the cost and complexity of the drive circuit is reduced. DC balancing is achieved across the layer 314 of liquid crystal material 414, advantageously achieving stable operation.

FIG. 11E illustrates two digital waveform profiles 560 and 562 with amplitude $V_0$ and phase offset or phase difference $\Delta\phi$. When waveform profile 560 is applied to one electrode (for example 326FA) and waveform 562 is applied to an opposing electrode (for example 326RA) across layer 314 of liquid crystal material 414, the liquid crystal material 414 responds to the RMS of the waveform profile 564 corresponding to the voltage difference between profiles 560 and 562. The frequency of waveforms 560, 562 is typically faster than the response time of the liquid crystal material 414 so that advantageously the optical function does not cause any visible flicker.

FIG. 11F illustrates the profile 568 of voltage difference for the background region 320B with the three overlapping electrode areas illustrated in TABLE 3A, each of which has a common phase difference of Δ. The profile 566 of the voltage difference for the mark region 320A has a phase difference of 3Δ.

Desirable operating points exists at values of A where the difference of voltages between the profile 566 corresponding to background region 320B, and profile 568 corresponding to mark region 320A is large, for example at 60° with voltage difference 567 or 125° with voltage difference 569.

An illustrative control circuit will now be described.

Figure 11G:
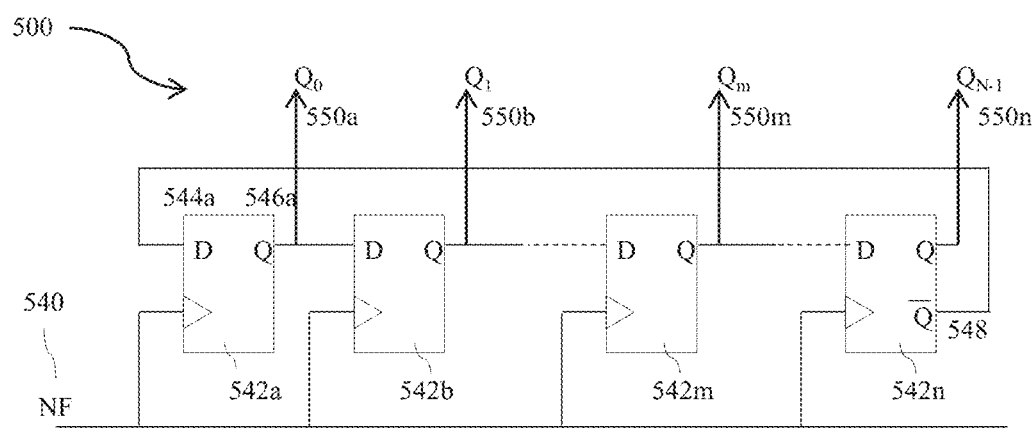
FIG. 11G is a circuit block diagram illustrating an exemplary implementation of a digital phase shift circuit to produce phase shifts of A as illustrated in FIG. 11D.

FIG. 11G, is an exemplary circuit block diagram illustrating an exemplary implementation of a digital phase shift circuit to produce phase shifts of Δ as illustrated in FIG. 11D. Features of the embodiment of FIG. 11G not discussed in further detail may be assumed to correspond to the features with equivalent reference numerals as discussed above, including any potential variations in the features.

In the exemplary embodiment of FIG. 11D the phase shifts are of digital square waves rather than the sine waves of FIG. 11B. The circuit uses cascaded D type flip-flops in an N stage counter, shown for illustrative purposes as 542a-542n. The number of stages N may be a positive integer and is selected based on the phase shifts required, (the use of N does not imply a 14-stage counter because N is the 14th letter of the alphabet). The counter connects the Q output 546a of each flip-flop 542a to the D input 544b of the subsequent flip-flop 542b. The flip-flops 542a-542n are clocked by a frequency 540 which is N times the desired output frequency F. The Q output of the final flip-flop 542n is fed back to the D input 544a of the first flip-flop 542a to produce a continuously cycling waveform generator. The more flip-flop stages that are used, i.e. the higher N is, the finer the granularity of phases produced, and that the required phases can be "tapped off" from $Q_0$ to $Q_{N-1}$ as required. This circuit will maintain the phase shifts for any frequency input. If the phase delay was alternatively produced for example by a capacitive timing component, then that timing does not adjust with drift or variation in frequency leading to a drift away from the desired operating point.

This circuit is more resilient to frequency drift and device-to-device variability, advantageously making it more reliable. In addition, the circuit may be produced in integrated circuit form and be more compact than that using a passive capacitor as a timing component.

TABLE 5 is an illustrative embodiment using the circuit of FIG. 11G to produce a Δ of 123.75° using 32 flip-flops. As the waveforms repeat over angles of 360°, in the calculations the modulus of the angle subtracting as many multiples of 360° as needed to bring the angle under 360° is used.

TABLE 5

| Item | Value | Illustrative embodiment |
| --- | --- | --- |
| Number of stages | N | 32 |
| $Q_0$ output 550a phase shift | 0° | 0° |
| $Q_1$ output 550b phase shift | 360/N° | 11.25° equivalent to 371.25° |
| $Q_{n-1}$ output 550n phase shift | (N-1)*360°/N | 348.75° |
| Desired output frequency, F | F | 120 Hz |
| Flip flop clock frequency, $F_{ff}$ | N*F | 3840 Hz |
| Desired Δ | Near to 125° | $Q_{11}$ output = 123.75°<br>$Q_{22}$ output = 247.5°<br>$Q_{33}$ output = 371.25° which is same as $Q_1$ (modulo 360°) |
| Actual Δφ at $Q_{11}$ | | 123.75° |
| RMS voltage at Δ, regions 1-3 | $V_{rms,1-3} = V_0\sqrt{\Delta/180}$ | $V_0$ * 0.829 |
| RMS voltage at Δ, region 4 | $V_{rms,4} = V_0\sqrt{(3\Delta-360)/180}$ | $V_0$ * 0.25 |
| Voltage ratio | $R = V_{rms,1-3}/V_{rms,4}$ | 3.316 |
| Privacy voltage | | 2.3 |
| Share voltage | | >5 e.g. 7.6 |
| Logo only voltage | | 2.3 |

The selected phase shifts may be tuned or modified to compensate for the difference in RC load between the electrodes 326FA, 326FB, 326RA, 326RB.

It may be desirable to ensure that the mark is visible within the narrow angle light cone 401. Referring to FIGS. 1D-E, the luminance and reflectivity of the regions 320A, 320B may vary differently within the narrow angle light cone 401 such that the mark 322 may become partially visible on at least some parts of the display device 100 to the observer 45. The phase shifts and/or voltages may additionally or alternatively be modified to operate the respective electrodes 326FA, 326FB, 326RA, 326RB to provide no visibility of the mark 322 to the head-on viewer, observer 45 by means of reducing the relative contrast of the two regions 320A, 320B. The difference in security factor $S_n$ between the regions 320A, 320B to the observer 47 may be modified and the visibility of the mark 322 may be advantageously maintained.

TABLE 5 illustrates an operating point for the phase difference A is selected where the ratio between the voltages is finite because the electro optic effect of TABLE 1 has a non-zero voltage for both the privacy and share modes.

In other words, the provision of the four electrodes 326FA, 326FB, 326RA, 326RB and their layout where the front and back connections 328FA, 328RA to the mark region 320A are offset with respect to the front and back background electrodes 327FB, 327RB enables improved performance. In particular the electrode structure enables the mark region 320A connection regions 328FA, 328RA to experience a different voltage difference to the mark region 320A itself so that the connection regions 328FA, 328RA can be arranged to display similar transmission (and reflectivity when the reflective polariser 302 is present) to the background region 320B. This achieves flexibility in how the electrodes 326FA, 326FB, 326RA, 326RB can be driven, as shown in exemplary embodiments below.

In particular at least the following modes can be produced.

In "Uniform Share Mode" (such as FIGS. 4C-D) in which the visibility of the mark 322 is supressed at head-on and off-axis angles, and the display content can be viewed from both narrow and wide angles in respective light cones 401, 402.

In a "Uniform Privacy Mode" (such as FIGS. 4A-B and FIG. 5C) the visibility of the mark 322 is supressed at head-on and off-axis angles, and the display content is only viewable from narrow angles in light cone 401, and a uniform reflective effect is seen from off-axis angles in light cone 402.

In a "Mark Privacy Mode" (such as FIGS. 5A-B and FIG. 5D) the visibility of the mark 322 is suppressed for head-on angles but is visible for off-axis angles and is surrounded by a reflective background region 320B that is a background the mark region 320A. The display content is visible to a head-on viewer, but the off-axis viewer cannot see the display content in both the mark region 320A and background region 320B but can see the mark 322 as a contrast of luminance and/or reflectivity between the mark region 320A and background region 320B. Alternatively the mark region 320A may be darker and/or reflective and the background region 320B may be brighter and/or have lower reflectivity so that the sense of the mark 322 is inverse. The contrast of the mark region 320A to the background region 320B may be adjusted to minimise the visibility for the head-on observer 45 in the narrow angle light cone 401 by adjusting the driving voltages amplitude and phase in comparison to the illustrative embodiment of FIG. 10C and FIG. 10E for example.

In a "Mark Sleep Mode" (such as FIGS. 2A-B) in which the display device 100 spatial light modulator 48 and/or when present backlight 20 is turned off, the mark 322 is not visible to a head-on viewer 45 but is visible to an off-axis viewer 47. The display device 100 is turned off other than the polar control retarder 300 so that the head-on viewer 45 can see no image content and the off-axis viewer 47 sees a dark background region with a reflective mark region. Alternatively the mark region 320A may be dark and/or reflective and the background region 320B may be bright and/or have lower reflectivity so that the sense of the mark 322 is inverse.

TABLE 6 provides an illustrative embodiment of electrode voltages (amplitude and/or phase) for the uniform modes of operation where the regions 320A, 320B are driven to provide the same response of the layer 314 of liquid crystal material 414.

TABLE 6

| | FIGS. 4C-D | FIGS. 4A-B (FIG. 5C) |
|---|---|---|
| Mode type | Uniform Share Mode | Uniform Privacy Mode |
| Mark 322 appearance to off-axis observer 47, Mark region 320A | Non-reflective | Reflective (Low luminance) |
| Mark 322 appearance to off-axis observer 47, Background region 320B | Non-reflective | Reflective (Low luminance) |
| $V_{FA}$ (peak to peak) | 15 V | 1.4 V |
| $\phi_{FA}$ | 0 | 0 |
| $V_{FB}$ (peak to peak) | 15 V | 1.5 V |
| $\phi_{FB}$ | 0 | 0 |
| $V_{RA}$ (peak to peak) | 15 V | 1.4 V |
| $\phi_{RA}$ | 180 | 180 |
| $V_{RB}$ (peak to peak) | 15 V | 1.5 V |
| $\phi_{RB}$ | 180 | 180 |
| Electrode 326FA-326RA overlap area difference voltage | 15 V | 2.8 V |
| Electrode 326FB-326RB overlap area difference voltage | 15 V | 3 V |
| Electrode 326FA-326RB & Electrode 326FB-326RA overlap area difference voltage | 15 V | 0.05 V |

TABLE 7 provides an illustrative embodiment of electrode voltages (amplitude and/or phase) for the uniform modes of operation where the regions 320A, 320B are driven to provide different responses of the layer 314 of liquid crystal material 414.

TABLE 7

| | FIGS. 5A-B (FIG. 5D) | FIGS. 2A-B FIGS. 3A-B |
|---|---|---|
| Mode type | Mark Privacy Mode | Mark Sleep Mode |
| Mark 322 appearance to off-axis observer 47, Mark region 320A | First reflectivity (First low luminance) | Non-reflective |
| Mark 322 appearance to off-axis observer 47, Background region 320B | Second different reflectivity (Second different low luminance) | Reflective |
| $V_{FA}$ (peak to peak) | 1.9 V | 1.5 V |
| $\phi_{FA}$ | 0 | 0 |
| $V_{FB}$ (peak to peak) | 1.5 V | 15 V |
| $\phi_{FB}$ | 60 | 0 |
| $V_{RA}$ (peak to peak) | 1.9 V | 1.5 V |
| $\phi_{RA}$ | 180 | 180 |

TABLE 7-continued

| | FIGS. 5A-B (FIG. 5D) | FIGS. 2A-B FIGS. 3A-B |
|---|---|---|
| $V_{RB}$ (peak to peak) | 1.5 V | 15 V |
| $\phi_{RB}$ | 240 | 180 |
| Electrode 326FA-326RA overlap area difference voltage | 1.9 V | 1.5 V |
| Electrode 326FB-326RB overlap area difference voltage | 1.5 V | 15 V |
| Electrode 326FA-326RB & Electrode 326FB-326RA overlap area difference voltage | 1.2 V | 8.25 V |

TABLE 7 further shows differences in illustrative voltage driving conditions for the mark sleep mode of FIGS. 2A-B and the mark privacy mode of FIGS. 5A-B. Such differences in driving achieve differences in optical performance in the regions 320A, 320B, for example as shown by the illustrative optical performance conditions of TABLE 3D.

In the mark sleep mode, the voltages $V_{FB}$, $V_{FA}$, $V_{RB}$, $V_{RA}$ are arranged to provide a large contrast between the mark region 320A and background region 320B. Advantageously the mark may be visible with high contrast and over a wide angular range that may approach directions near to the normal direction to the display device 100.

By way of comparison, in the mark privacy mode, it is desirable that the mark 322 is not visible to the head-on observer 45. The voltages $V_{FB}$, $V_{FA}$, $V_{RB}$, $V_{RA}$ are adjusted in amplitude and/or phase to reduce the difference in the alignment of the states of the layer 314 of liquid crystal material 414 between the mark region 320A and background region 320B such that the mark 322 is not visible to the observer 45 in the narrow angle light cone 401. For practical purposes, the contrast of the mark 322 seen by the off-axis observer 47 is reduced in comparison to the sleep mode, however the mark 322 is clearly visible.

In the mark privacy mode there may be some difference in the achieved security factor S within the mark region 320A compared to the background region 320B, however as illustrated in TABLE 3D effective privacy (that is S>1.0) for the entire image is maintained. The observer 45 can use the display without visibility of the mark 322 and the display device 100 can provide visibility of a mark 322 to the observer 47.

The voltages (amplitude and/or phase) of TABLES 6-7 can be adjusted to mitigate the effects of capacitance and resistive differences between the mark and the background regions and the output impedance of the drive circuits. Alternatively the impedance of the two regions can be balanced by the addition of parallel capacitance across electrode pairs and series electrode resistance. This can enable a simpler drive circuit, but in general slightly increases power consumption.

The control of island regions within logos will now be described.

FIG. 12A is a schematic diagram illustrating a top view of the top electrode 317F of the switchable liquid crystal polar control retarder 301 for a mark with an island region 329; FIG. 12B is a schematic diagram illustrating a top view of the bottom electrode 317R of the switchable liquid crystal polar control retarder 301 for a mark with an island region 329; and FIG. 12C is a schematic diagram illustrating a top view of the alignment of top and bottom electrodes 317F, 317R of FIGS. 12A-B of the switchable liquid crystal polar control retarder 301 for a mark with an island region 329. Features of the embodiments of FIGS. 12A-C not discussed in further detail may be assumed to correspond to the features with equivalent reference numerals as discussed above, including any potential variations in the features.

Considering FIG. 12A, the area 327FA comprises a peripheral region 339FA that extends around an island region 329FB. Outer region 331FB is connected to island region 329FB by bridging track 333FB. The peripheral region 339FA has bridging slits 335FA through which the bridging track 333FB runs. Connection track 328FA is connected to peripheral region 339FA.

Considering FIG. 12B, the area 327RA comprises a peripheral region 339RA that extends around an island region 329RB. Outer region 331RB is connected to island region 329RB by bridging track 333RB. The peripheral region 339RA has bridging slits 335RA through which the bridging track 333RB runs. Connection track 328RA is connected to peripheral region 339RA.

FIG. 12C illustrates the alignment of the first and second transmissive electrodes 317F, 317R. Peripheral regions 339FA, 339RA are aligned across the layer 314 of liquid crystal material 414 and have bridging slits 335FA, 335RA respectively that are aligned. In the mark display mode, the bridging tracks may provide loss of visibility of the mark region 320A. The visibility of the bridging slits is advantageously reduced.

The plural addressable areas 327A, 327B include at least one island region 329 and at least one peripheral region 331 extending around the island region 329. Areas of the first and second transmissive electrodes 317F, 317R that are aligned with the at least one peripheral region 331 have bridging slits 335 that are aligned across the layer 314 of liquid crystal material 414 and through which extend bridging tracks 333 connected to areas of the first and second transmissive electrodes 317F, 317R that are aligned with the at least one island region 329.

Referring to FIG. 12A, the area 327FB includes island region 329FB and peripheral region 331FB extending around the island region 329FB. Bridging slit 335F is arranged to connect the peripheral region 331FB to the island region 329FB.

Referring to FIG. 12B, the area 327RB includes island region 329RB and peripheral region 331RB extending around the island region 329RB. Bridging slit 335R is arranged to connect the peripheral region 331RB to the island region 329RB.

Referring to FIG. 12C, the peripheral regions 331FB, 331RB that are aligned across the layer 314 of liquid crystal material 414 have bridging slits 335F, 335R respectively that are aligned. In the mark display mode, the bridging tracks may provide loss of visibility of the mark region 320A. The visibility of the bridging slits is advantageously reduced. In other embodiments, not shown, the bridging slits 335F, 335R may not be aligned. Such an arrangement may be provided to achieve improved aesthetics of the design of the mark 322.

Figure 12D:
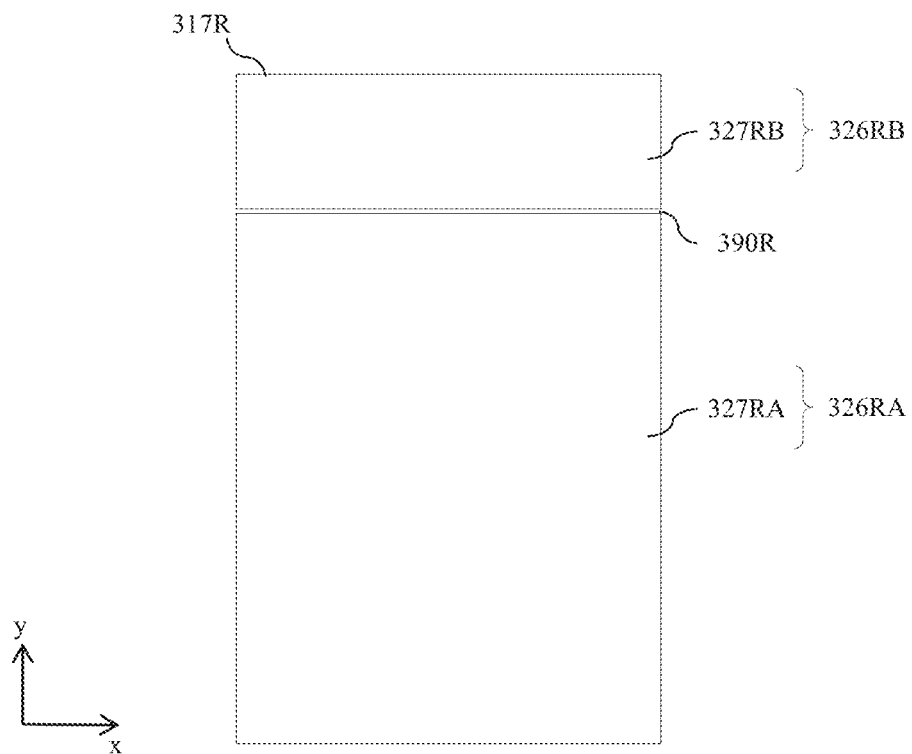
FIG. 12D is a schematic diagram illustrating a top view of the bottom electrode of the switchable liquid crystal polar control retarder for a mark with an island region.
Figure 12E:
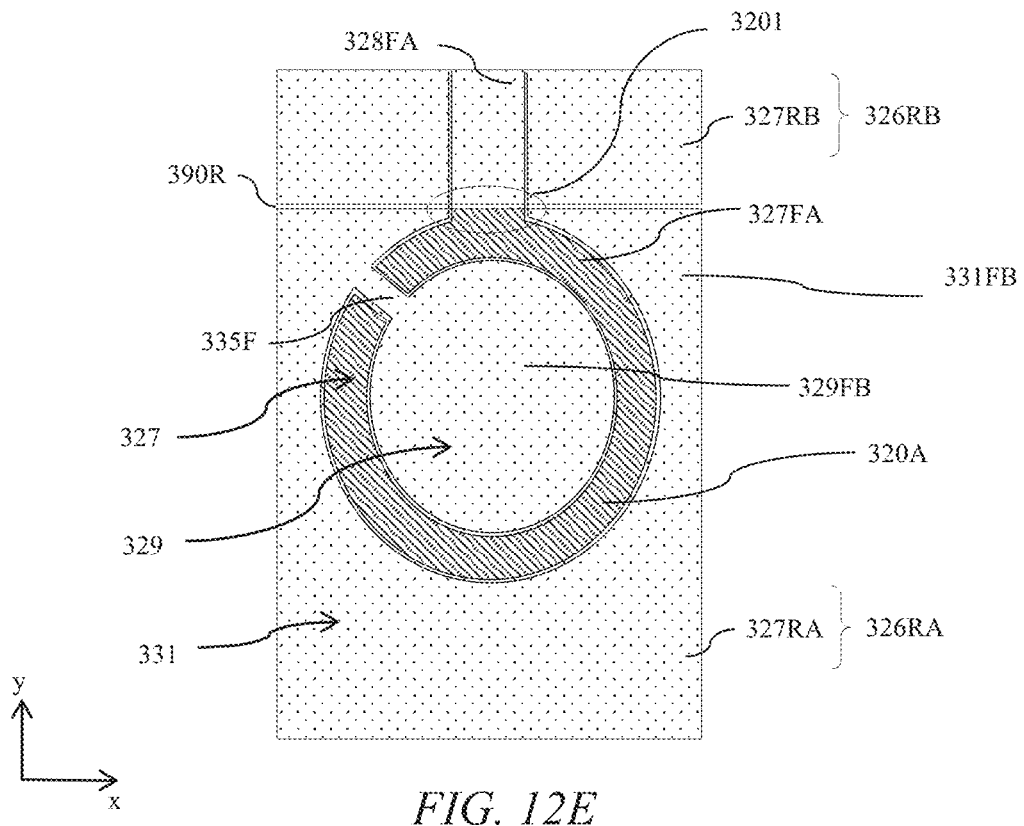
FIG. 12E is a schematic diagram illustrating a top view of the alignment of top and bottom electrodes of FIG. 12A and FIG. 12D of the switchable liquid crystal polar control retarder for a mark with an island region.

FIG. 12D is a schematic diagram illustrating a top view of the bottom electrode of the switchable liquid crystal polar control retarder for a mark with an island region; and FIG. 12E is a schematic diagram illustrating a top view of the alignment of top and bottom electrodes of FIG. 12A and FIG. 12D of the switchable liquid crystal polar control retarder for a mark with an island region. Features of the embodiment of FIGS. 12D-E not discussed in further detail may be assumed to correspond to the features with equivalent reference numerals as discussed above, including any potential variations in the features.

In the alternative embodiment of FIG. 12D, the rear electrode 317R comprises a simpler structure than that illustrated in FIG. 12B, advantageously achieving reduced complexity and cost. Further the size of the electrode 326RB in FIG. 12E illustrates that the electrode overlap between electrodes 326FA and electrode 326RA provide the distal mark region 320A.

In other embodiments not shown, the gap 390R may be shaped to align with the shape of the desired distal mark region 320A, to reduce the shape error in the region 3201 that is the overlap of the connection track 328FA with the electrode 326RA. Advantageously increased fidelity of the mark 322 may be achieved.

Figure 13A:
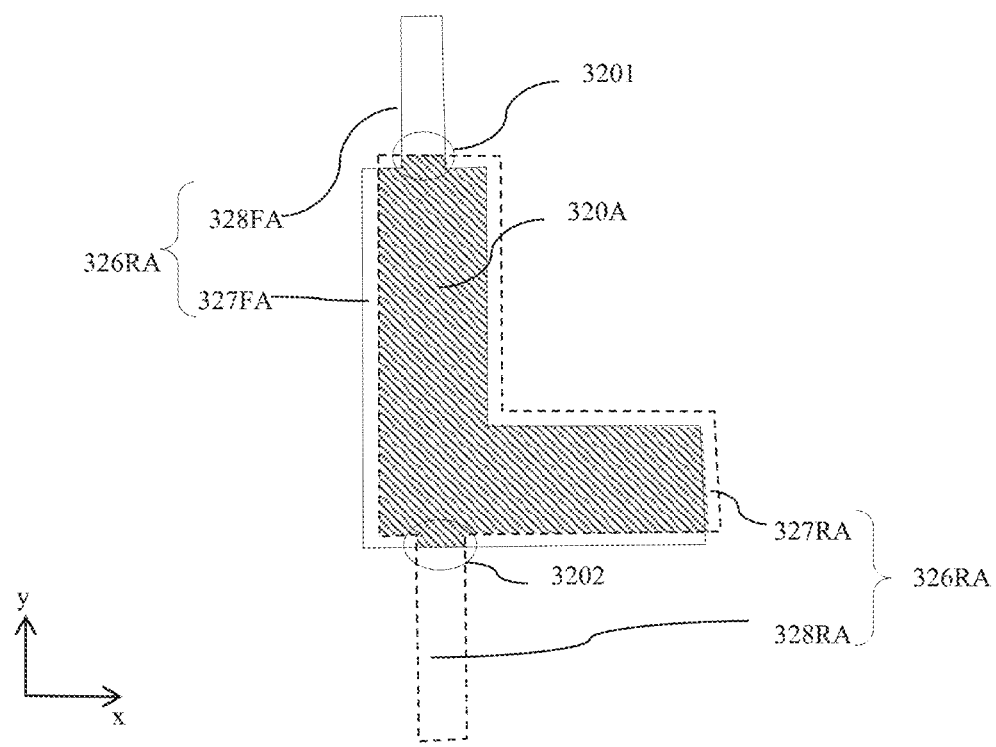
FIG. 13A is a schematic diagram illustrating a top view of misalignment of top and bottom electrodes for a switchable liquid crystal polar control retarder.

FIG. 13A is a schematic diagrams illustrating a top view of misalignment of top and bottom electrodes for a switchable liquid crystal polar control retarder. Features of the embodiment of FIG. 13A not discussed in further detail may be assumed to correspond to the features with equivalent reference numerals as discussed above, including any potential variations in the features.

In mark display mode, overlapping electrode 326FA, 326FB provide the mark region 320A. Misalignments of the distal areas 327FA, 327RA may provide some degradation of the mark 322A outline, for example in connection overlap regions 3201, 3202. It would be desirable to minimise said degradation.

Figure 13B:
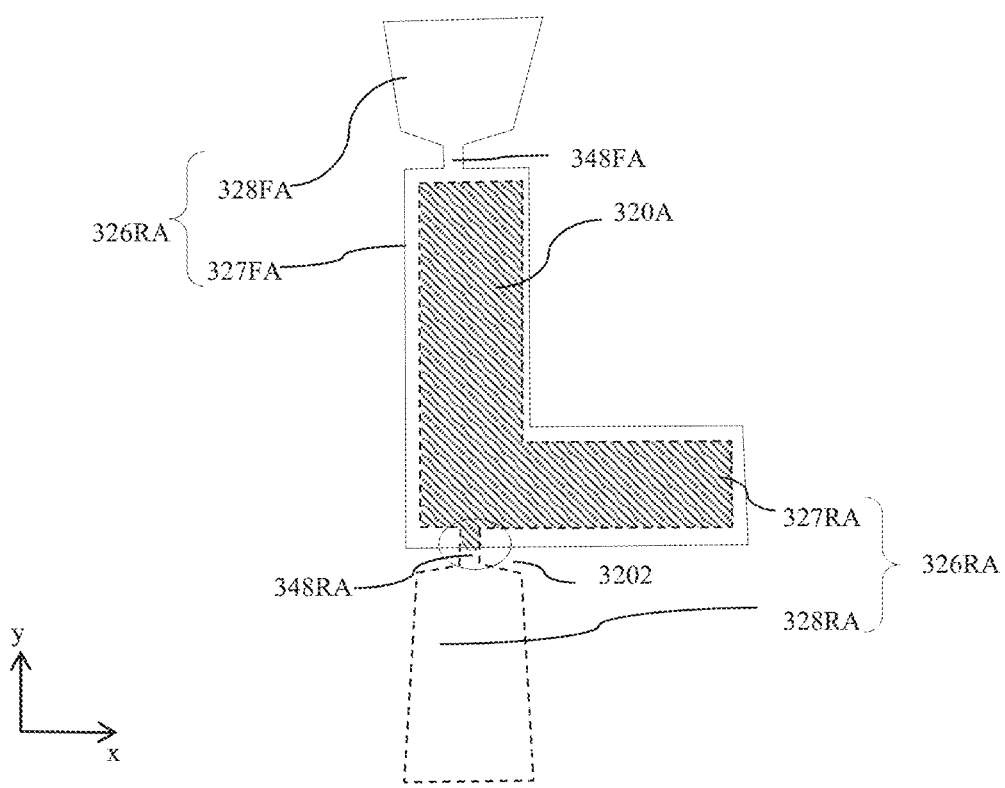
FIG. 13B is a schematic diagrams illustrating a top view of alternative top and bottom electrodes for a switchable liquid crystal polar control retarder.

FIG. 13B is a schematic diagrams illustrating a top view of alternative top and bottom electrodes 317F, 317R for a switchable liquid crystal polar control retarder 300. Features of the embodiment of FIG. 13B not discussed in further detail may be assumed to correspond to the features with equivalent reference numerals as discussed above, including any potential variations in the features.

The connection tracks 328FA, 328RA have a neck 348FA, 348RA respectively of reduced width adjacent to the at least one distal area 327FA, 327RA to which it is connected. Advantageously the size of the degradation region 3202 is thus reduced. Further the size of the distal areas 327FA, 327RA may be different, to further provide reduced degradation, that is overlap region 3201 may be omitted for example.

Further the width of the connection track 328FA, 328RA may be increased, reducing resistance other than at the neck. Voltage drops across the connection tracks 328FA, 328RA may be reduced, and uniformity of operational wide angle and narrow angle modes advantageously increased.

Alternative arrangements of connection tracks will now be described.

Figure 14A:
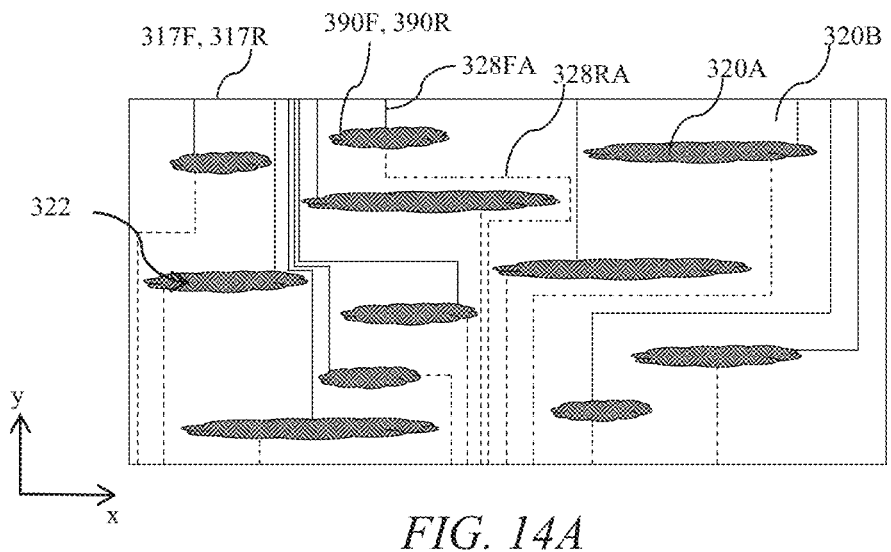
FIG. 14A is a schematic diagram illustrating a top view of an arrangement of marks and connection tracks.
Figure 14B:
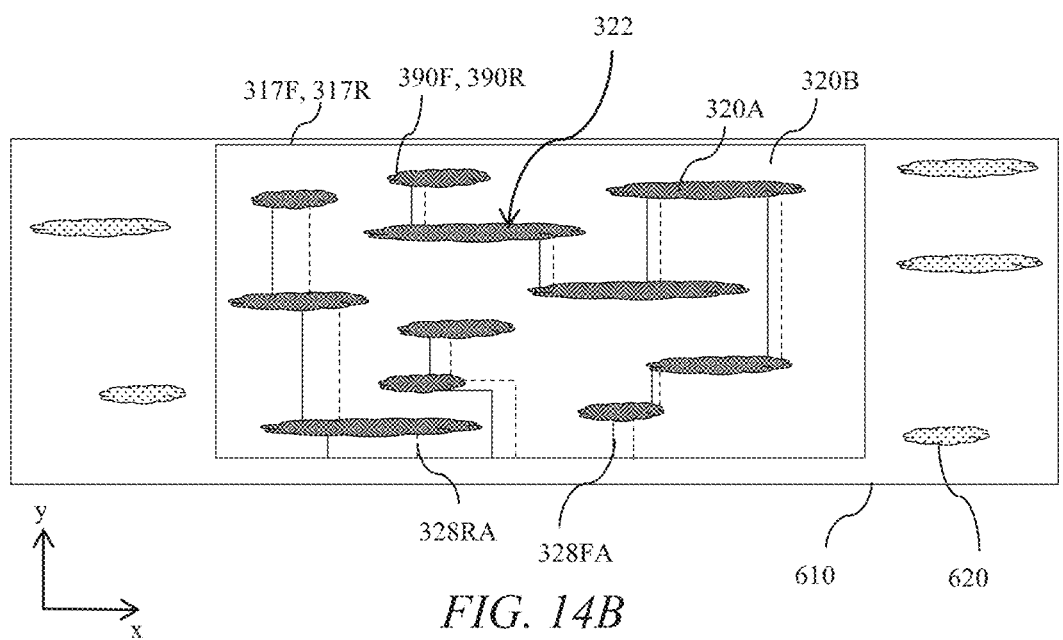
FIG. 14B is a schematic diagram illustrating a top view of an arrangement of marks and connection tracks wherein the display device is arranged in an automotive dashboard.
Figure 14C:
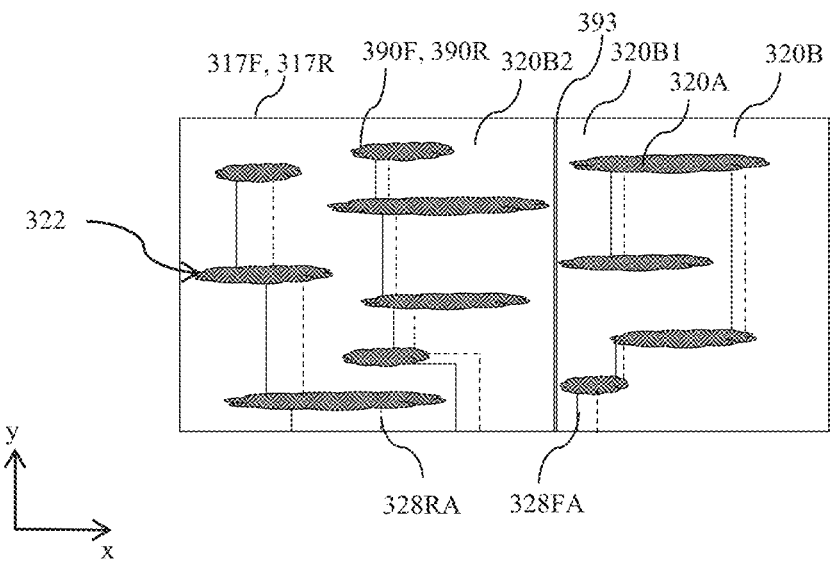
FIG. 14C is a schematic diagram illustrating a top view of an arrangement of marks and connection tracks comprising first and second proximal regions.

FIG. 14A is a schematic diagram illustrating a top view of an arrangement of marks 322 and connection tracks 328; FIG. 14B is a schematic diagrams illustrating a top view of an arrangement of marks 322 and connection tracks 328 wherein the display device 100 is arranged in an automotive dashboard 610; and FIG. 14C is a schematic diagram illustrating a top view of an arrangement of distal mark regions 320A and comprising first and second proximal background regions 320B1, 320B2. Features of the embodiments of FIGS. 14A-C not discussed in further detail may be assumed to correspond to the features with equivalent reference numerals as discussed above, including any potential variations in the features.

In the alternative embodiment of FIG. 14A, the cloud symbol represents a symbolic mark which may be used as an alternative to the LOGO text illustrated elsewhere herein. In comparison to FIG. 8E, multiple marks mark regions 320A are provided with differing size. The marks 320A are each connected by means of separate connection tracks 328FA, 328RA as illustrated elsewhere herein.

In the alternative embodiment of FIG. 14B, the connection tracks 328FA, 328RA are provided to daisy-chain the mark regions 320A together in groups. In comparison to the embodiment of FIG. 14A, the number of connection tracks 328 and the drive system may be provided with reduced complexity and cost.

FIG. 14B further illustrates that the marks 320A may be arranged to match mark symbols 620 provided (perhaps by printing) on the surface of the dashboard 610. Advantageously the aesthetic appearance of the display as seen by the off-axis driver may be blended with the aesthetics of the automotive cabin when the display is in mark mode such as illustrated in FIGS. 2A-B or in the privacy mark mode such as illustrated in FIGS. 5A-D.

In the alternative embodiment of FIG. 14C, first and second proximal background regions 320B1, 320B2 wherein the corresponding electrode areas 327FB1 and 327FB2 and electrode areas 327RB1, 327RB2 are separated by gaps 393. Such an arrangement may provide separate switching of parts of the display device 100. Some parts of the display device 100 may operate in different modes to other parts of the display device 100. Advantageously the observers 45, 47 may share some information in some parts of the display device 100 and the observer 47 may not see other parts of the display device 100.

It may be desirable to modify the proportion of the area of the display device which provides privacy and share mode operation.

Figure 14D:
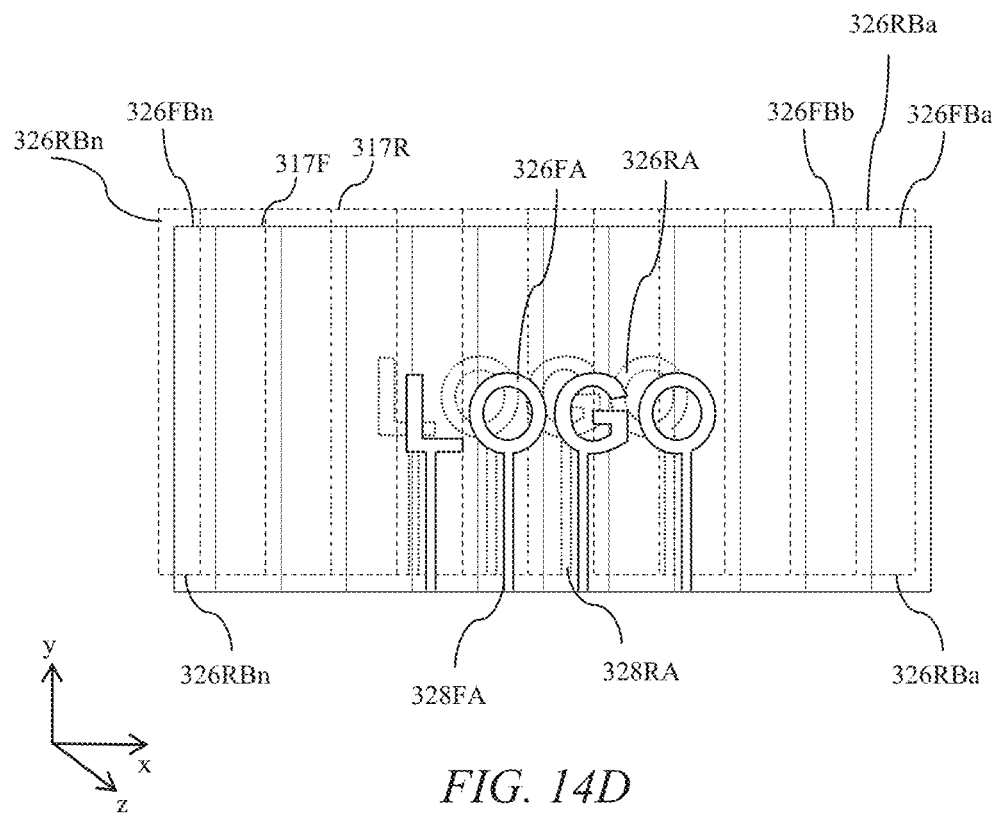
FIG. 14D is a schematic diagram illustrating a top view of the electrodes of a switchable liquid crystal polar control retarder comprising a segmented array of addressable electrodes.
Figure 14E:
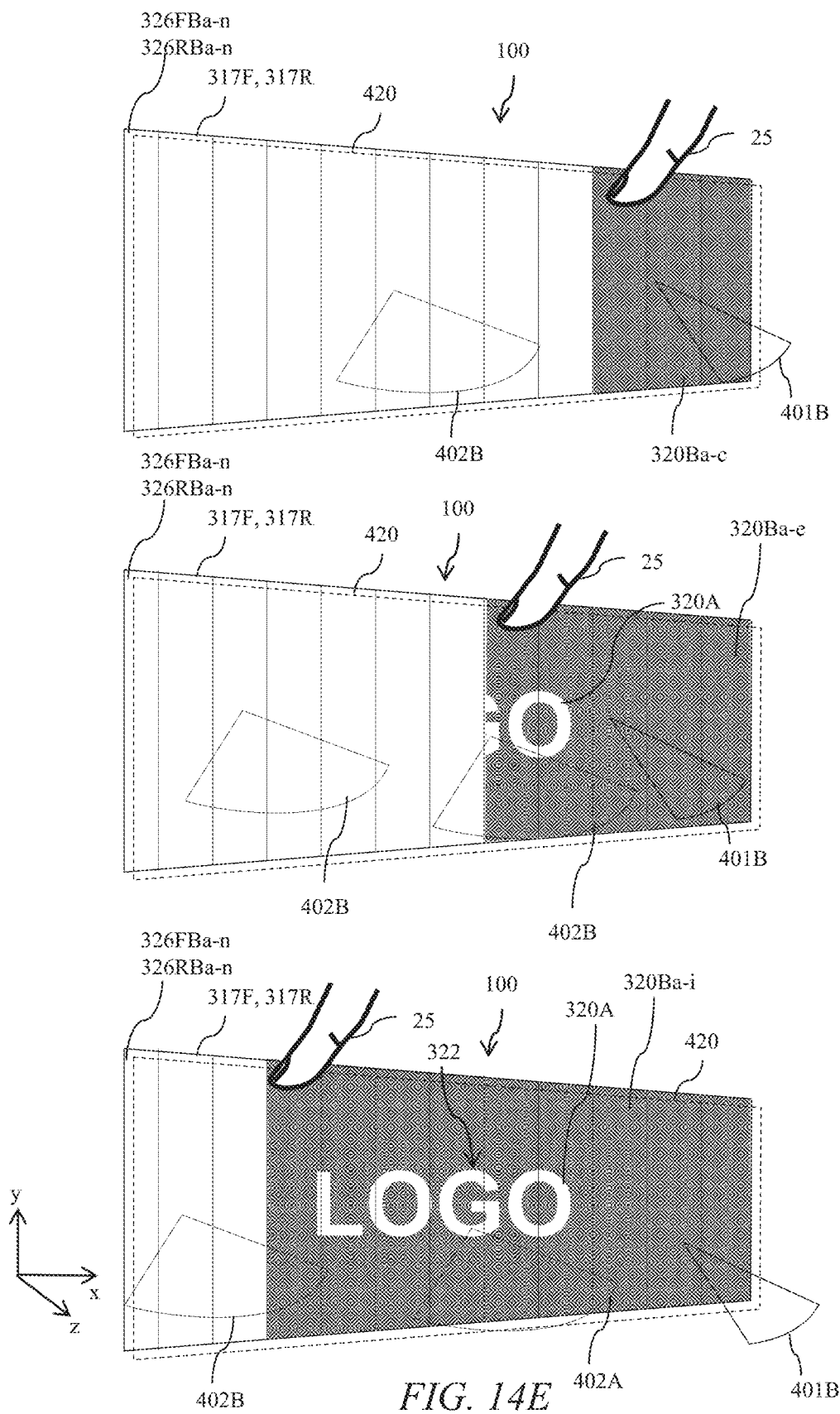
FIG. 14E is a schematic diagram illustrating the operation of a display device comprising a segmented array of addressable electrodes comprising a mark and a touch screen.
Figure 14F:
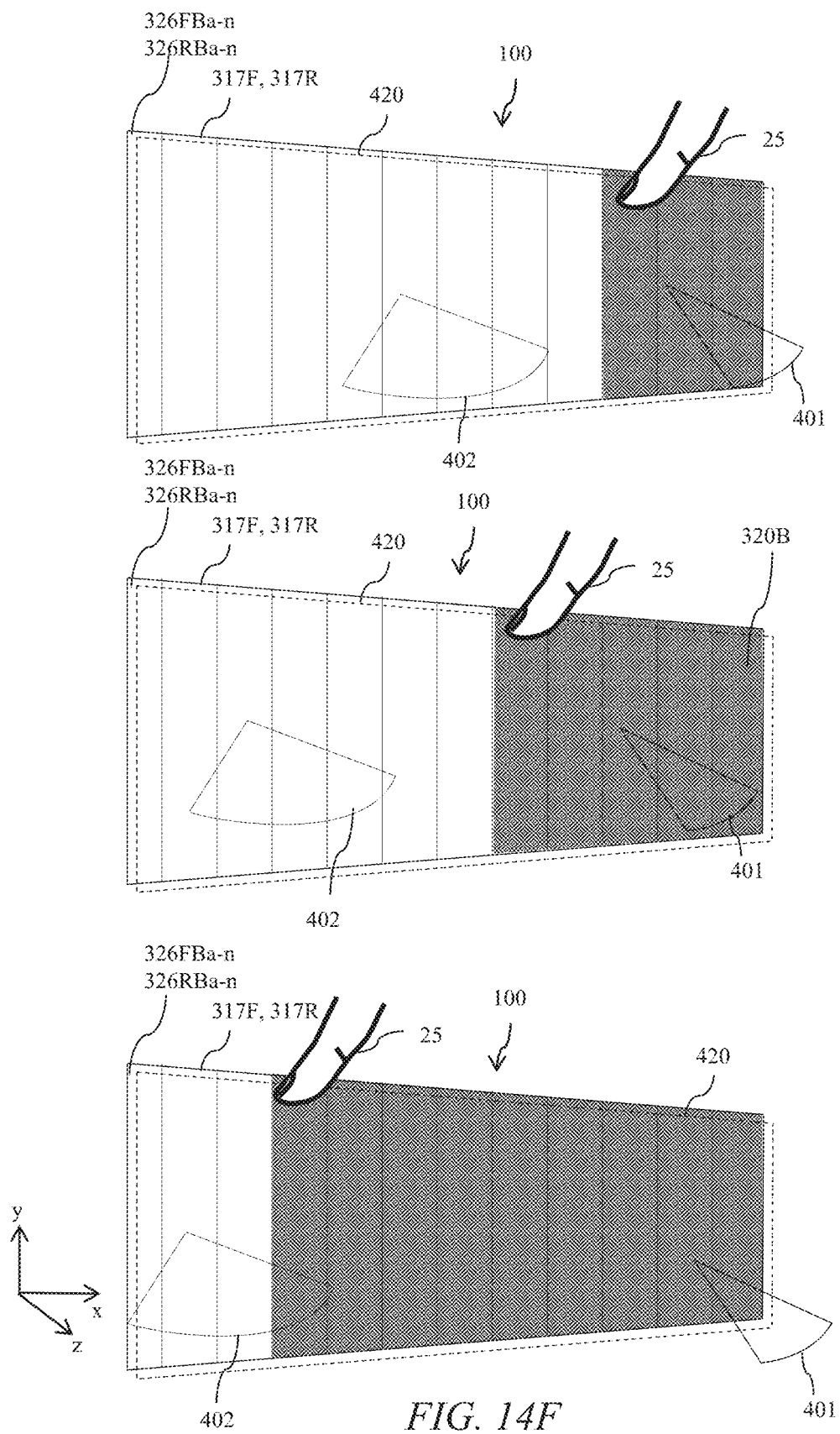
FIG. 14F is a schematic diagram illustrating the operation of a display device comprising a segmented array of addressable electrodes and a touch screen.

FIG. 14D is a schematic diagram illustrating a top view of the electrodes 317F, 317R of a switchable liquid crystal polar control retarder 301 comprising a segmented array of addressable electrodes 326FB*a-n* and 326RB*a-n*; FIG. 14E is a schematic diagram illustrating the operation of a display device 100 comprising a segmented array of addressable electrodes of FIG. 14D comprising a mark 322 and a touch screen 420; and FIG. 14F is a schematic diagram illustrating the operation of a display device 100 comprising a segmented array of addressable electrodes and a touch screen 420. Features of the embodiments of FIGS. 14D-F not discussed in further detail may be assumed to correspond to the features with equivalent reference numerals as discussed above, including any potential variations in the features.

In the alternative embodiment of FIG. 14D, the electrodes 326FB, 326RB are segmented to provide segmented areas 326FB*a-n* and 326RB*a-n* respectively.

One mode of operation of the arrangement of FIG. 14D is illustrated in FIG. 14E. Touch screen 420 is provided so that the finger 25 of a user determines the split between privacy and share modes of operation. In the upper diagram, the finger is located so as to indicate that the right hand three segmented background regions 320B*a-c* are driven in privacy mode with narrow angle light cone 401B output from the background region 320B. In the other segments, then the wide angle light cone 402B is provided across the remaining area of the display device 100. In the middle diagram, the finger 25 is located so that more segments 320B*a-n* are driven to provide narrow angle light cone 401B in the background region 320B*a*-e. In the mark regions 320A, then part of the mark 322 is revealed with wide angle light cone 402A. In the lower diagram, the finger 25 is located so that more segments 320B*a-n* are driven to provide narrow angle light cone 401 in the background region 320B*a*-i and the whole of the mark 322 is revealed. The relative proportion of the display device 100 area that is used by the observers 45, 47 may be controlled. Advantageously increased flexibility of display use may be provided. Such an arrangement may be particularly desirable in ultra-high aspect ratio displays, for example for use in pillar-to-pillar type automotive displays. In alternative arrangements, the control of the relative area may be set by other means, for example depending on the application or image content, detected presence of user 45. The segmented regions of electrodes 326FB*a-n*, 326RB*a-n* may further be arranged in cooperation with segmented backlights 20, for example mini-LED backlights such as illustrated in FIG. 7A hereinabove.

In an alternative embodiment of FIG. 14F the mark 322 may be undriven so that uniform privacy or share mode operation may be achieved.

Figure 15A:
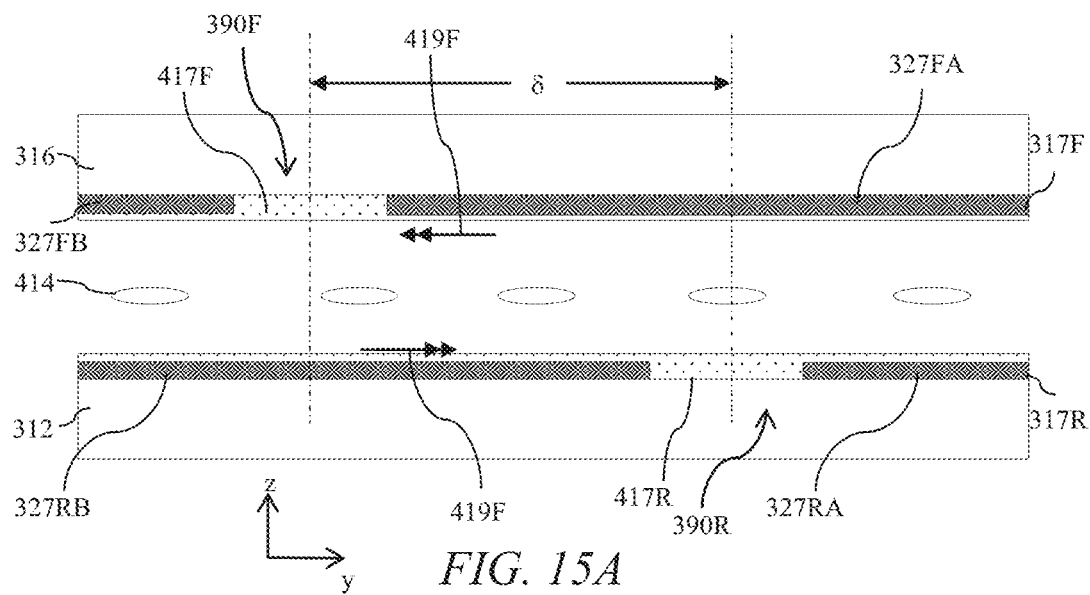
FIG. 15A is a schematic diagram illustrating a side view of a polar control retarder operating in zero volts mode and comprising offset gaps for top and bottom electrodes.
Figure 15B:
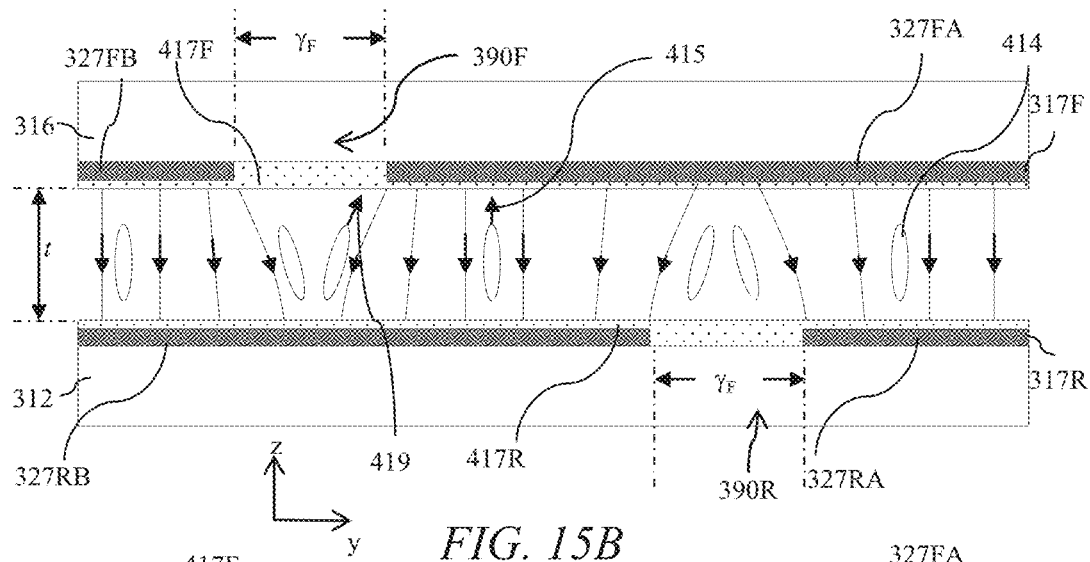
FIG. 15B is a schematic diagram illustrating a side view of a polar control retarder operating in privacy mode and comprising offset gaps for top and bottom electrodes.

FIG. 15A is a schematic diagram illustrating a side view of a switchable liquid crystal retarder 301 operating at zero volts and comprising offset gaps 390F, 390R for top and bottom electrodes 317F, 317R; and FIG. 15B is a schematic diagram illustrating a side view of a switchable liquid crystal retarder 301 operating in a driven mode and comprising offset gaps 390F, 390R for top and bottom electrodes 317F, 317R. Features of the embodiment of FIG. 15B not discussed in further detail may be assumed to correspond to the features with equivalent reference numerals as discussed above, including any potential variations in the features.

FIGS. 15A-B further illustrate the alignment layers 417F, 417R that are arranged between the electrodes 317F, 317R and the material 414 of the liquid crystal layer 314. Illustrative alignment layers are described in TABLES 1-2 hereinabove.

Each of the first and second transmissive electrodes 317F, 317R are patterned to provide plural addressable areas 327A, 327B separated by gaps 390, the plural addressable areas 327A, 327B of the first and second transmissive electrodes 317F, 317R being aligned across the layer 314 of liquid crystal material 414.

In the narrow angle and wide angle operational modes, it is desirable that the liquid crystal material 414 aligns to a substantially uniform state across the gaps 390F, 390F.

The width, $y_F$, $y_R$ of the gaps 390F, 390R may be at most the twice the thickness t of the layer 314 of liquid crystal material 414, and preferably at most the thickness t of the layer of liquid crystal material. In such embodiments, the liquid crystal material 414 may be provided with alignment direction 419 in the region of the gap 390 that is similar to the alignment direction 415 in the region of the gaps 390 between the areas 327FA, 327FB and areas 327RA, 327RB of the electrodes 317F, 317R respectively. Visibility of the gaps 390F, 390R may advantageously be minimised and uniform images without residual visibility of the mark 322 achieved, for example as illustrated in FIG. 4B and FIG. 4D.

When a voltage is applied across the liquid crystal layer 314, the material realigns according to the resultant rms electric field. It is desirable to minimise the misalignment. Further, the gaps 390F, 390R separating plural addressable areas 327A, 327B of the first and second transmissive electrodes 317F, 317R that are aligned across the layer 314 of liquid crystal material 414 are offset. The offset distance δ may be at least the thickness t of the layer 314 of liquid crystal material 414 and preferably at least twice the thickness t of the layer 314 of liquid crystal material 414. The misalignment of the alignment direction 417 of the liquid crystal material 414 is reduced and gap visibility advantageously reduced.

Figure 15C:
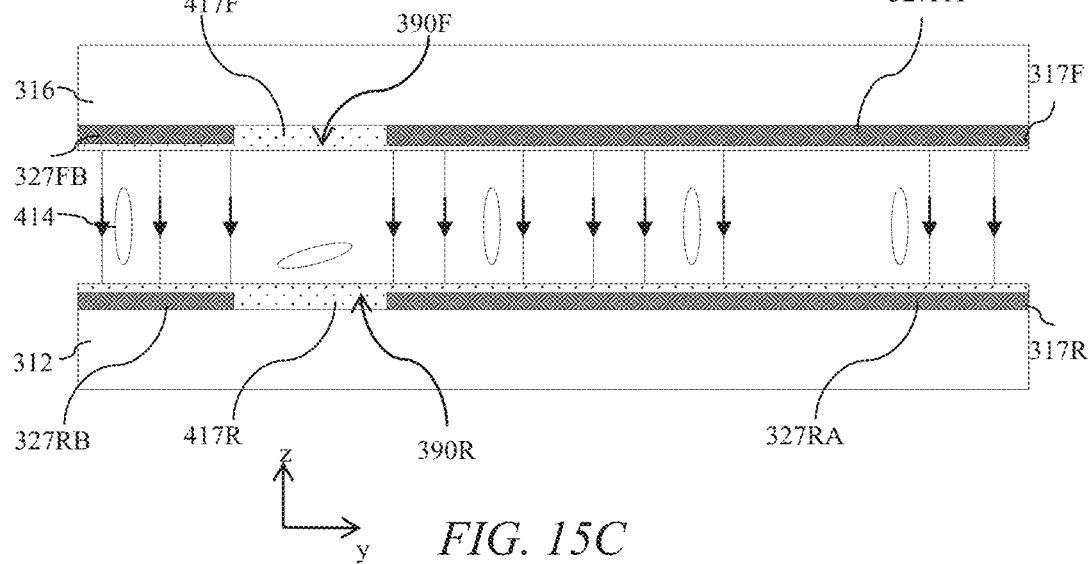
FIG. 15C is a schematic diagram illustrating a side view of a polar control retarder operating in privacy mode and comprising aligned gaps for top and bottom electrodes.

FIG. 15C is a schematic diagram illustrating a side view of a polar control retarder operating in privacy mode and comprising aligned gaps for top and bottom electrodes 317F, 317R. Features of the embodiment of FIG. 15C not discussed in further detail may be assumed to correspond to the features with equivalent reference numerals as discussed above, including any potential variations in the features.

By way of comparison with FIGS. 15A-B, the gaps 390F, 390R may be aligned. Visibility of the electrode gaps may be confined to a smaller region.

Alternative illustrative embodiments of the polar control retarder 300 to that illustrated in TABLE 1 and TABLE 2 will now be described.

Figure 15D:
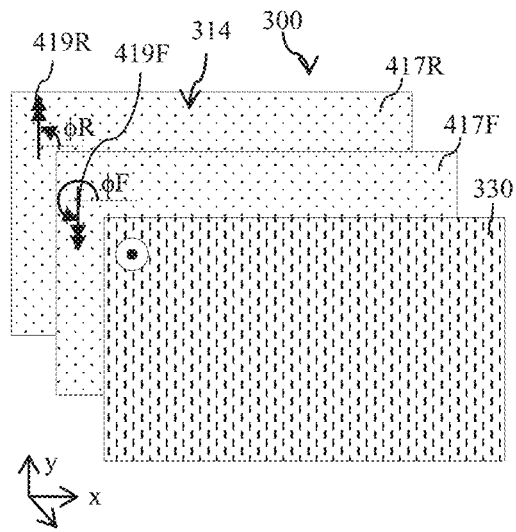
FIG. 15D is a schematic diagram illustrating a perspective front view of the alignment directions of a polar control retarder comprising a passive retarder comprising negative C-plate retarder.
Figure 15E:
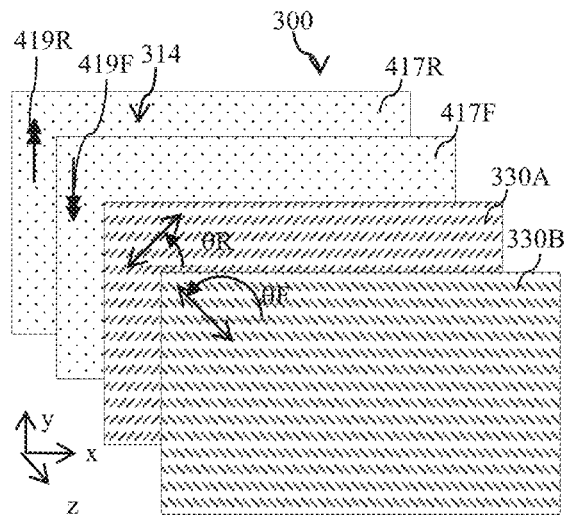
FIG. 15E is a schematic diagram illustrating a perspective front view of the alignment directions of a polar control retarder comprising a passive retarder comprising crossed positive A-plate retarders.
Figure 15F:
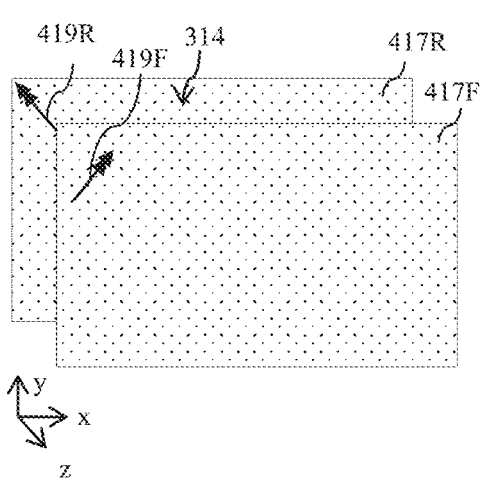
FIG. 15F is a schematic diagram illustrating a perspective front view of the alignment directions of a polar control retarder comprising twisted alignment layers.
Figure 15G:
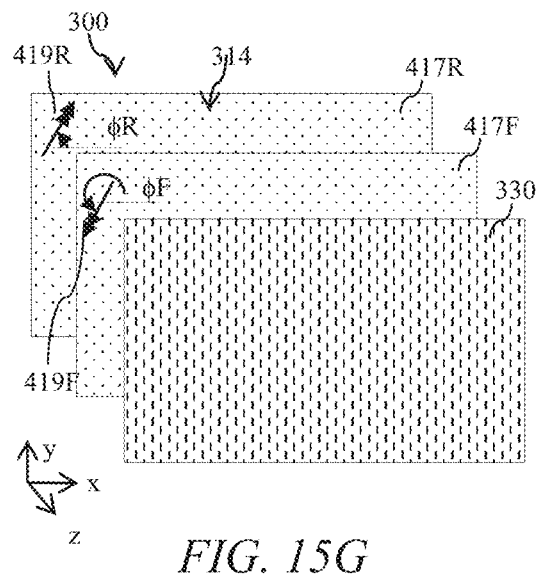
FIG. 15G is a schematic diagram illustrating a perspective front view of the alignment directions of a polar control retarder comprising rotated alignment layers.

FIG. 15D is a schematic diagram illustrating a perspective front view of the alignment directions of a polar control retarder 300 comprising a passive retarder 330 comprising a negative C-plate retarder; FIG. 15E is a schematic diagram illustrating a perspective front view of the alignment directions of a polar control retarder 300 comprising a passive retarder comprising crossed positive A-plate retarders 330A, 330B; FIG. 15F is a schematic diagram illustrating a perspective front view of the alignment directions of a polar control retarder 300 comprising twisted liquid crystal layer 314; and FIG. 15G is a schematic diagram illustrating a perspective front view of the alignment directions of a polar control retarder comprising rotated alignment layers 417F, 417R and a passive retarder 330. Features of the embodiments of FIGS. 15D-F not discussed in further detail may be assumed to correspond to the features with equivalent reference numerals as discussed above, including any potential variations in the features.

The directions φF, φR of the in-plane alignment of the first and second alignment layers 417F, 417R is illustrated by arrows 419F, 419R respectively, where the alignment layers 417F, 417R may be homogeneous or homeotropic as illustrated in the illustrative (but non-exhaustive) embodiments of TABLE 8.

Passive retarders 330 may comprise at least one C-plate retarder as illustrated in FIG. 15D. Alternatively passive retarders 330 may be a combination of retarders such as crossed positive A-plates 330A, 330N with direction θF of 135° and direction θR of 45° for example as illustrated in FIG. 15E. Alternatively passive retarders 330 may be omitted as illustrated in FIG. 15F for the example of a twisted layer 314 of liquid crystal material 414.

In the alternative illustrative embodiments of FIG. 15G, the alignment directions φF, φR for alignment layers 417F, 417R respectively may each be rotated for example by 10° or 15° in comparison to the embodiment of FIG. 15D as described in U.S. Pat. No. 11,099,448, herein incorporated by reference in its entirety. Advantageously in operation, such an arrangement may provide a peak luminance that is offset from the normal of the plane of the display device 100. Considering FIG. 6A for example, such an offset may be away from the direction of the driver observer 47 and may be arranged to advantageously achieve improved security factor S for a driver leaning towards the display device 100.

In the present embodiments, the passive retarders 330 may be at least one of a negative C-plate, a positive C-plate, a positive A-plate, or an O-plate. Desirable ranges for the values of retardance of the layer 314 of liquid crystal material 414 and the retardance of passive retarders are described further in U.S. Pat. No. 10,976,578, herein incorporated by reference in its entirety.

TABLE 8

| | Passive retarder 330 | Alignment layer 417F type | In-plane alignment direction 419F | Alignment layer 417R type | In plane alignment direction 419R |
|---|---|---|---|---|---|
| FIG. 15D | Negative C | Homogeneous | 90° | Homogeneous | 270° |
| | | Homogeneous | 90° | Homeotropic | 270° |
| | | Homeotropic | 90° | Homeotropic | 270° |
| FIG. 15E | Crossed Positive A | Homogeneous | 90° | Homogeneous | 270° |
| | | Homogeneous | 90° | Homeotropic | 270° |
| | | Homeotropic | 90° | Homeotropic | 270° |
| FIG. 15F | — | Homogeneous | 135° | Homogeneous | 45° |
| FIG. 15G | Negative C/ Crossed positive A | Homogeneous | 80° | Homogeneous | 260° |
| | | Homogeneous | 75° | Homeotropic | 255° |

It may be desirable to reduce the cost of the assembly of the aligned electrodes 326FA, 326RA of the liquid crystal retarder 301.

FIG. 16 is a schematic diagram illustrating a top view of alternative electrodes of the switchable liquid crystal polar control retarder 301. Features of the embodiment of FIG. 16 not discussed in further detail may be assumed to correspond to the features with equivalent reference numerals as discussed above, including any potential variations in the features.

In the alternative embodiment of FIG. 16, one of the first and second transmissive electrodes 317F, 317R is patterned to provide plural addressable areas 327A, 327B separated by gaps 390, and the other of the first and second transmissive electrodes 317F, 317R is not patterned.

Most generally, the plural regions 320A, 320B include at least one distal region 320A that is not adjacent to an outer edge 321F, 321R of the first and second transmissive electrodes 317F, 317R and at least one proximal region 320B that is adjacent to the outer edge 321F, 321R of the first and second transmissive electrodes 317F, 317R, wherein areas 327FA of at least one of the first and second transmissive electrodes 317F, 317R that are aligned with the at least one distal region 320A are connected to areas 327FB of the same transmissive electrode 317F that are aligned with the at least one proximal region 320B by a connector 370F that is configured to provide a resistance between the connected areas 327FA, 327FB.

In other words, the plural areas of the electrodes 317F, 317R include at least one distal addressable area 327A, 327B that is not adjacent to an outer edge 321F of the first transmissive electrode 317F, and at least one proximal area 327FB that is adjacent to an outer edge 321 of the first transmissive electrode 317F.

In alternative embodiments, not shown, the electrode arrangement of the first transmissive electrode 317F may be further provided on the second transmissive electrode 317R and a further connector 370R provided that is configured to provide a resistance between the connected areas 327RA, 327RB of the second transmissive electrodes 317R.

In other words, the at least one distal area 327F is connected to the at least one proximal addressable area 327B by a connector 370F that is configured to provide a resistance between the at least one distal area 327FA and the at least one proximal area 327FB.

In the embodiment illustrated in FIG. 16, the second transmissive electrode 317R is uniform. Advantageously cost of fabrication and of alignment is reduced.

FIGS. 17A-C are schematic diagrams illustrating a top view of connector 370F of FIG. 16. Features of the embodiments of FIGS. 17A-C not discussed in further detail may be assumed to correspond to the features with equivalent reference numerals as discussed above, including any potential variations in the features. High resistance tracking can be provided, for example by providing narrow electrode channels, regions 371 of removed transparent conductor material in a connector 370F or by zig-zag connector 370F profiles.

The driving of regions 320A, 320B will now be described in further detail.

FIG. 18 is a schematic circuity diagram illustrating the driving of the voltages across the electrodes of FIG. 16.

A voltage $V_{IN}$ is applied to the sheet transparent electrode that comprises the proximal electrode addressable area 327B of the electrode 317F. For a low sheet resistance, the voltage $V_B$ across the liquid crystal layer 314 in the proximal electrode addressable area 327B is substantially the same as $V_{IN}$ and charges capacitor $C_B$. The resistance of the connector 370F provides a voltage drop to the area 327FA and a different capacitance $C_A$ in the mark region 320A. By design of the connector 370 resistance, and selection of addressing frequency of the drive voltage, the voltage seen across the liquid crystal material in the area 327FA may be controlled to achieve a different reflectivity than for the area 327FB.

Advantageously the complexity and cost of the electrodes 317F, 317R of the liquid crystal retarder 314 may be reduced.

In other words a display device 100 for use in ambient illumination 410 comprising: a spatial light modulator 48 arranged to output light, wherein the spatial light modulator 48 comprises an output polariser 218 arranged on the output side of the spatial light modulator 48, the output polariser 218 being a linear polariser; a view angle control arrangement comprising: an additional polariser 318 arranged on the output side of the output polariser 218, the additional polariser 318 being a linear polariser; a reflective polariser 302 arranged between the output polariser 218 and the additional polariser 318, the reflective polariser 302 being a linear polariser; and at least one polar control retarder 300 arranged between the reflective polariser 302 and the additional polariser 318, the at least one polar control retarder 300 including a switchable liquid crystal retarder 301 comprising a layer 314 of liquid crystal material 414, and first and second transmissive electrodes 317F, 317R on opposite sides of the layer 314 of liquid crystal material 414, wherein at least one of the first and second transmissive electrodes 317F, 317R is patterned to provide plural addressable areas 327A, 327B separated by gaps 390, at least one of the regions being in a shape of a mark region 320A for display to an off-axis observer 47, wherein the plural addressable areas 327A, 327B include at least one distal region that is not adjacent to an outer edge 321 of the first and second transmissive electrodes 317F, 317R and at least one proximal region that is adjacent to an outer edge 321, wherein the at least one distal addressable area 327A is connected to the at least one proximal addressable area 327B by a connector 370 that is configured to provide a resistance between the at least one distal addressable area 327A and the at least one proximal addressable area 327B.

Alternative electrode arrangements for the mark region 320A and background region 320B will now be described.

Figure 19A:
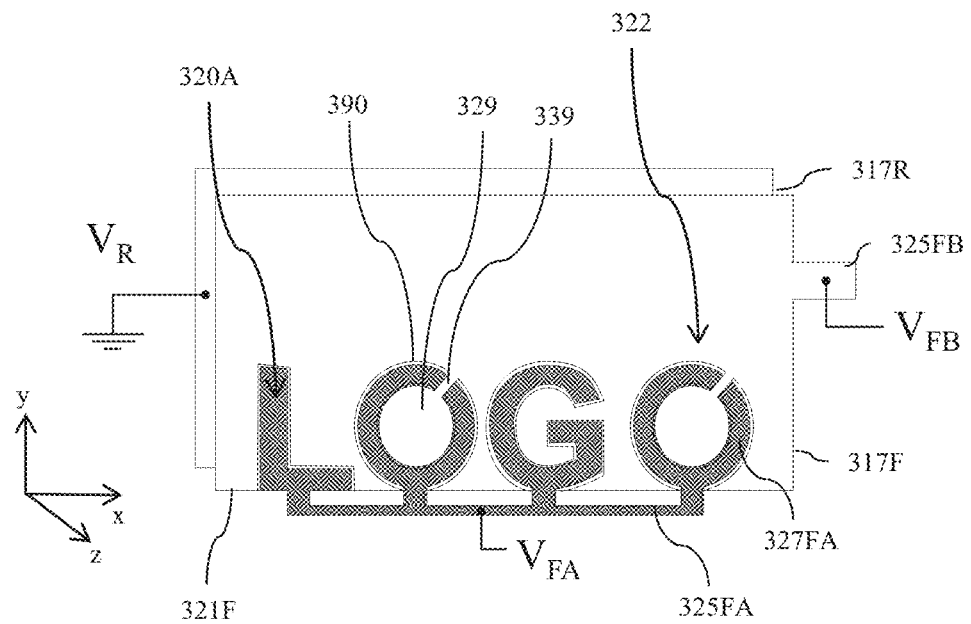
FIG. 19A is a schematic diagram illustrating a top view of the electrodes of the switchable liquid crystal polar control retarder and the driving of the top electrode pattern region A by a voltage $V_{FA}$ for a proximal mark.
Figure 19B:
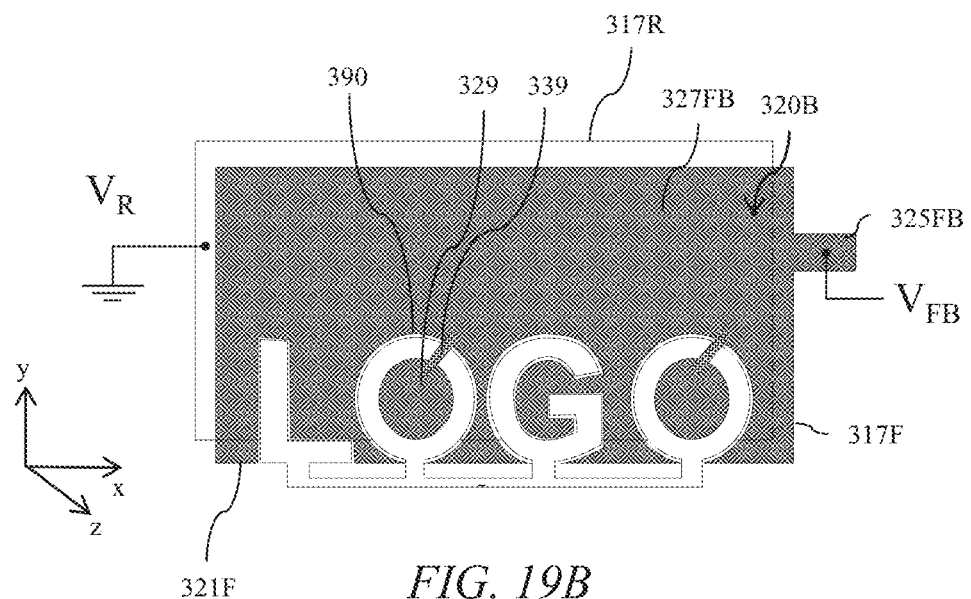
FIG. 19B is a schematic diagram illustrating a top view of the electrodes of the switchable liquid crystal polar control retarder and the driving of the top electrode pattern region B by a voltage $V_{FB}$ for a proximal mark.

FIG. 19A is a schematic diagram illustrating a top view of the electrodes 317F, 317R of the switchable liquid crystal polar control retarder 300 and the driving of the top electrode pattern region A by a voltage $V_{FA}$; and FIG. 19B is a schematic diagram illustrating a top view of the electrodes of the switchable liquid crystal polar control retarder and the driving of the top electrode pattern region B by a voltage $V_{FB}$. Features of the embodiment of FIGS. 19A-B not discussed in further detail may be assumed to correspond to the features with equivalent reference numerals as discussed above, including any potential variations in the features.

FIG. 19A illustrates a proximal area 327FA that is driven with voltage $V_{FA}$ by connector 347FA that is outside the outer edge 321F of the electrode 317F; and FIG. 19B illustrates a proximal area 327FB that is driven with voltage $V_{FB}$ by connector 347FB that is outside the outer edge 321F of the electrode 317F. A common uniform electrode 317R is arranged on the opposite side of the liquid crystal layer 314.

Figure 19C:
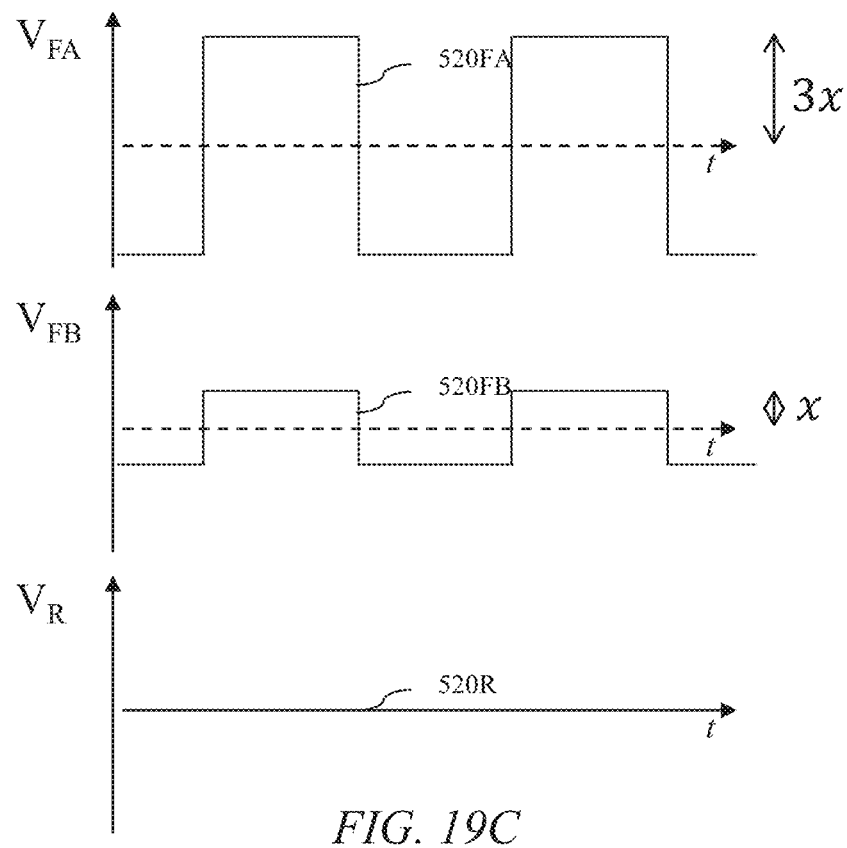
FIG. 19C is a schematic diagram illustrating exemplary voltage signals for the addressing of the patterned electrodes of FIGS. 7A-7B for a reflective background region.

FIG. 19C is a schematic diagram illustrating exemplary voltage signals 520FA, 520FA, 520R for the addressing of the electrodes 317F, 317R of FIGS. 19A-B for a reflective background region 320B. Features of the embodiment of FIG. 19C not discussed in further detail may be assumed to correspond to the features with equivalent reference numerals as discussed above, including any potential variations in the features.

In the embodiment of FIG. 19C, the electrode 317R is grounded, electrode area 327FA provides the mark region 320A that is driven with low reflectivity and electrode area 327FB provides the mark background region 320B. Thus the display of FIG. 2B for example may be provided. The complexity of the addressing electrodes 317F, 317R is advantageously reduced and cost reduced.

Figure 19D:
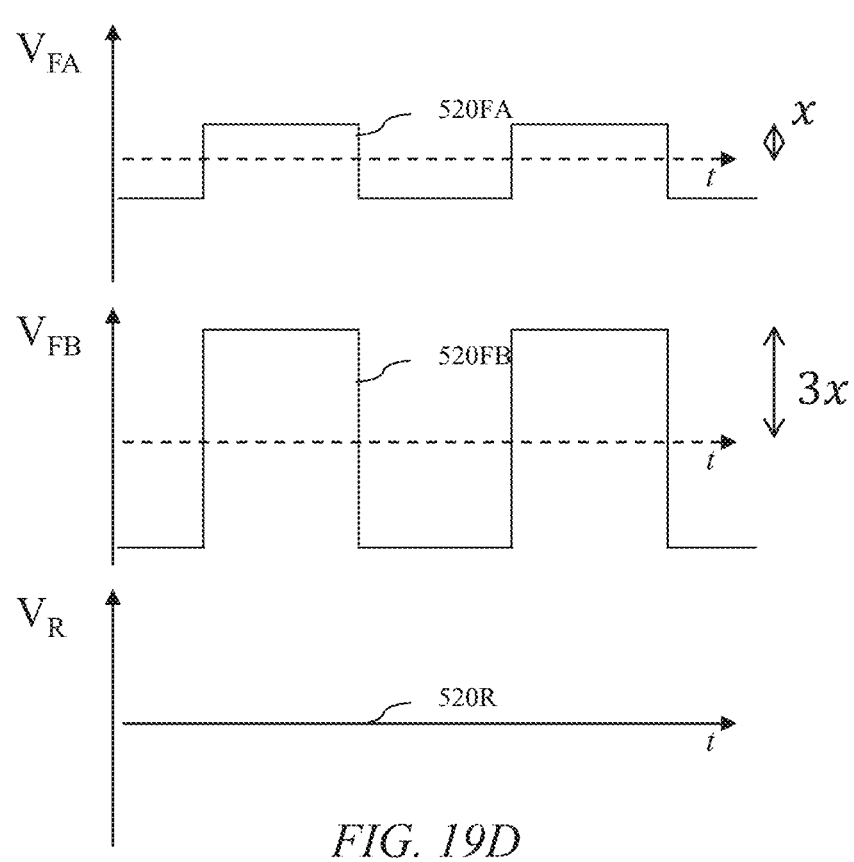
FIG. 19D is a schematic diagram illustrating exemplary voltage signals for the addressing of the patterned electrodes of FIGS. 7A-7B for a reflective mark region.

FIG. 19D is a schematic diagram illustrating exemplary voltage signals for the addressing of the patterned electrodes of FIGS. 19A-B for a reflective mark region. Features of the embodiment of FIG. 19D not discussed in further detail may be assumed to correspond to the features with equivalent reference numerals as discussed above, including any potential variations in the features. In the alternative embodiment of FIG. 19D, the mark region 320A is provided as reflective by the driving of the electrode area 327FA by waveform 520FA and the mark background region 320B is provided as non-reflective by the driving of the electrode addressable area 327FB by waveform 520FB.

Figure 20A:
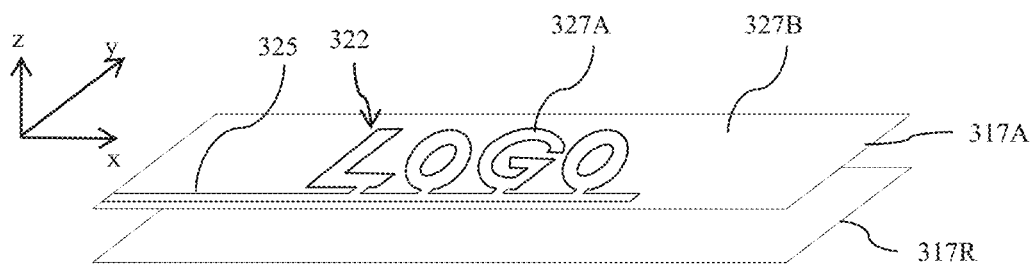
FIG. 20A is a schematic diagram illustrating a perspective side view of alternative top and bottom electrodes for a switchable liquid crystal polar control retarder.
Figure 20B:
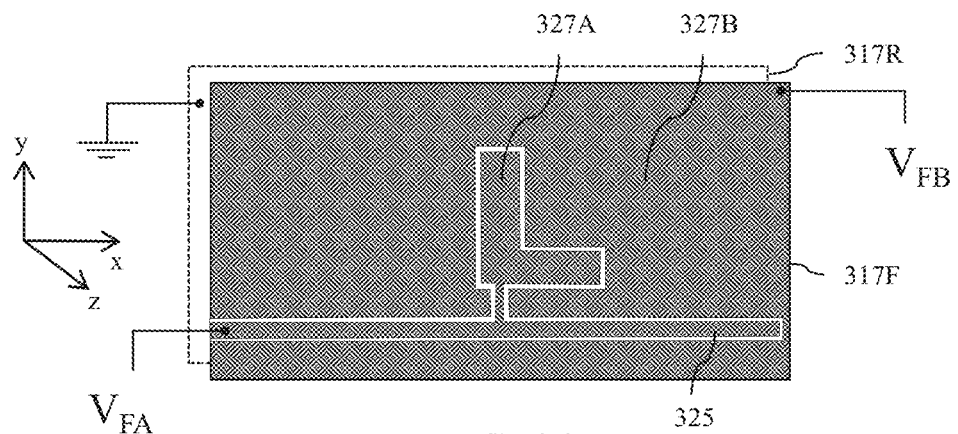
FIG. 20B is a schematic diagram illustrating a top view of the electrodes of the switchable liquid crystal polar control retarder of FIG. 20A.

FIG. 20A is a schematic diagram illustrating a perspective side view of alternative top and bottom electrodes 317F, 317R for a switchable liquid crystal polar control retarder 301; and FIG. 20B is a schematic diagram illustrating a top view of the electrodes of the switchable liquid crystal polar control retarder 301 of FIG. 20A. Features of the embodiment of FIGS. 20A-B not discussed in further detail may be assumed to correspond to the features with equivalent reference numerals as discussed above, including any potential variations in the features.

One of the first and second transmissive electrodes 317F, 317R is patterned to provide plural addressable areas 327A, 327B separated by gaps 390, and the other of the first and second transmissive electrodes 317F, 317R is not patterned.

Figure 20C:
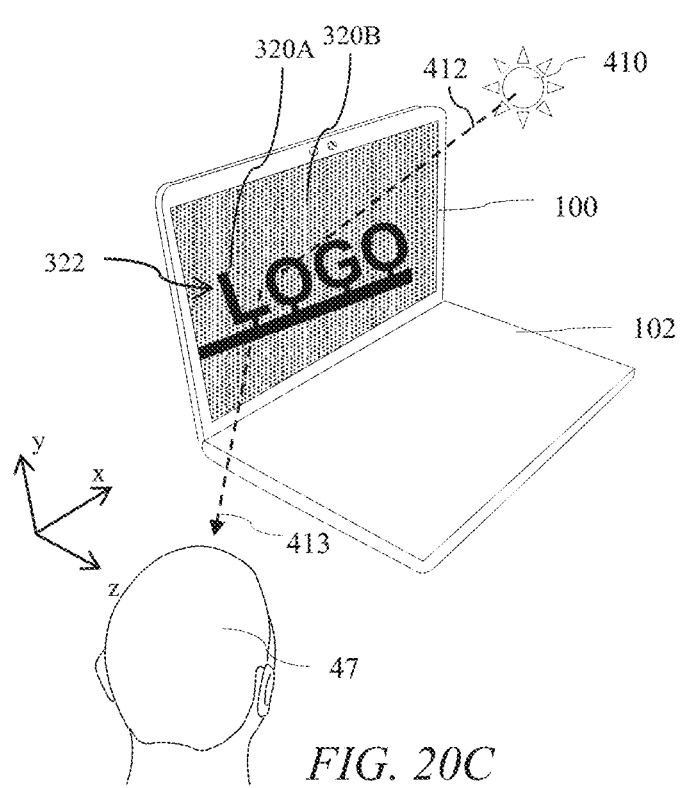
FIG. 20C is a schematic diagram illustrating a look-down off-axis perspective view of a laptop illuminated by an ambient light source comprising a switchable privacy display device comprising the patterned electrode liquid crystal polar control retarder of FIG. 20A and FIG. 20B wherein no light is output from the spatial light modulator.

FIG. 20C is a schematic diagram illustrating a look-down off-axis perspective view of a laptop computer 102 illuminated by an ambient light source 410 comprising a switchable privacy display device 100 comprising the patterned electrode liquid crystal polar control retarder 301 of FIG. 20A and FIG. 20B wherein no light 400 is output from the spatial light modulator 48. Features of the embodiment of FIG. 20C not discussed in further detail may be assumed to correspond to the features with equivalent reference numerals as discussed above, including any potential variations in the features.

In comparison to the arrangement of FIG. 19A, the bus bar connection electrode 325 is provided within the active area and forms part of the mark region 320A that is displayed in off-axis locations to the off-axis observer 47. Advantageously the complexity and cost of the liquid crystal retarder 301 is reduced.

The operation of the polar control retarders for on-axis and off-axis light will now be described.

Figure 21A:
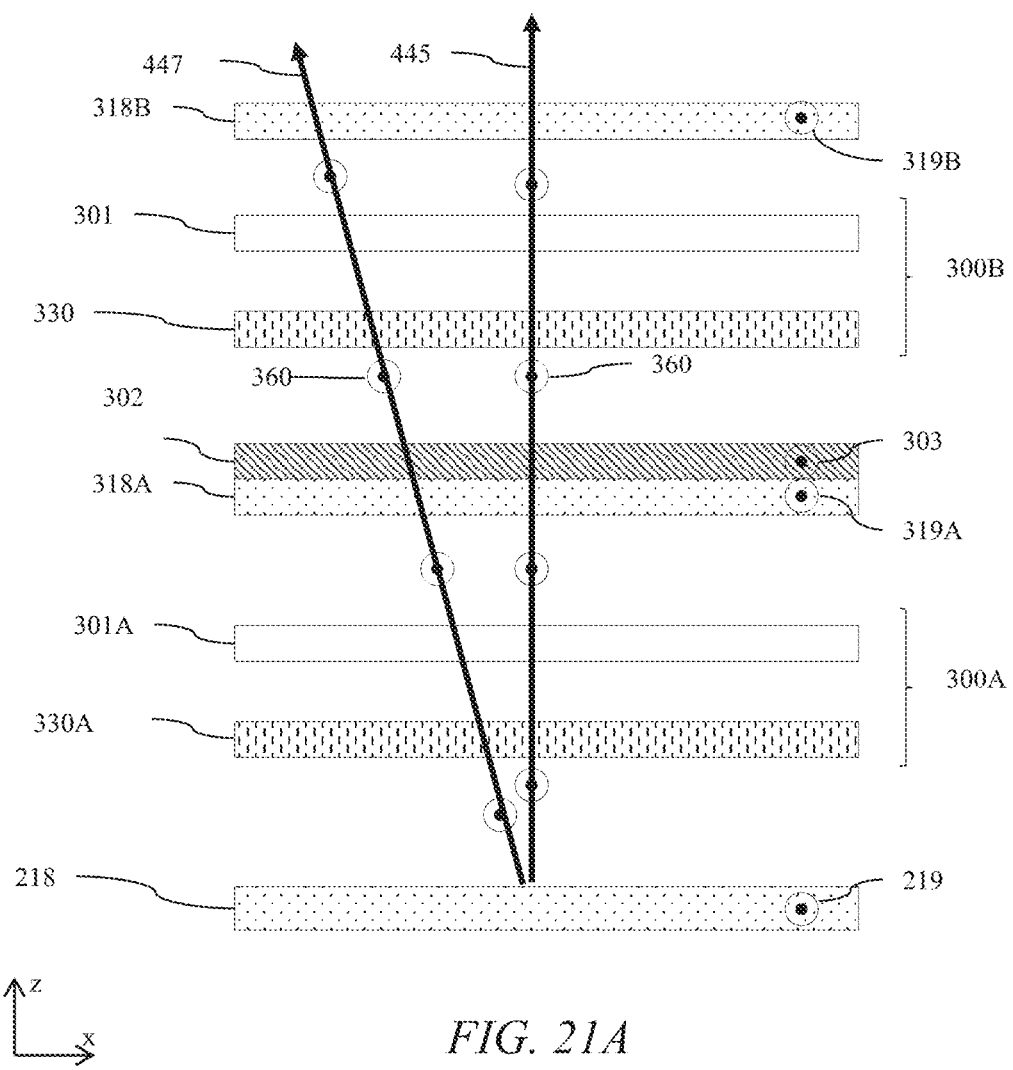
FIG. 21A is a schematic diagram illustrating in side view the operation of the arrangement of FIG. 1A for transmitted light from the spatial light modulator in the share mode of operation.

FIG. 21A is a schematic diagram illustrating in side view the operation of the arrangement of FIG. 2 for transmitted light from the spatial light modulator 48 in the share mode of operation. In the embodiments that will be described below, light ray 445 that is normal to the display (or in a head-on direction) is transmitted by the display polariser 219 with a polarisation state 360 that is unmodified by the polar control retarders 300A, 300B and polarisers 318A, 302 and 318B. Such light is transmitted with high luminance.

In share mode, rays 447 with a non-zero polar angle to the normal direction are also transmitted with the same polarisation state 360 that is substantially not modified by the polar control retarders 300A, 300B and polarisers 318A, 302 and 318B. The polar profile of luminance from the spatial light modulator 48 may be substantially unmodified. Advantageously the display may be visible from a wide range of polar viewing positions and viewable by multiple display users.

Figure 21B:
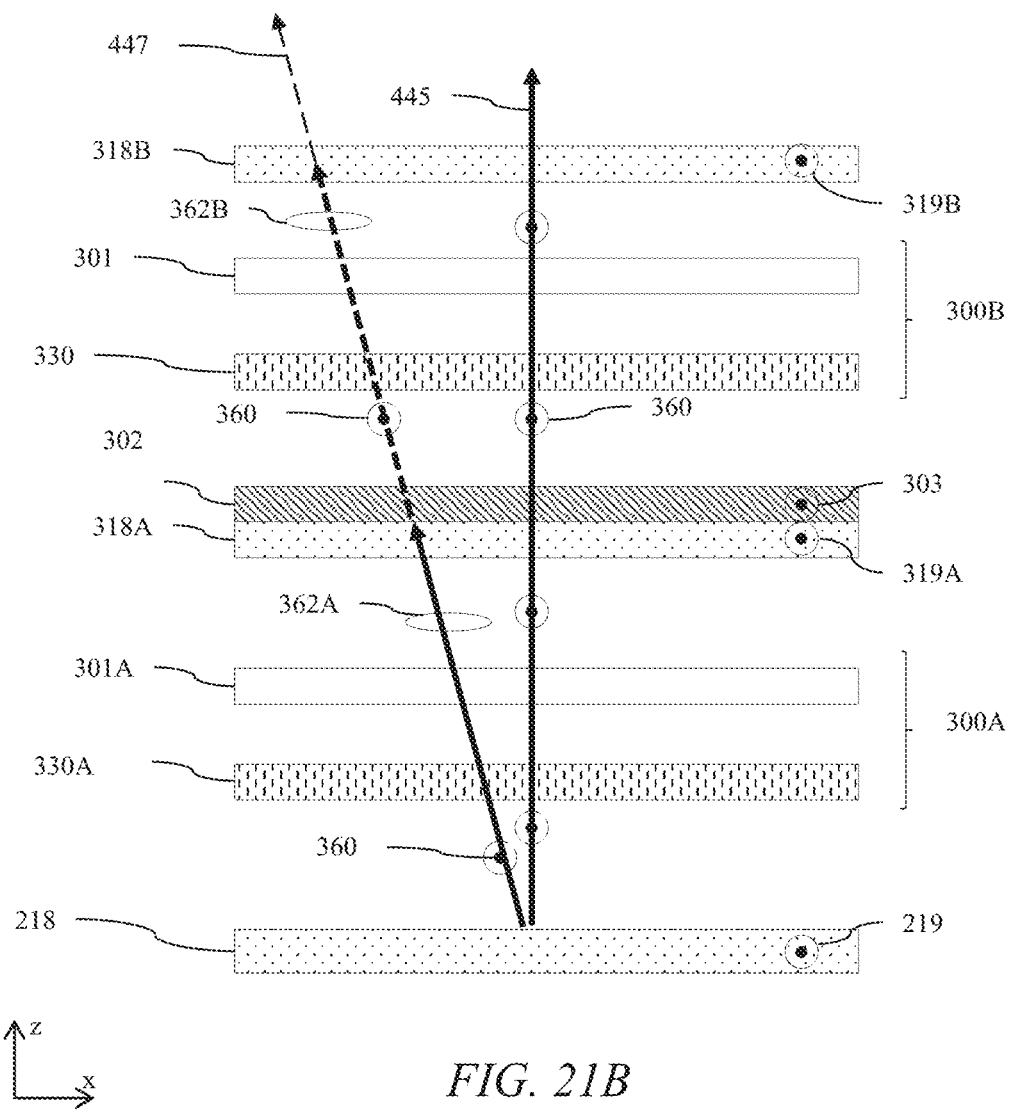
FIG. 21B is a schematic diagram illustrating in side view the operation of the arrangement of FIG. 1A for transmitted light from the spatial light modulator in a privacy mode of operation with high reflectivity of ambient light.

FIG. 21B is a schematic diagram illustrating in side view the operation of the arrangement of FIG. 2 for transmitted light from the spatial light modulator 48 in a privacy mode of operation with high reflectivity of ambient light. Head-on light ray 445 has a polarisation state 360 that is substantially unmodified by polar control retarders 300A, 300B. By comparison, off-axis light ray 447 has an output from the first polar control retarder that has an imparted phase difference to provide in general an elliptical state 362A. On incidence with first additional polariser 318A the luminance of the ray 447 is reduced with output state 360. Said light ray 447 is transmitted through reflective polariser 302 with small loss and is incident on the second polar control retarder 300B at which further phase modulation is provided and an output polarisation state 362B is achieved. Such state 362B is at least in part absorbed by second additional polariser 318B. Ray 447 is thus transmitted at off-axis polar locations with reduced luminance compared to the ray 447 in FIG. 21A.

The operation of the reflective polariser 302 will now be described.

Figure 21C:
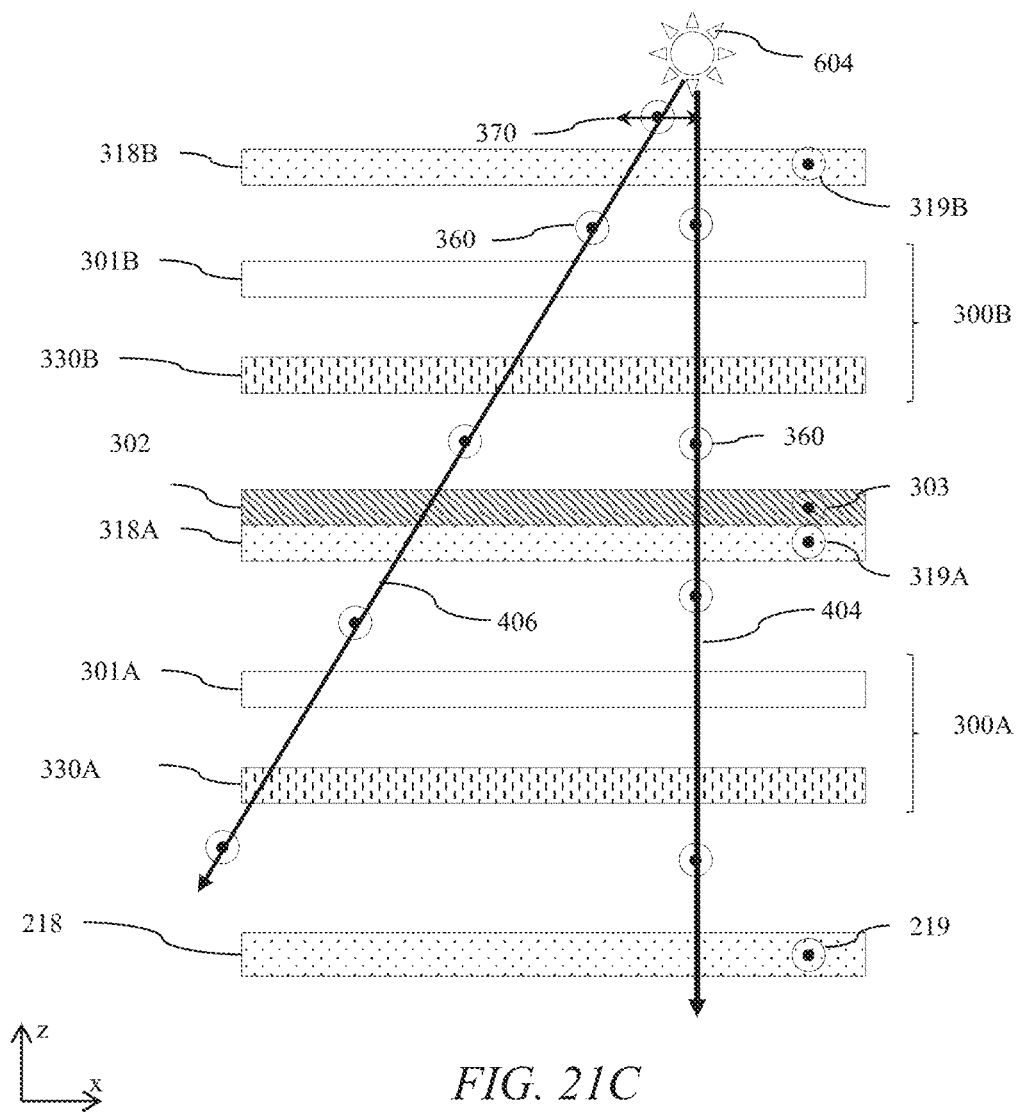
FIG. 21C is a schematic diagram illustrating in side view the operation of the arrangement of FIG. 1A for ambient light in the share mode of operation.

FIG. 21C is a schematic diagram illustrating in side view the operation of the arrangement of FIG. 18A for incident ambient light 604 in the share mode of operation. Light rays 404, 406 are incident on the display device 100 with substantially unpolarised state 370. The polariser 318B provides a polarisation state 360 that is incident on the first polar control retarder and is substantially unmodified for head-on ray 404 and off-axis ray 406. Thus the light rays are substantially not reflected by the display are absorbed in the spatial light modulator 48 and backlight 20 if present. The display reflectivity is maintained at a low level for a wide range of viewing directions and advantageously a high contrast image is seen by multiple display users.

Figure 21D:
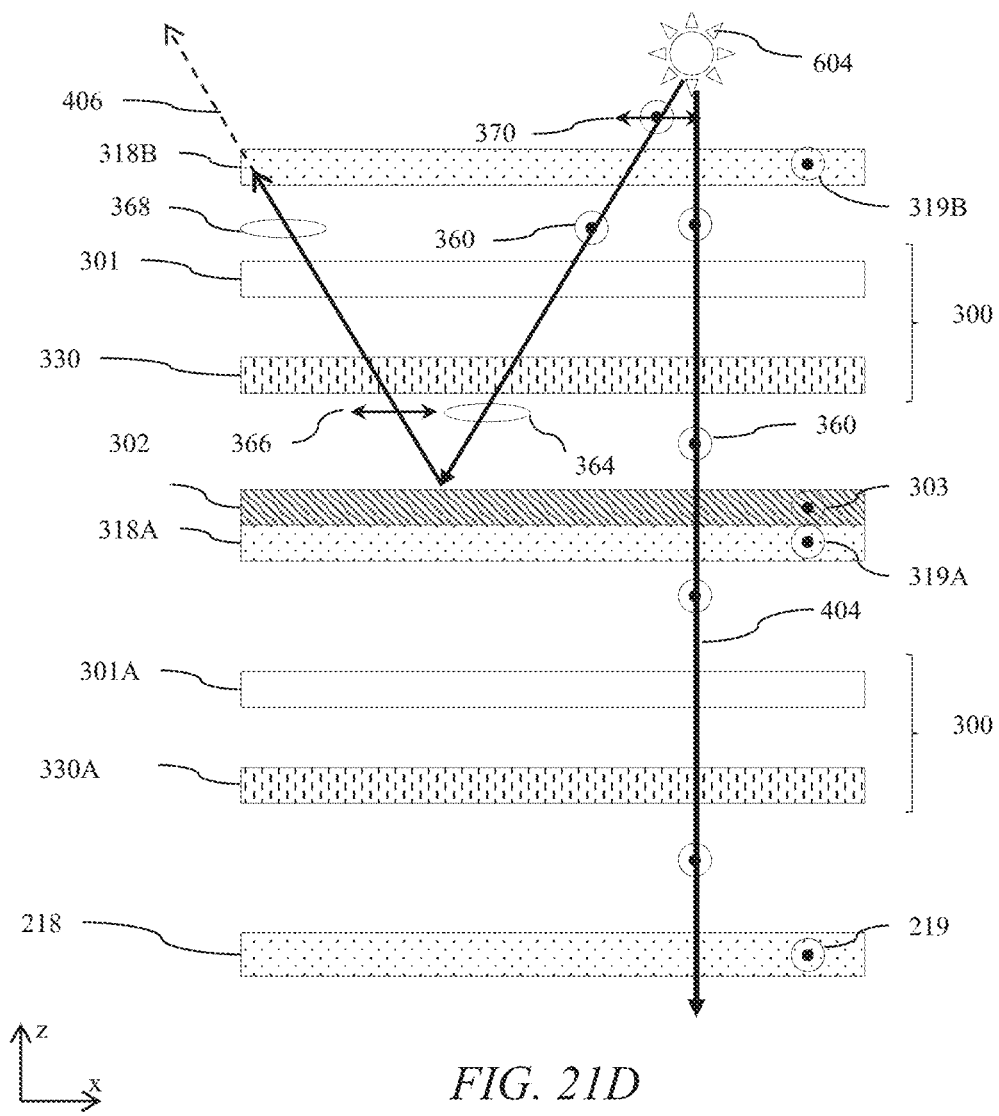
FIG. 21D is a schematic diagram illustrating in side view the operation of the arrangement of FIG. 1A for ambient light in a privacy mode of operation with high reflectivity of ambient light.

FIG. 21D is a schematic diagram illustrating in side view the operation of the arrangement of FIG. 18A for ambient light in a privacy mode of operation with high reflectivity of ambient light. Head-on incident ambient light ray 404 is transmitted with substantial reflection from the reflective polariser 302. Features of the embodiments of FIGS. 21A-D not discussed in further detail may be assumed to correspond to the features with equivalent reference numerals as discussed above, including any potential variations in the features.

By comparison light ray 406 undergoes a phase modulation at the polar control retarder 300B such that state 364 illuminates the reflective polariser. The resolved polarisation state 366 that is orthogonal to the electric vector transmission direction 303 of the reflective polariser 302 is reflected and is passed through the polar retarder such that polarisation state 368 is incident on to the second additional polariser. The component of the state 368 that is parallel to the electric vector transmission direction of the polariser 318B is thus transmitted. To an off-axis observer 47, the display appears to have increased reflectivity. Said increased reflectivity advantageously achieves increased security factor, S as described above.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure.

Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device for use in ambient illumination comprising:
   a spatial light modulator arranged to output light, wherein the spatial light modulator comprises a display polariser arranged on a side of the spatial light modulator, the display polariser being a linear polariser;
   a view angle control arrangement comprising:
   an additional polariser arranged on the same side of the spatial light modulator as the display polariser outside the display polariser, the additional polariser being a linear polariser; and
   at least one polar control retarder arranged between the display polariser and the additional polariser, the at least one polar control retarder including a switchable liquid crystal retarder comprising a layer of liquid crystal material, and first and second transmissive electrodes on opposite sides of the layer of liquid crystal material, wherein each of the first and second transmissive electrodes is patterned in areas separated by gaps to provide plural addressable regions of the layer of liquid crystal material, at least one of the plural regions being in a shape of a mark for display to an observer.

2. The display device according to claim 1, wherein the display polariser is an input polariser arranged on an input side of the spatial light modulator, and the additional polariser is arranged on an input side of the display polariser.

3. The display device according to claim 1, wherein the display polariser is an output polariser arranged on an output side of the spatial light modulator, and the additional polariser is arranged on an output side of the display polariser.

4. The display device according to claim 3, wherein the view angle control arrangement further comprises a reflective polariser arranged between the output polariser and the additional polariser, the reflective polariser being a linear polariser, and the at least one polar control retarder is arranged between the reflective polariser and the additional polariser.

5. The display device according to claim 1, wherein the gaps have a width of at most twice a thickness of the layer of liquid crystal material, and preferably at most the thickness of the layer of liquid crystal material.

6. The display device according to claim 1, wherein the gaps that are aligned across the layer of liquid crystal material are offset.

7. The display device according to claim 1, wherein
   the plural regions include at least one island region and at least one peripheral region extending around the at least one island region, and
   areas of the first and second transmissive electrodes that are aligned with the at least one peripheral region have bridging slits that are aligned across the layer of liquid crystal material and through which extend bridging tracks connected to areas of the first and second transmissive electrodes that are aligned with the at least one island region.

8. The display device according to claim 1, wherein
   the plural regions include at least one distal region that is not adjacent to an outer edge of the first and second transmissive electrodes and at least one proximal region that is adjacent to the outer edge of the first and second transmissive electrodes, and areas of the first and second transmissive electrodes that are aligned with the at least one proximal region have at least one connection slit through which extend at least one connection track connected to areas of the first and second transmissive electrodes that are aligned with the at least one distal region, the at least one connection track extending to the outer edge of the first and second transmissive electrodes.

9. The display device according to claim 8, wherein the at least one connection track connected to the areas of the first and second transmissive electrodes that are aligned with the at least one distal region are not aligned with each other across the layer of liquid crystal material.

10. The display device according to claim 9, further comprising a control system arranged to control the spatial light modulator and to apply voltages across the first and second transmissive electrodes for driving the layer of liquid crystal material, wherein the control system is connected to the at least one connection track at the outer edge and is arranged to apply respective voltage signals to the at least one connection track and to the at least one proximal region having amplitude and phase that are selected to apply voltages across the first and second transmissive electrodes that drive the plural regions of the layer of liquid crystal material into a desired state in accordance with a mode of operation in each of the at least one distal region, parts of the at least one proximal region aligned with the at least one connection track, and a remainder of the at least one proximal region.

11. The display device according to claim 8, wherein the at least one connection track has a neck of reduced width adjacent to the at least one distal region to which it is connected.

* * * * *